United States Patent
Miehle et al.

[15] 3,675,204
[45] July 4, 1972

[54] STATUS SYSTEM

[72] Inventors: James A. Miehle, Los Altos; David S. Pratt, Cupertino; Robert M Rees, Atherton, all of Calif.

[73] Assignee: Varian Associates, Palo Alto, Calif.

[22] Filed: May 4, 1970

[21] Appl. No.: 34,496

[52] U.S. Cl. ..........................340/147 R, 340/153, 340/286
[51] Int. Cl. .......................................G08b 5/00, G08b 7/06
[58] Field of Search ..............340/153, 286, 147 A, 312, 152, 340/147; 235/92 AC, 92 PD

[56] References Cited

UNITED STATES PATENTS

| | | | |
|---|---|---|---|
| 3,092,689 | 6/1963 | Sandstrom | 340/312 X |
| 3,214,747 | 10/1965 | Lurie | 340/286 |
| 3,417,916 | 12/1968 | Brockel et al. | 234/1 |
| 3,418,650 | 12/1968 | Rich et al. | 340/312 X |
| 3,426,326 | 2/1969 | Goldstein | 340/153 |
| 3,484,748 | 12/1969 | Greenblum et al. | 340/153 |
| 3,559,177 | 1/1971 | Benson | 340/163 |

*Primary Examiner*—Donald J. Yusko
*Attorney*—Alan H. MacPherson

[57] ABSTRACT

A system for use in monitoring the statuses of a plurality of similar type objects includes transmitting terminals, logic structure and display structure. When used to monitor the status of a hotel room, information identifying the hotel room, and its status, including whether the room is vacant and not made up, vacant and made up, and occupied, is shown on a display. Information identifying a particular room and describing its status is transmitted from any transmitting terminal to the logic. Selected transmitting terminals, such as the cashier's terminal, are given priority in the transmission of data to the main logic over all other transmitting terminals. Structure is provided for indicating errors in the displayed status of a given room resulting from conflicting data relating to that room being received from the transmitting terminals. The system can detect a false report that the room is vacant, or a false report that the room is occupied. Because a hotel contains numerous types of rooms, structure is provided for displaying simultaneously all the rooms of a given type. Both the room clerk and housekeeper have a separate display. The information on the clerk's display is capable of being corrected or updated not only by new information from the transmitting terminals but also by information placed into the system by the clerk and the cashier. Structure is provided to enable the clerk to change the status of any room to any status that may be desired. The clerk's display also shows running counts of total rooms occupied, total rooms vacant, total number of rooms scheduled to be vacated and total number of rooms reserved for new occupants. To prevent the system from failing to operate when all the data expected from a transmitting terminal fails to be received, structure is provided for automatically restarting the system.

31 Claims, 41 Drawing Figures

BLOCK DIAGRAM

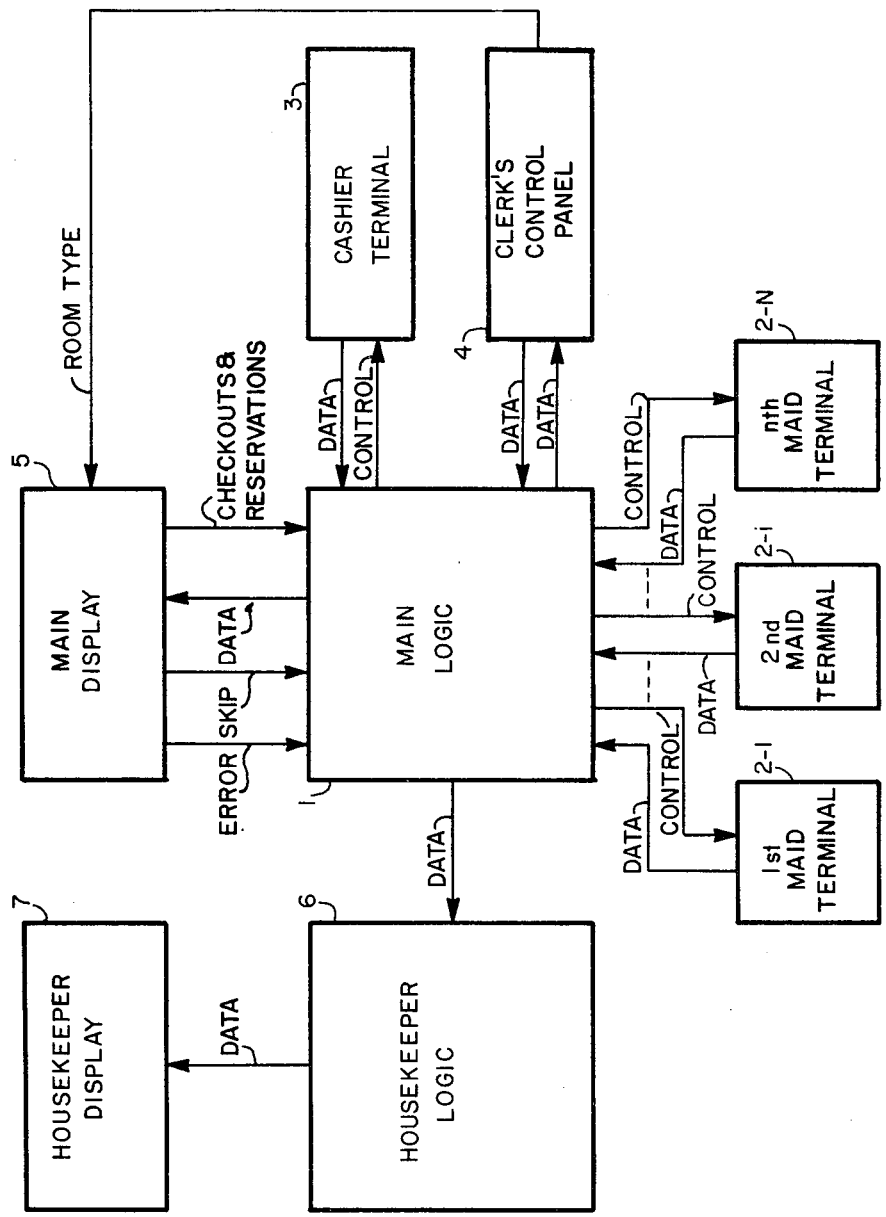
FIG. 1 BLOCK DIAGRAM

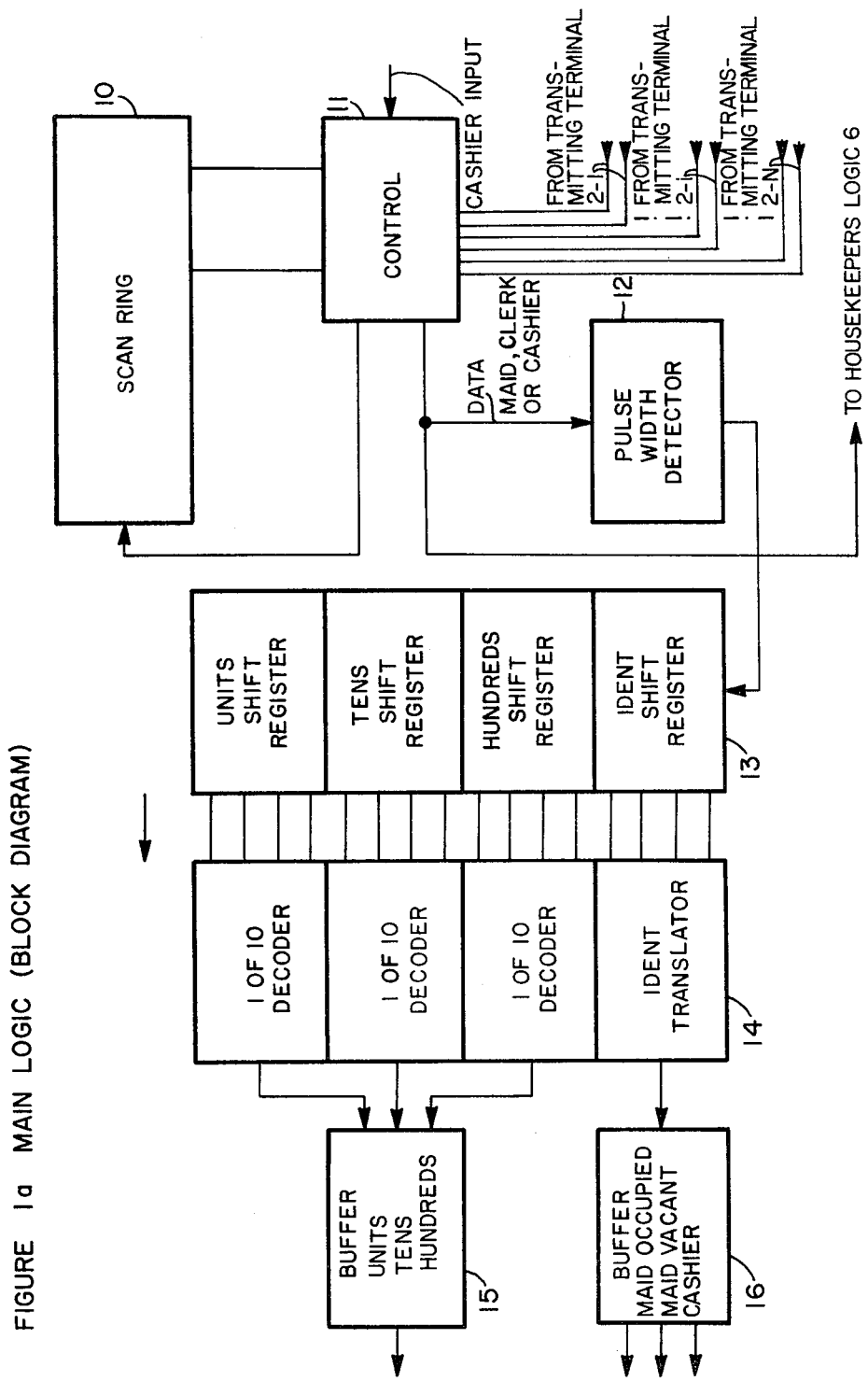
FIGURE 1a  MAIN LOGIC (BLOCK DIAGRAM)

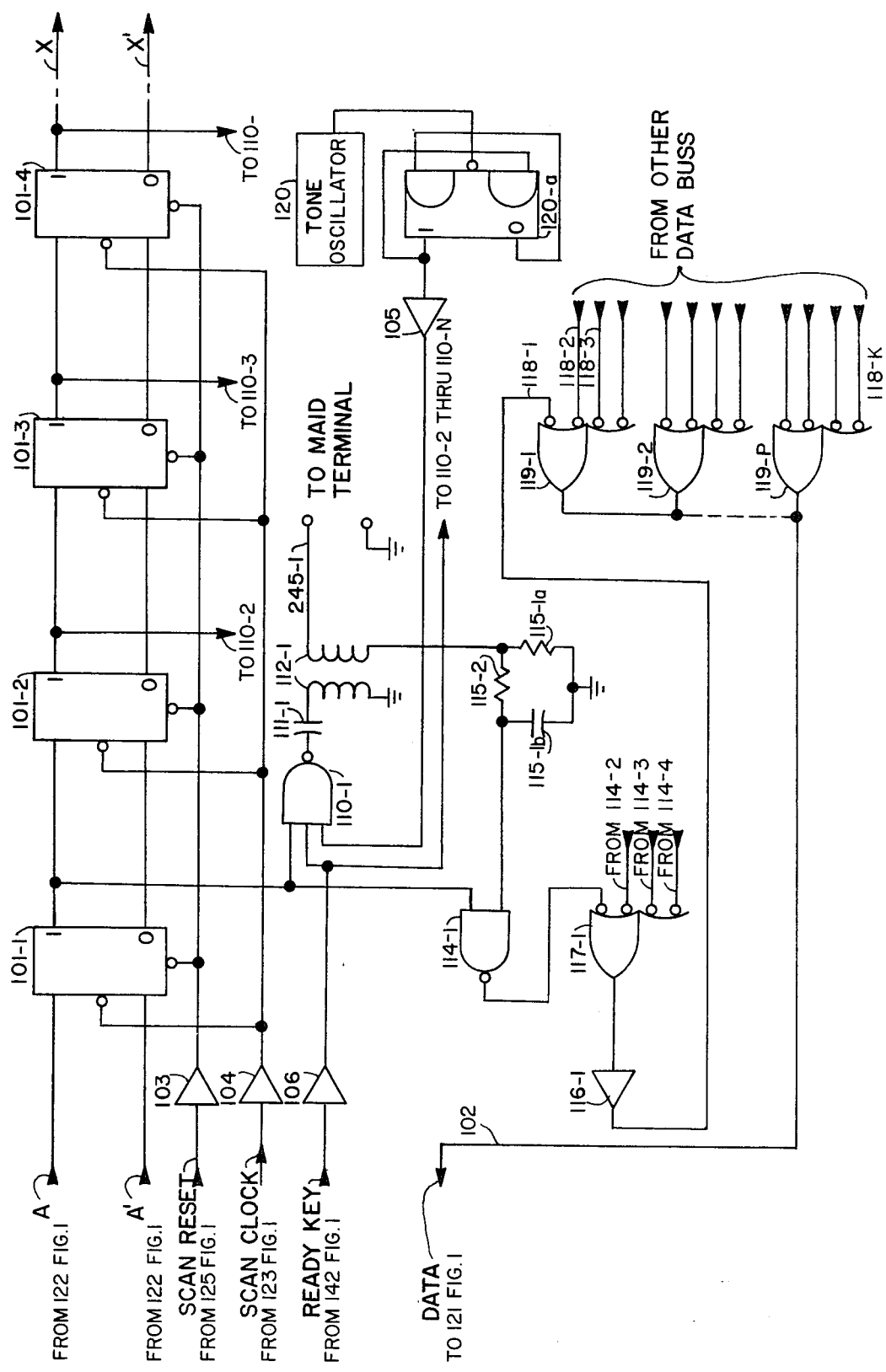
FIGURE 1b CONTROL-MAIN LOGIC

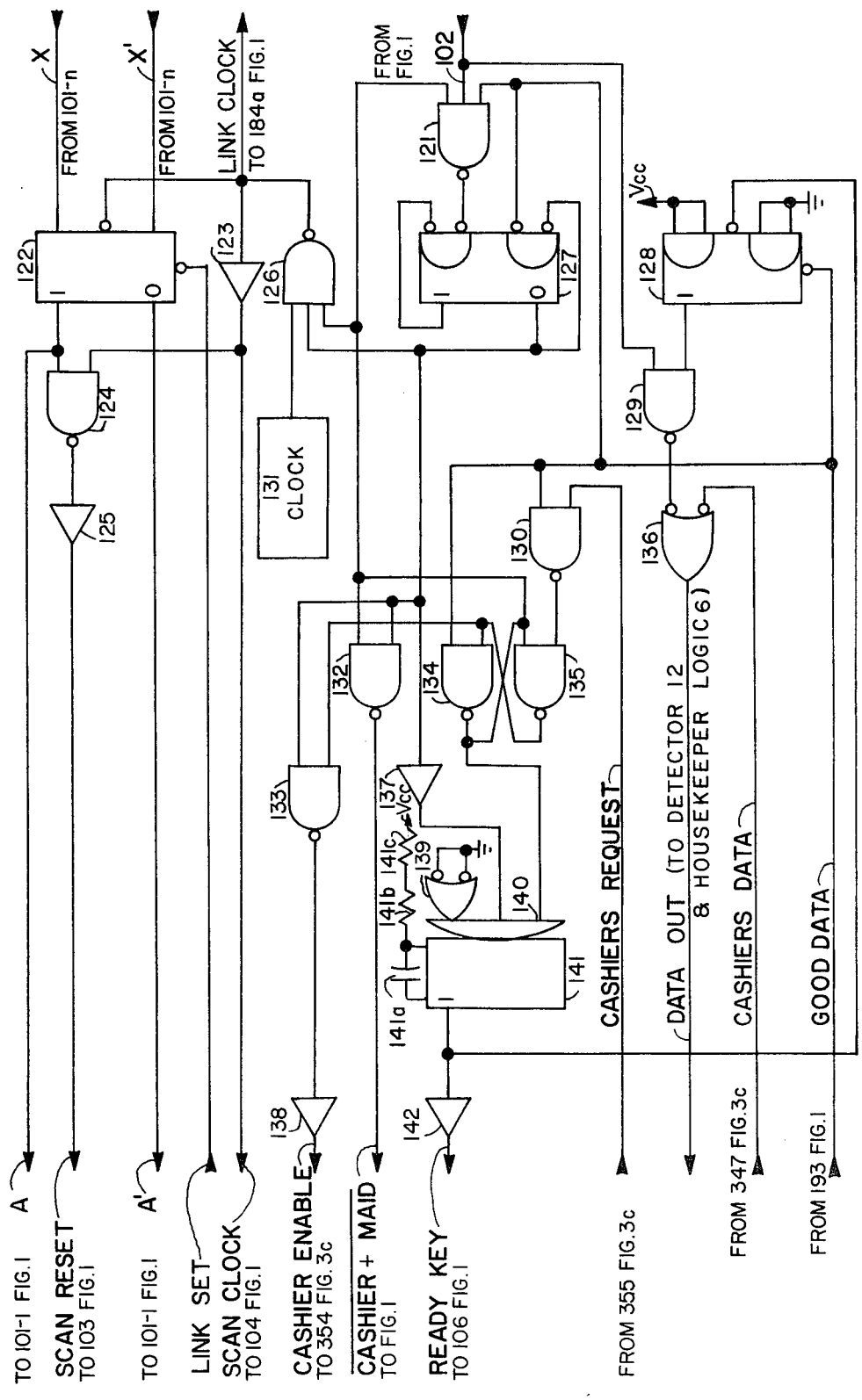

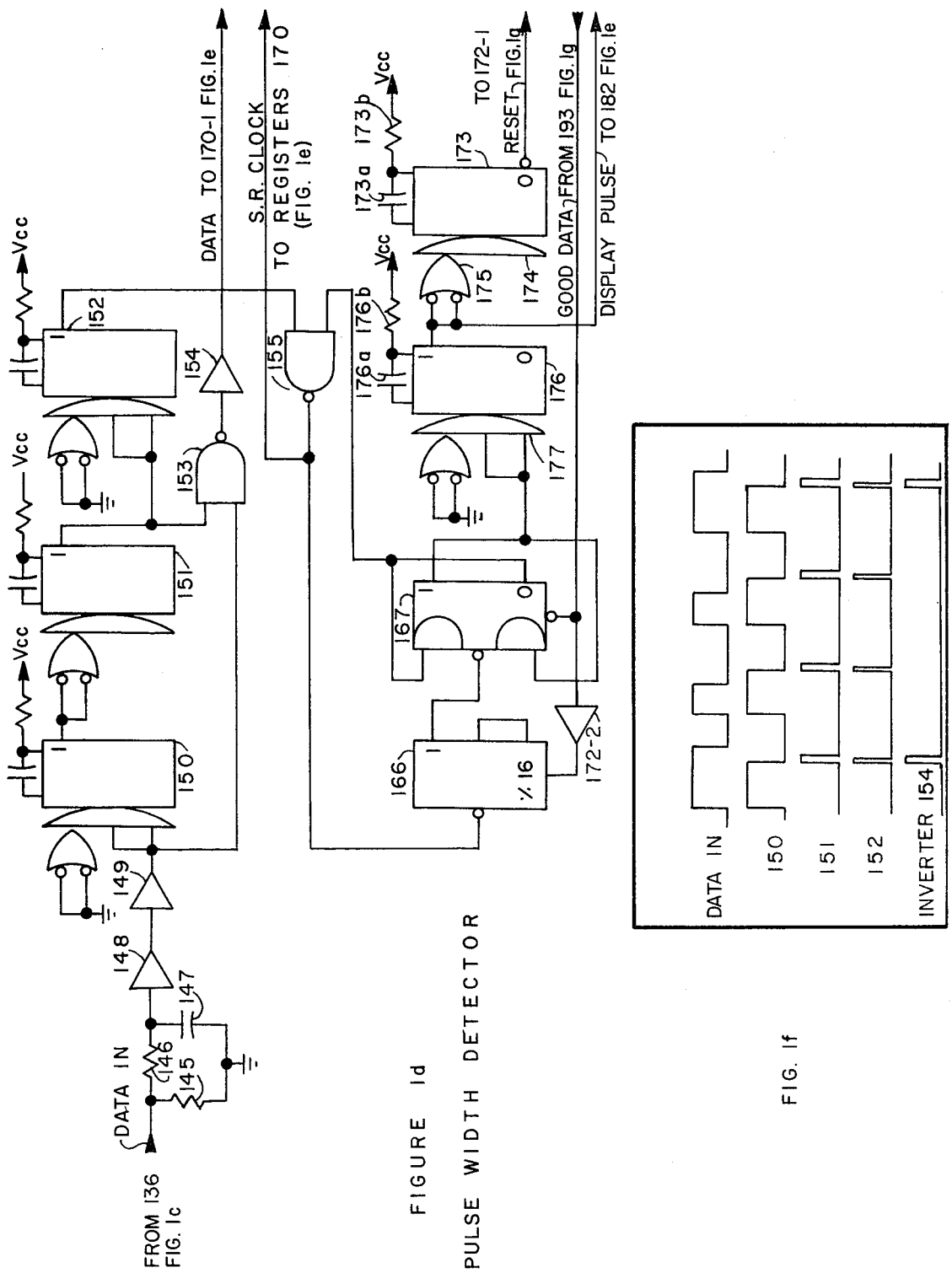

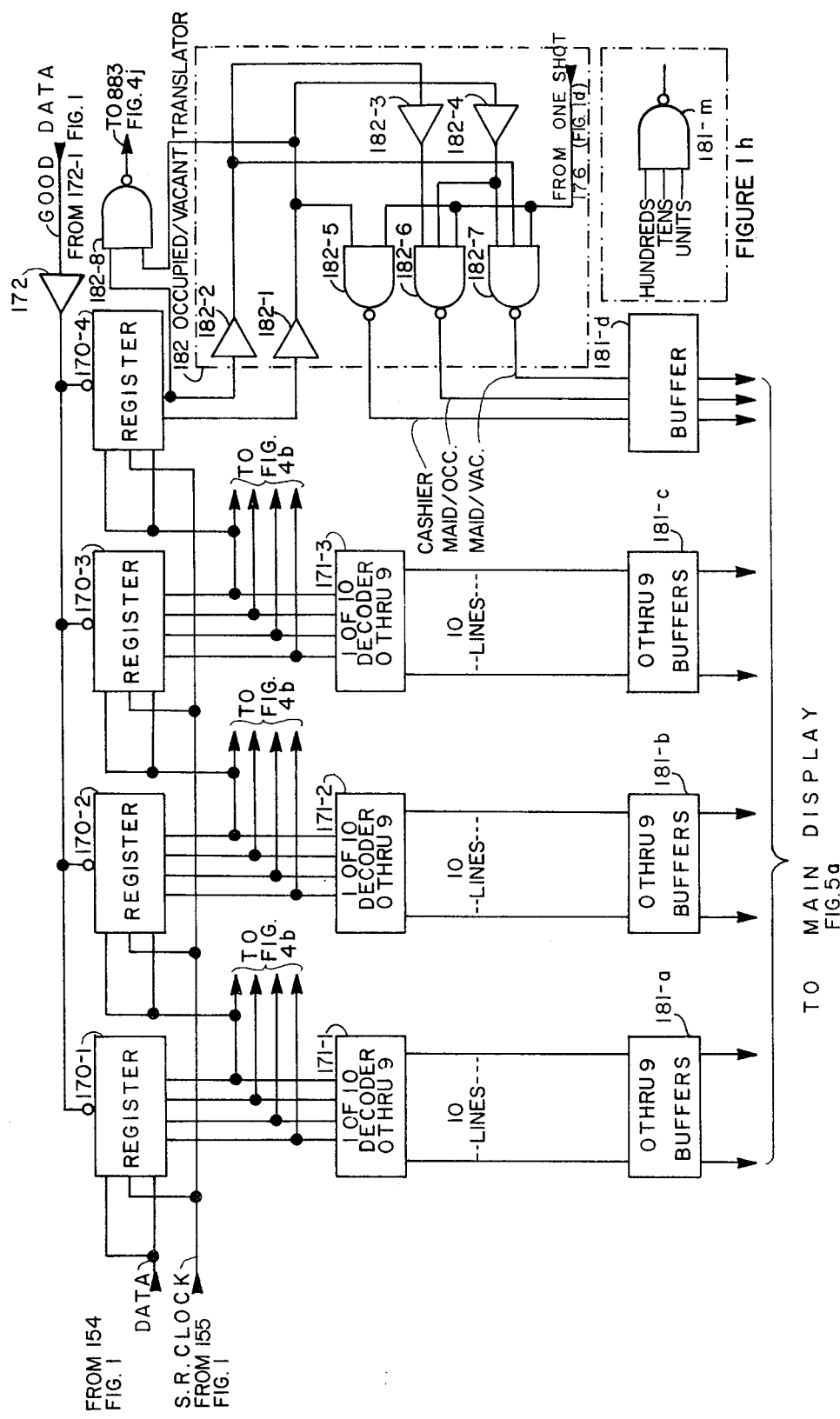

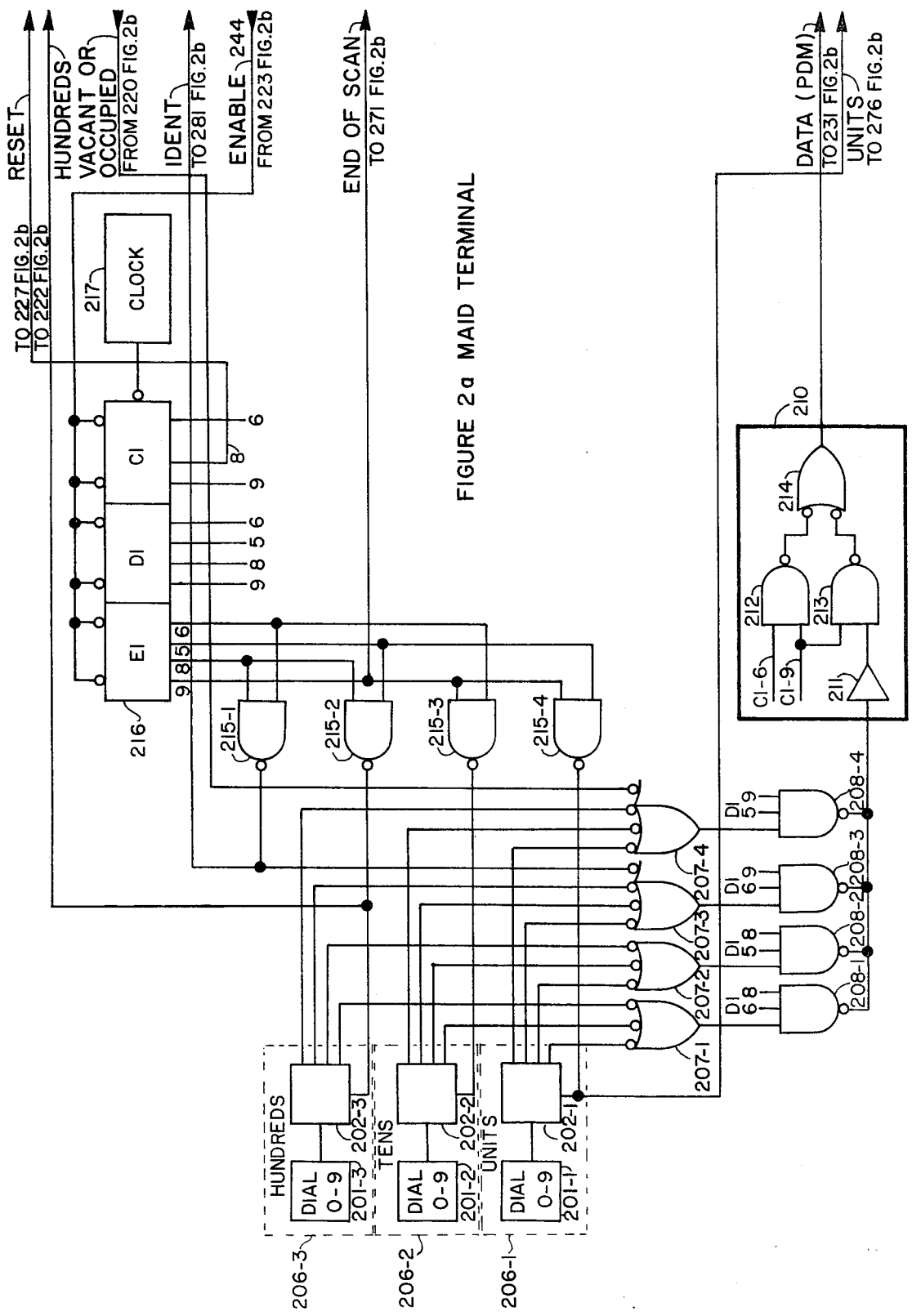
FIGURE 2a MAID TERMINAL

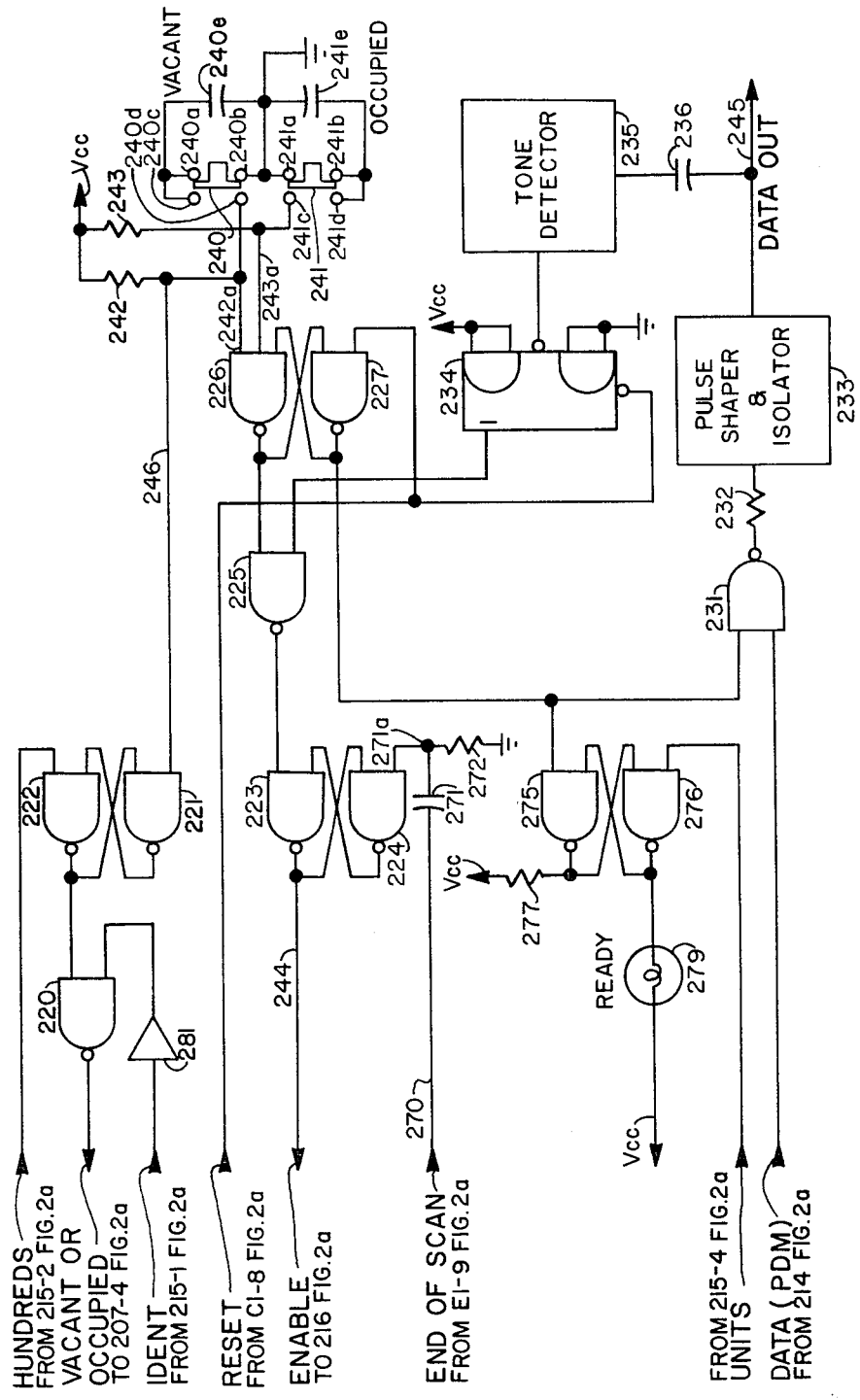
FIGURE 2b MAID TERMINAL

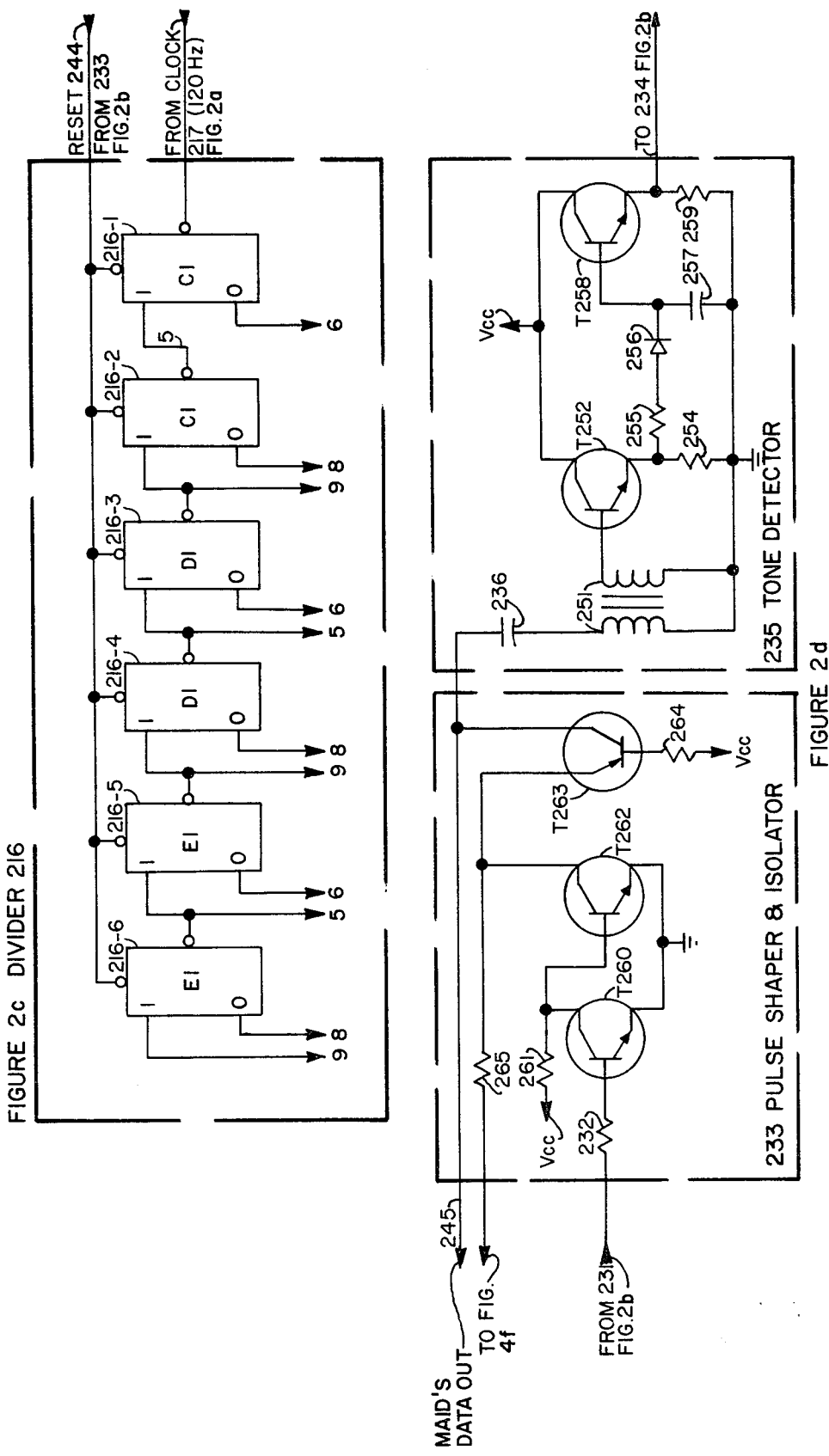

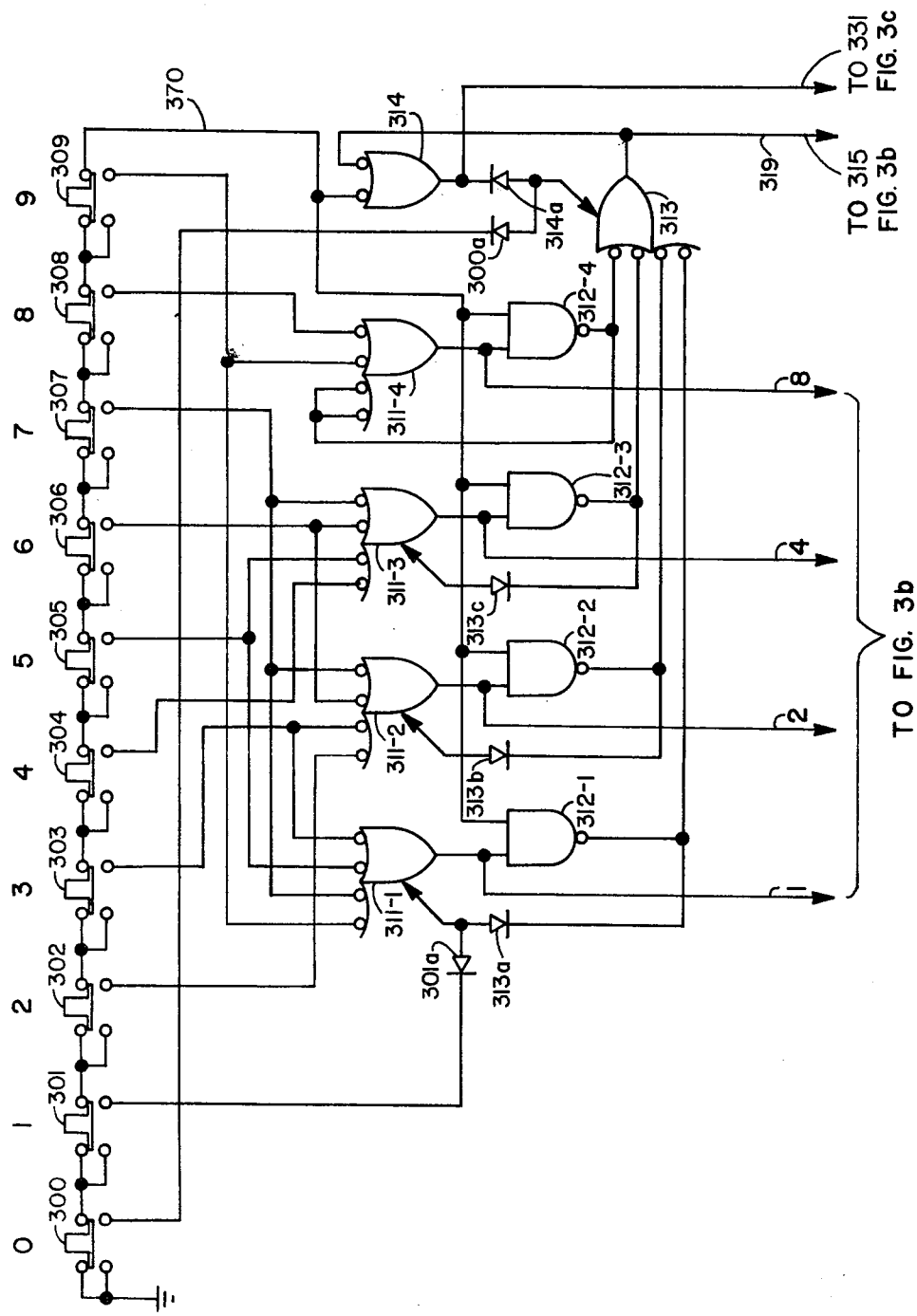
FIGURE 3a CASHIERS TERMINAL

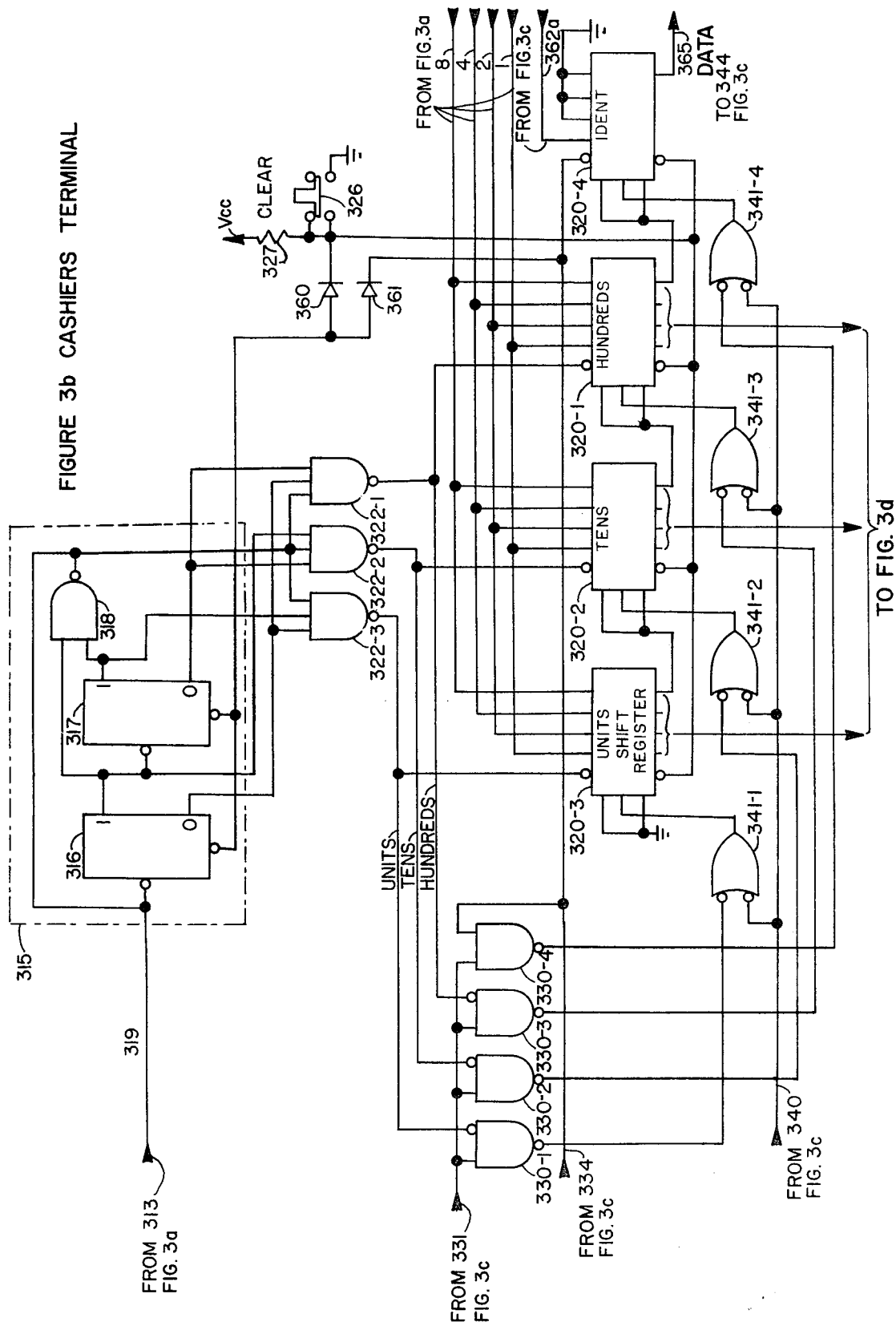

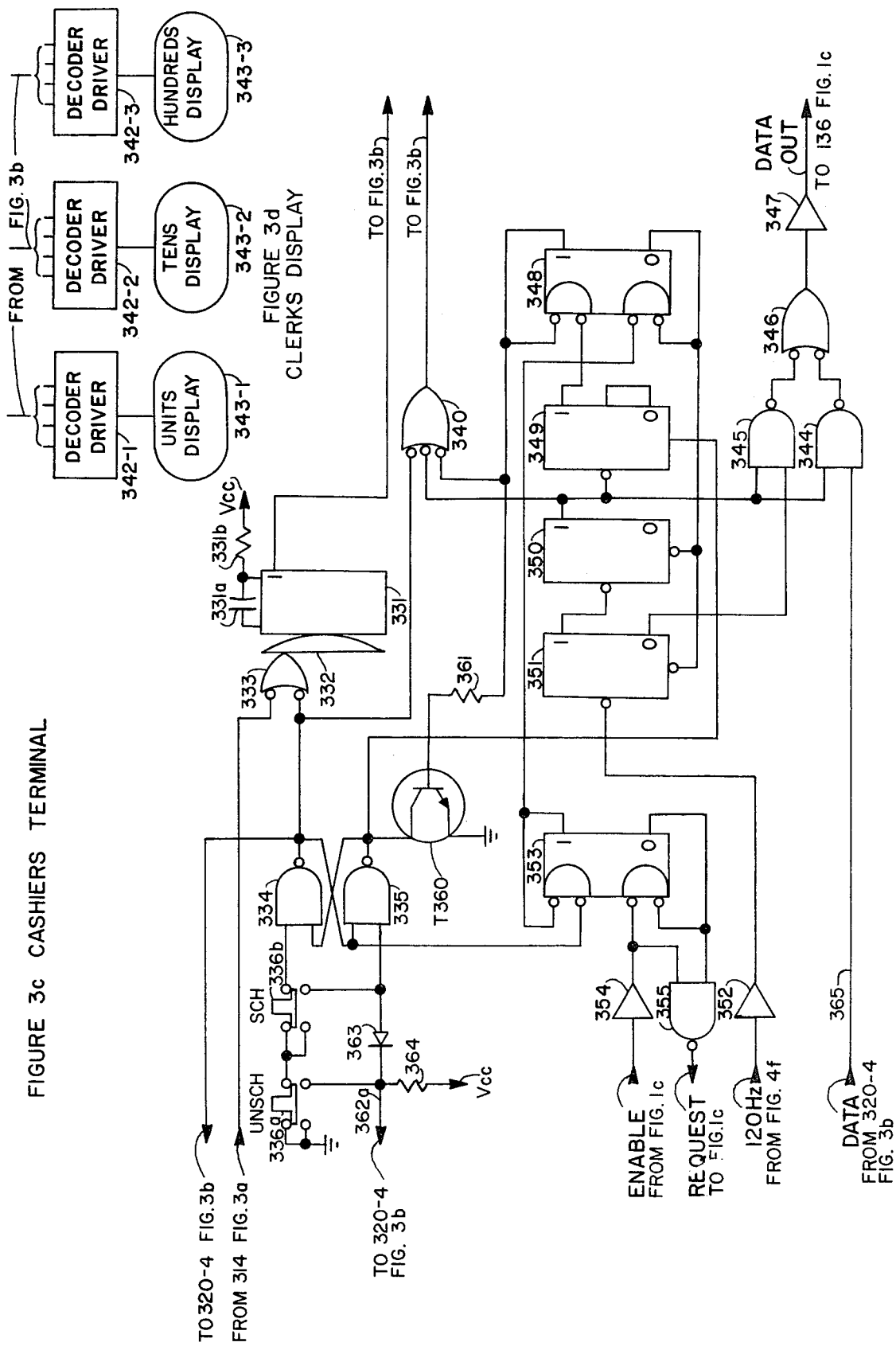

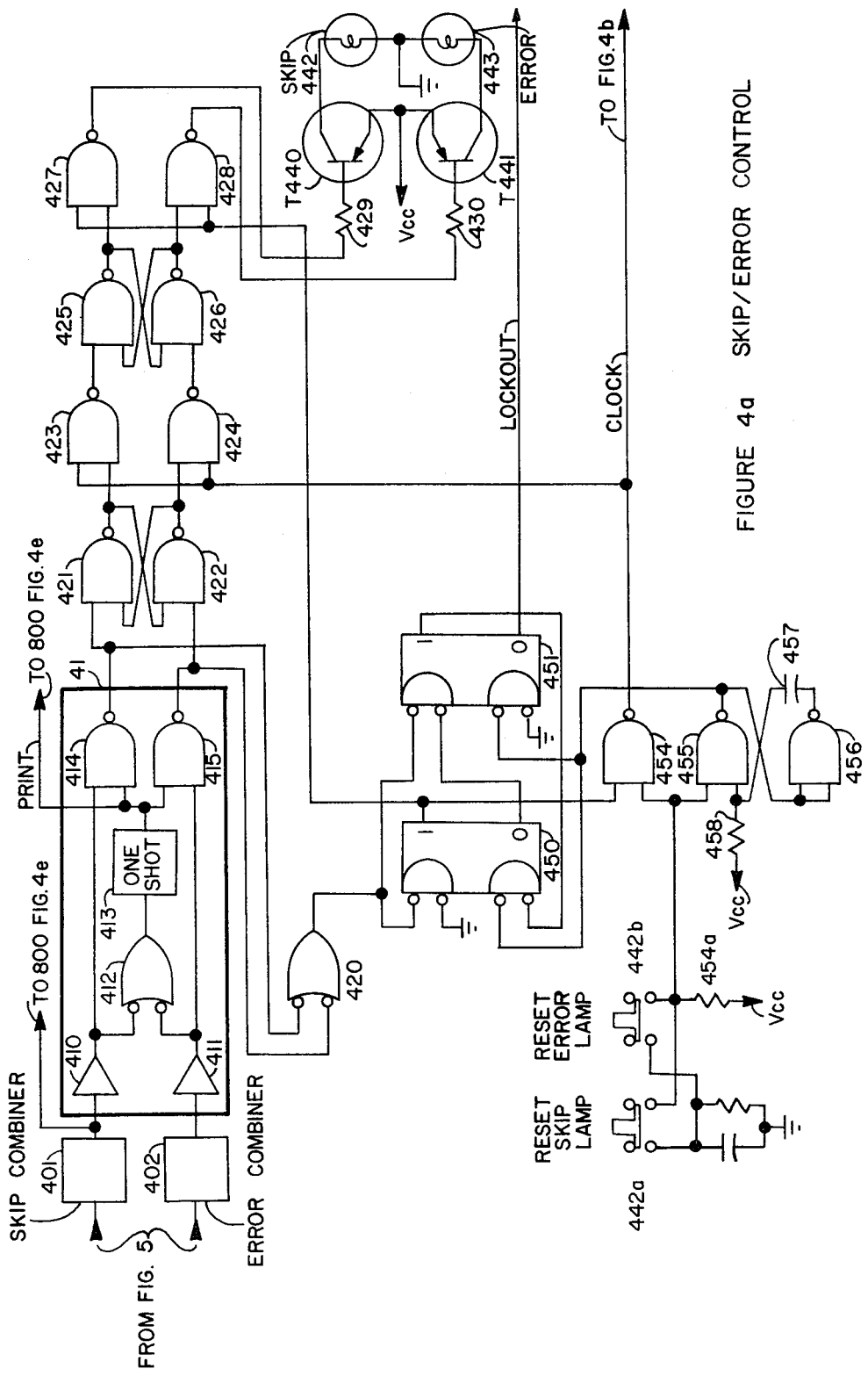
FIGURE 4a SKIP/ERROR CONTROL

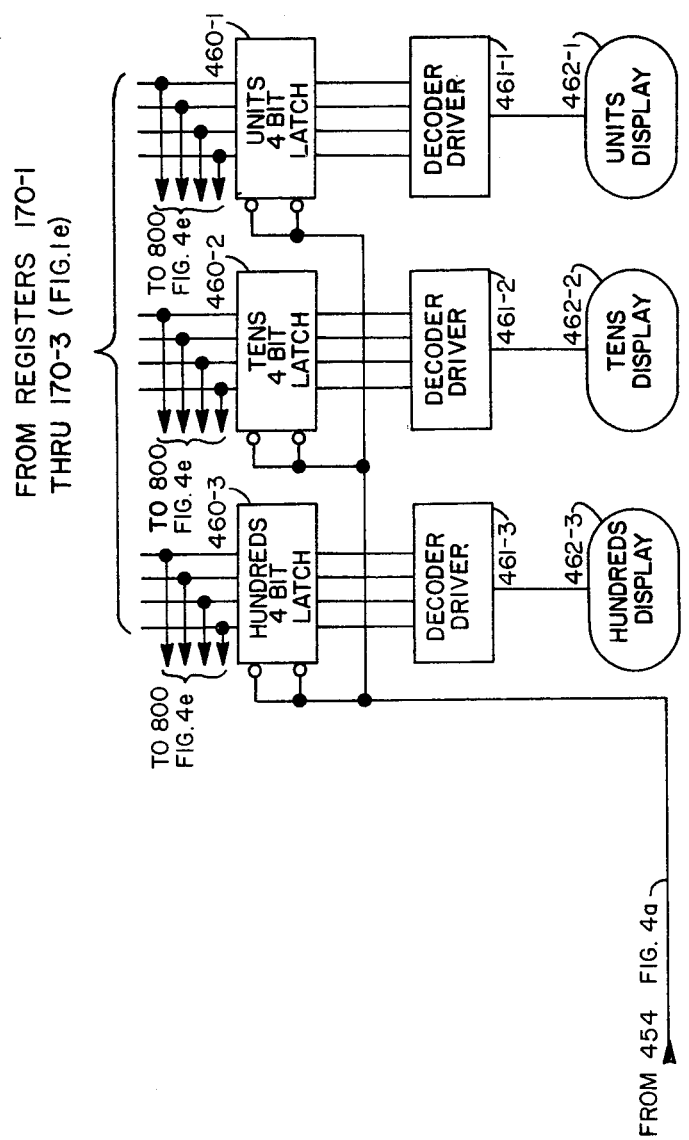
FIGURE 4b  SKIP/ERROR DISPLAY

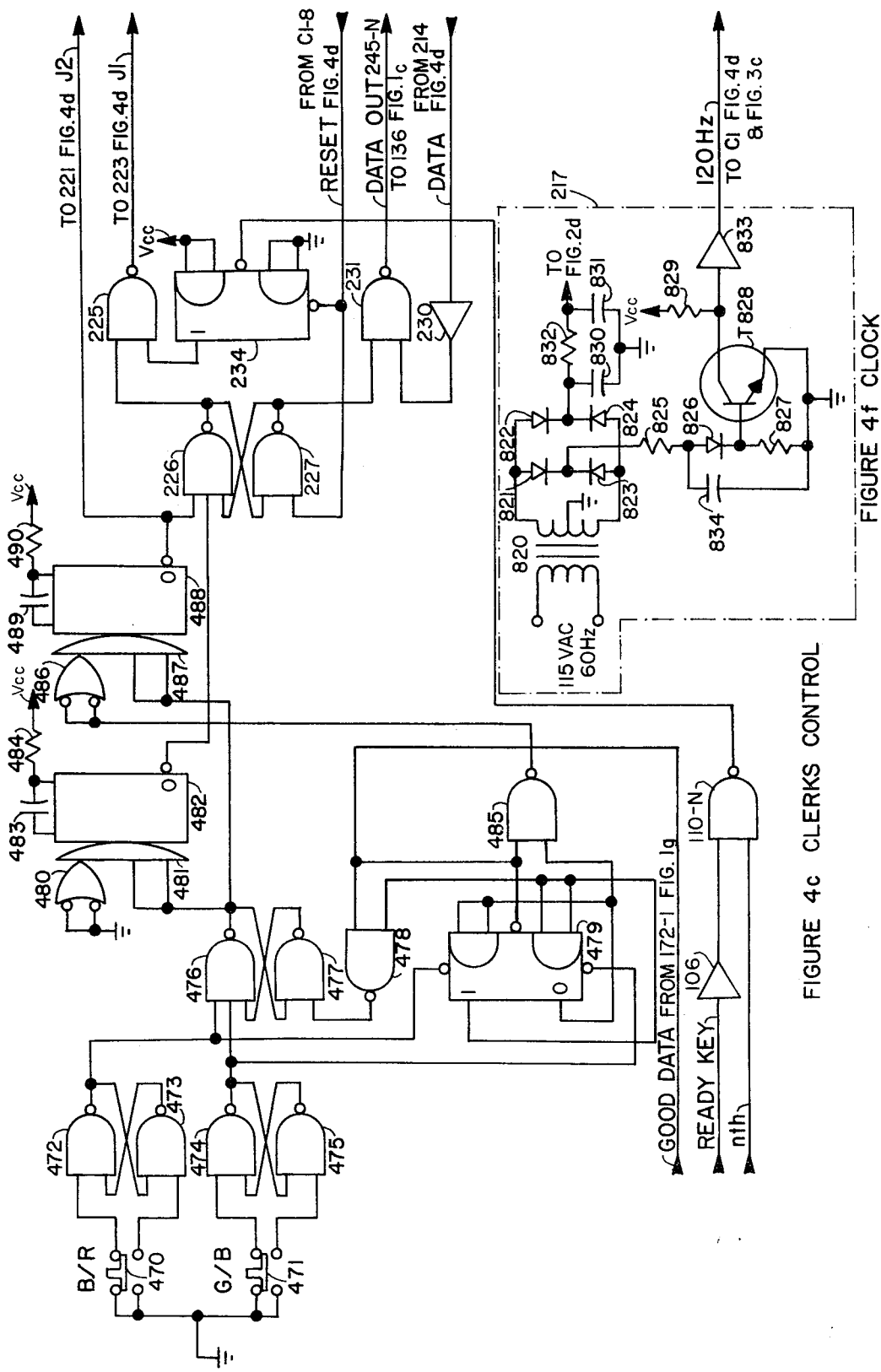

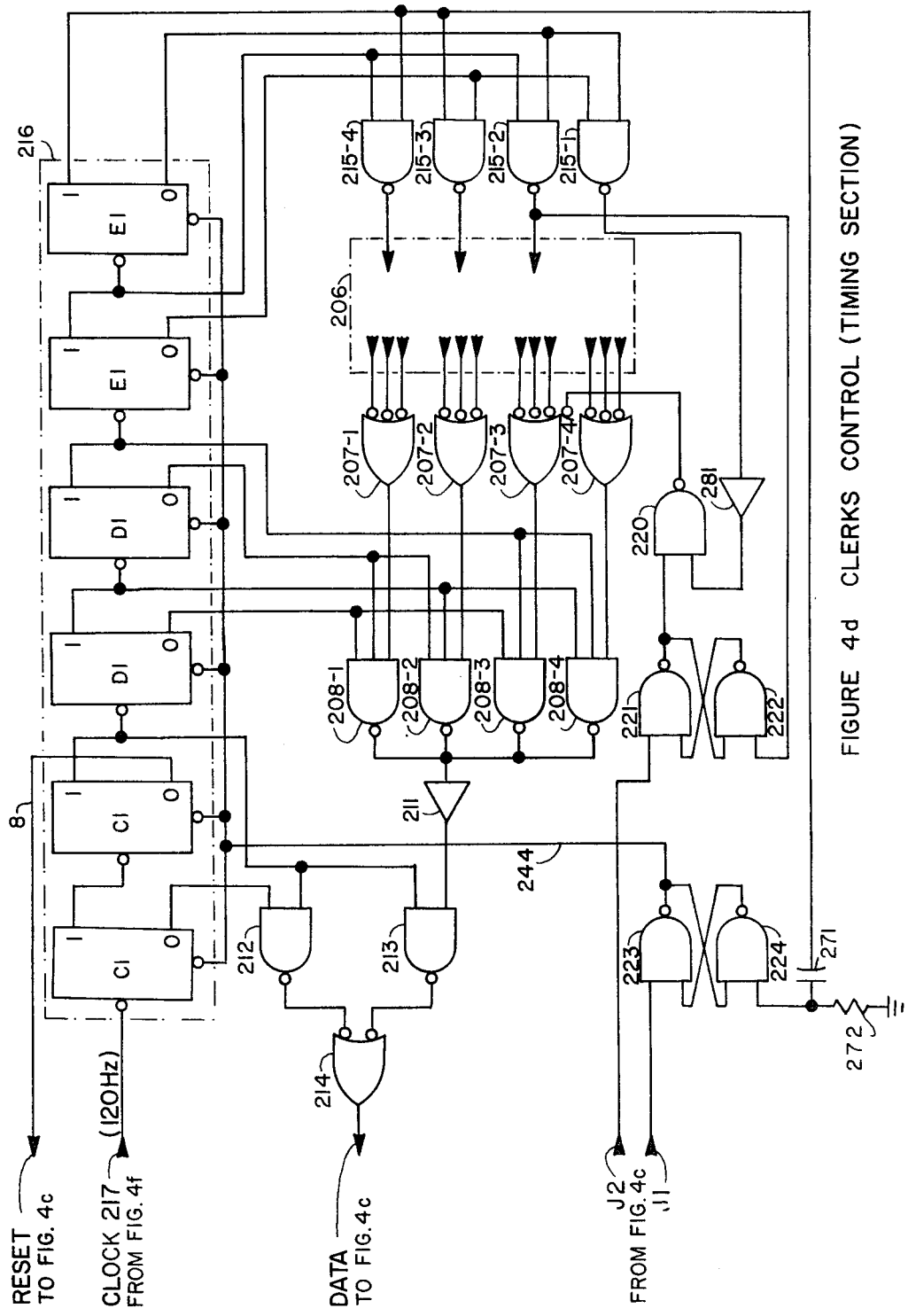
FIGURE 4d CLERKS CONTROL (TIMING SECTION)

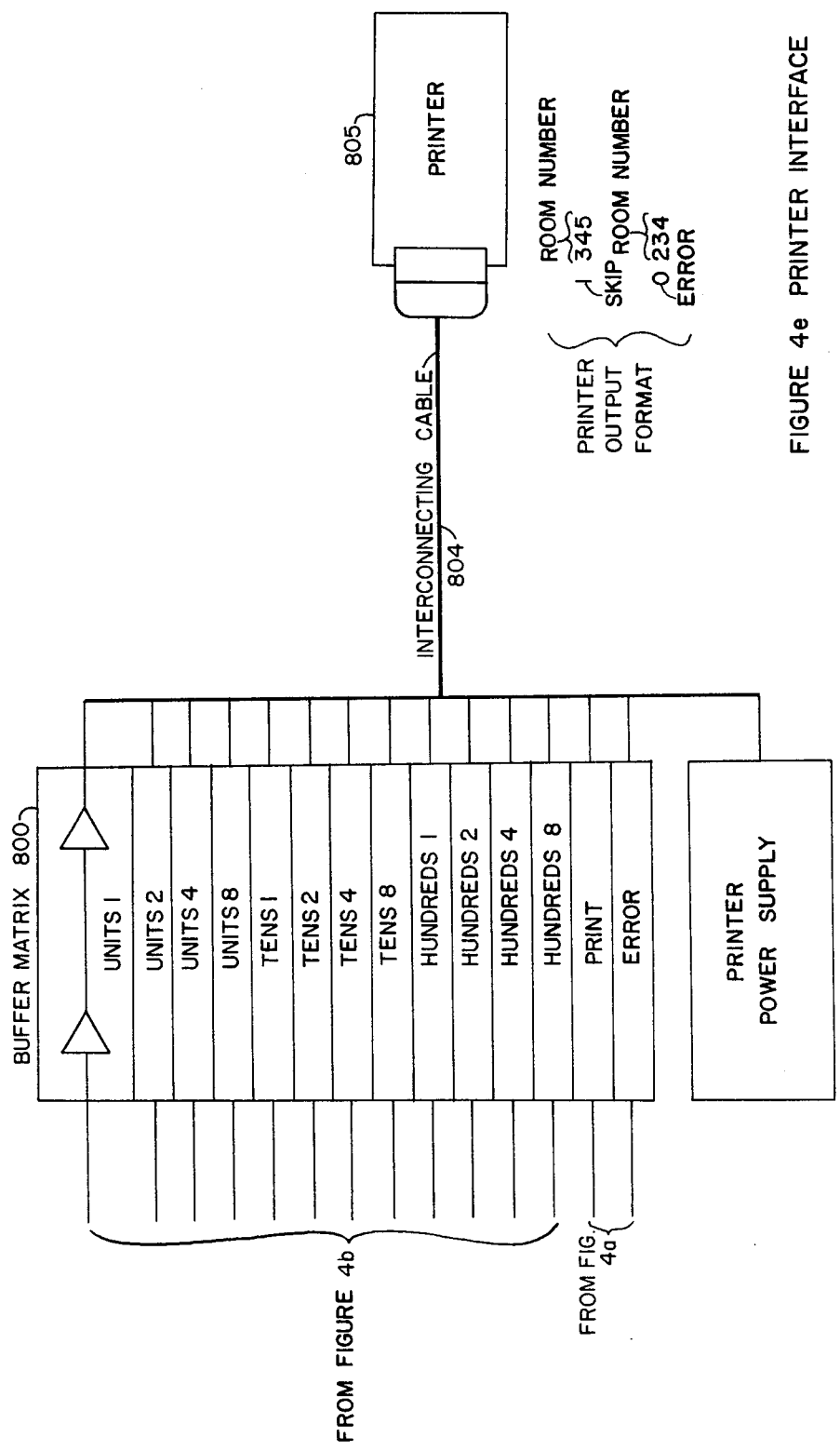
FIGURE 4e PRINTER INTERFACE

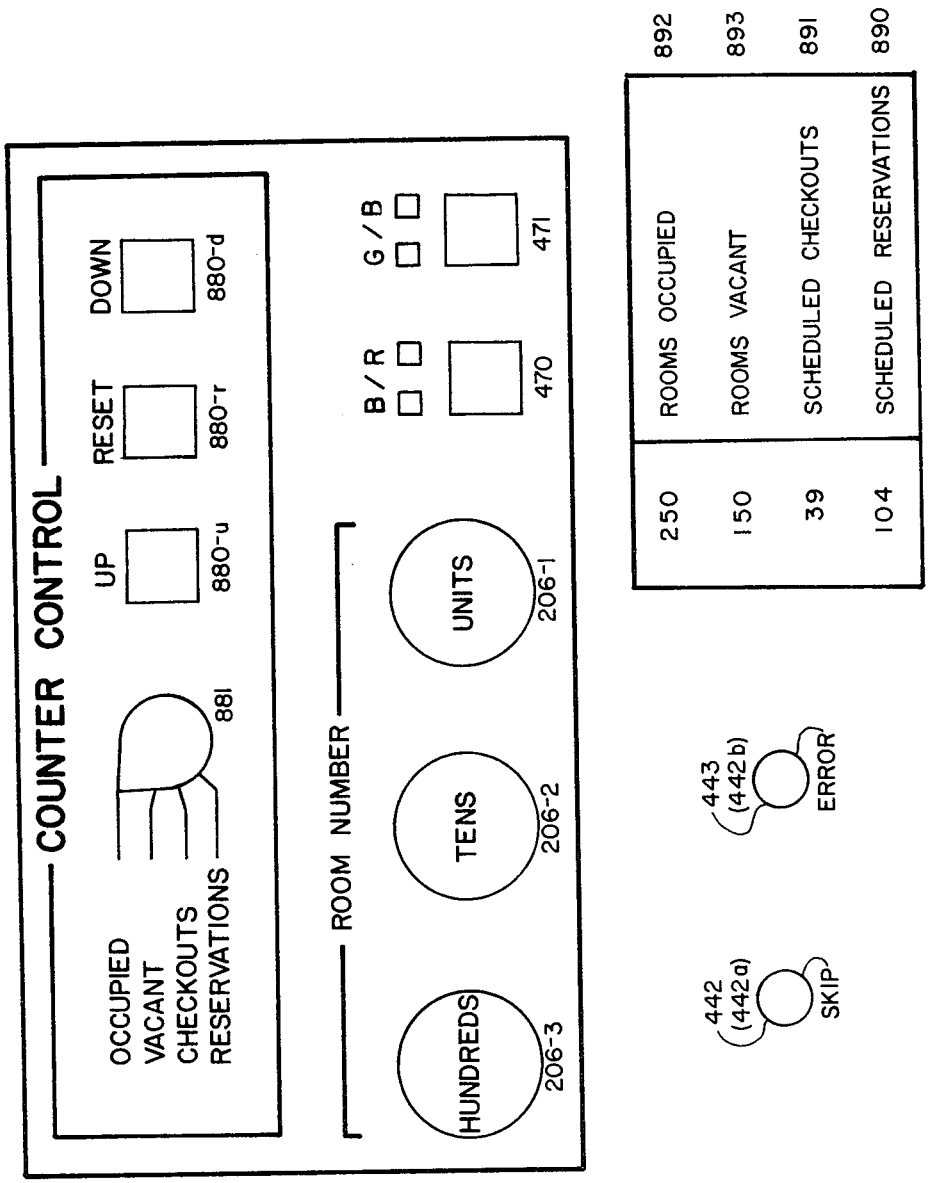
FIGURE 4g CLERKS CONTROL PANEL

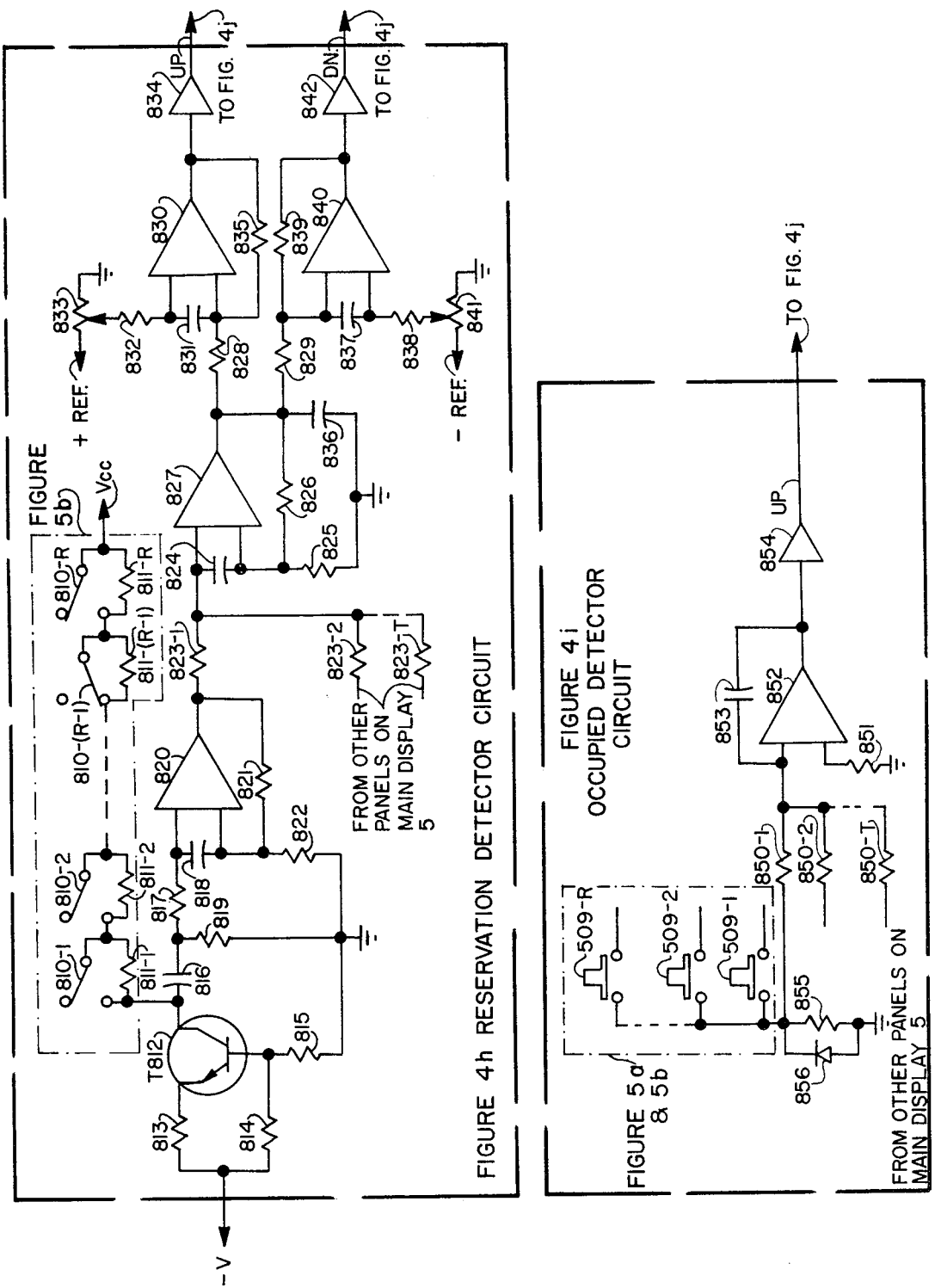
FIGURE 4h RESERVATION DETECTOR CIRCUIT
FIGURE 4i OCCUPIED DETECTOR CIRCUIT

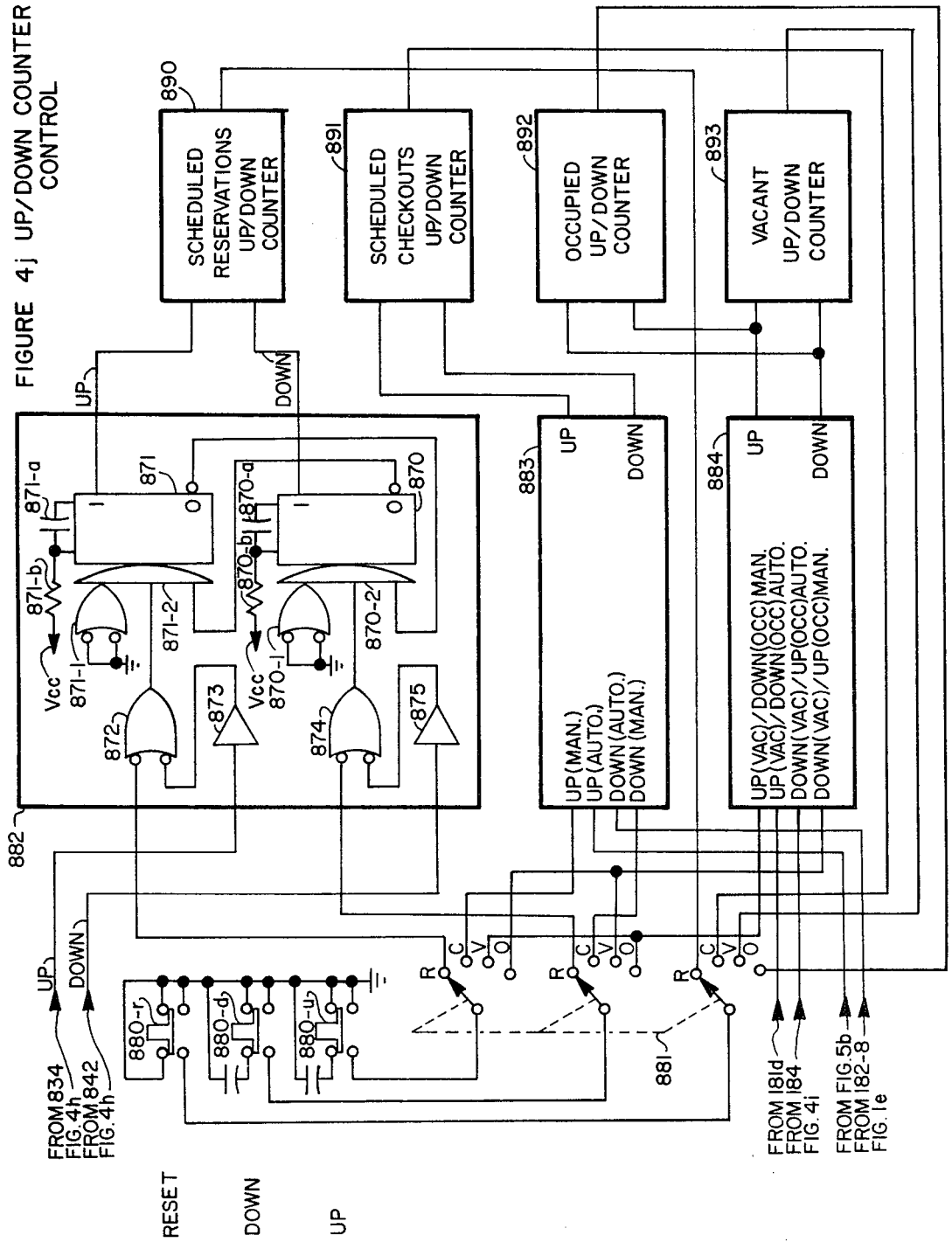

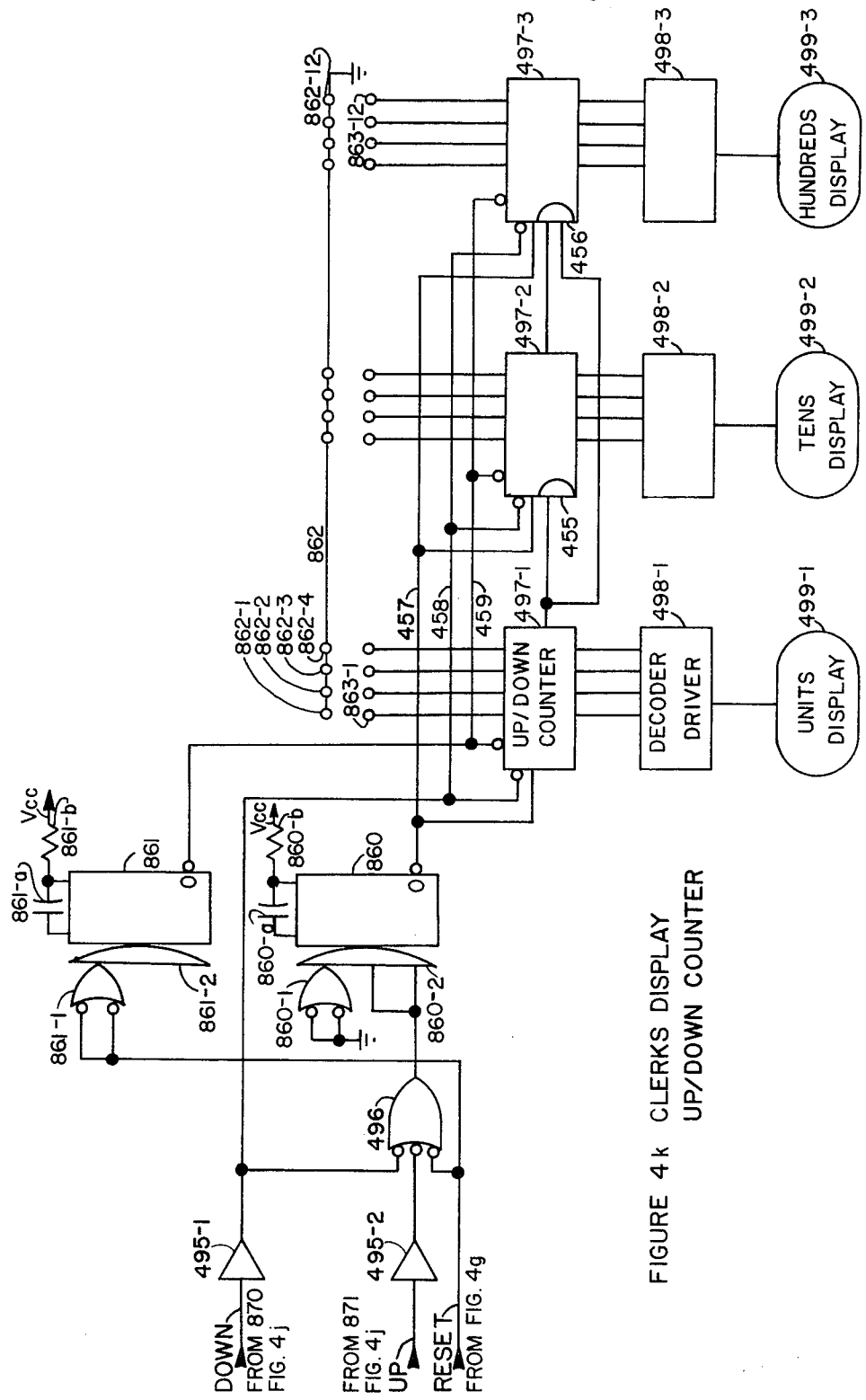
FIGURE 4k CLERKS DISPLAY UP/DOWN COUNTER

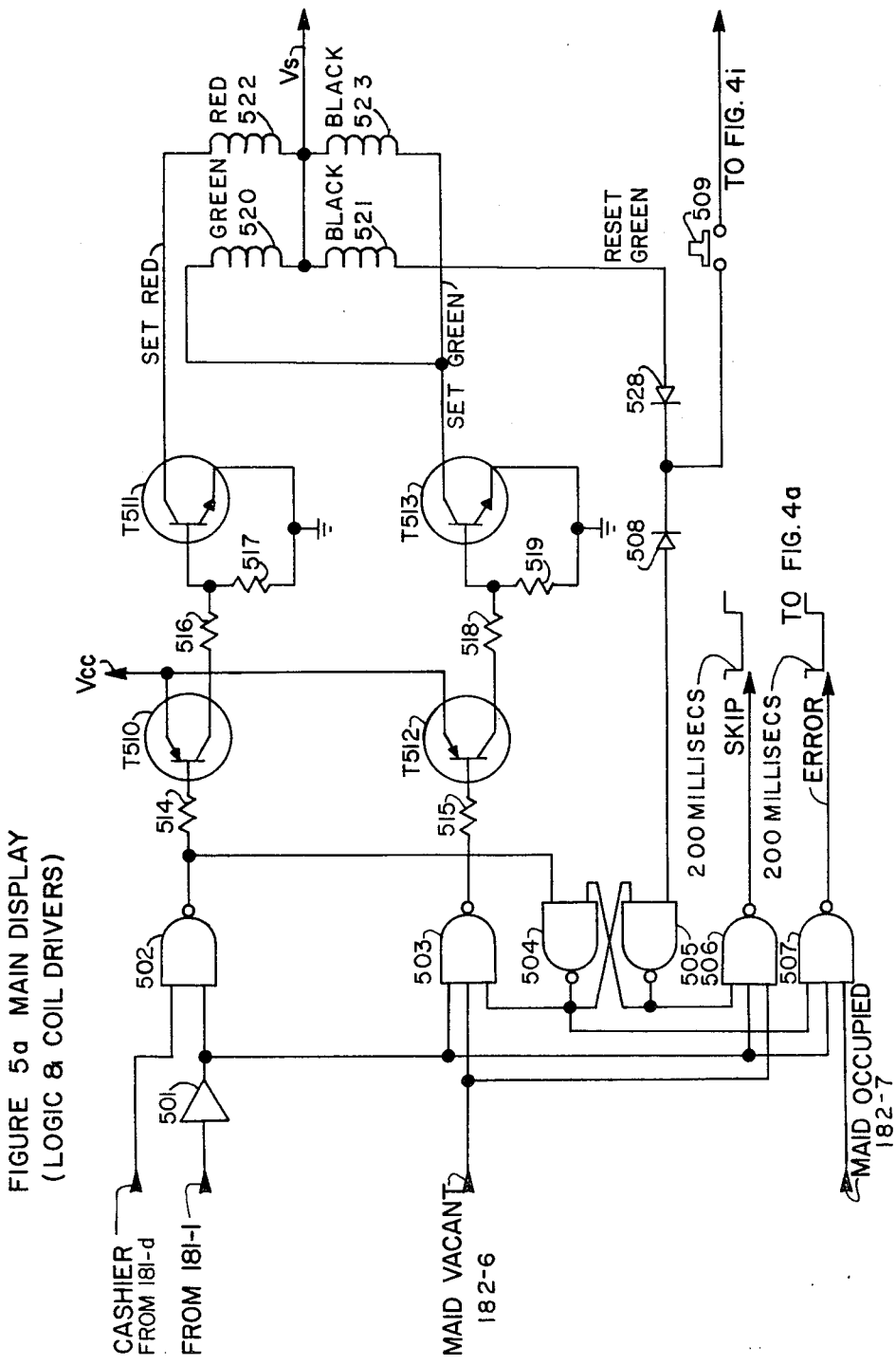

| PRESS TO RENT | ROOM NUMBERS | ROOM TYPE | STATUS | | SCHEDULED CHECKOUT | SCHEDULED RESERVATIONS |
|---|---|---|---|---|---|---|
| 509 FIG.5a ○ | | ○ | G | B | B B | 810-1 B B |
| ○ | | ○ | B | B | B B | 810-2 B B |
| ○ | | ○ | B | R | B B | B B |
| ○ | | ○ | G | B | B B | Y B |
| ○ | | ○ | B | B | O B | B B |
| ○ | | ○ | B | B | O B | Y B |
| ○ | | ○ | B | R | B B | Y B |
| ○ | | ○ | □ | □ | □ □ | □ □ |
| ○ | | ○ | □ | □ | □ □ | □ □ |
| ○ | | ○ | □ | □ | □ □ | □ □ |
| ○ | | ○ | □ | □ | □ □ | □ □ |
| ○ | | ○ | □ | □ | □ □ | □ □ |
| ○ | | ○ | □ | □ | □ □ | □ □ |
| ○ | | ○ | □ | □ | □ □ | □ □ |
| ○ | | ○ | □ | □ | □ □ | □ □ |
| ○ | | ○ | □ | □ | □ □ | □ □ |

FIGURE 5b

B = BLACK
R = RED
O = ORANGE
Y = YELLOW
G = GREEN

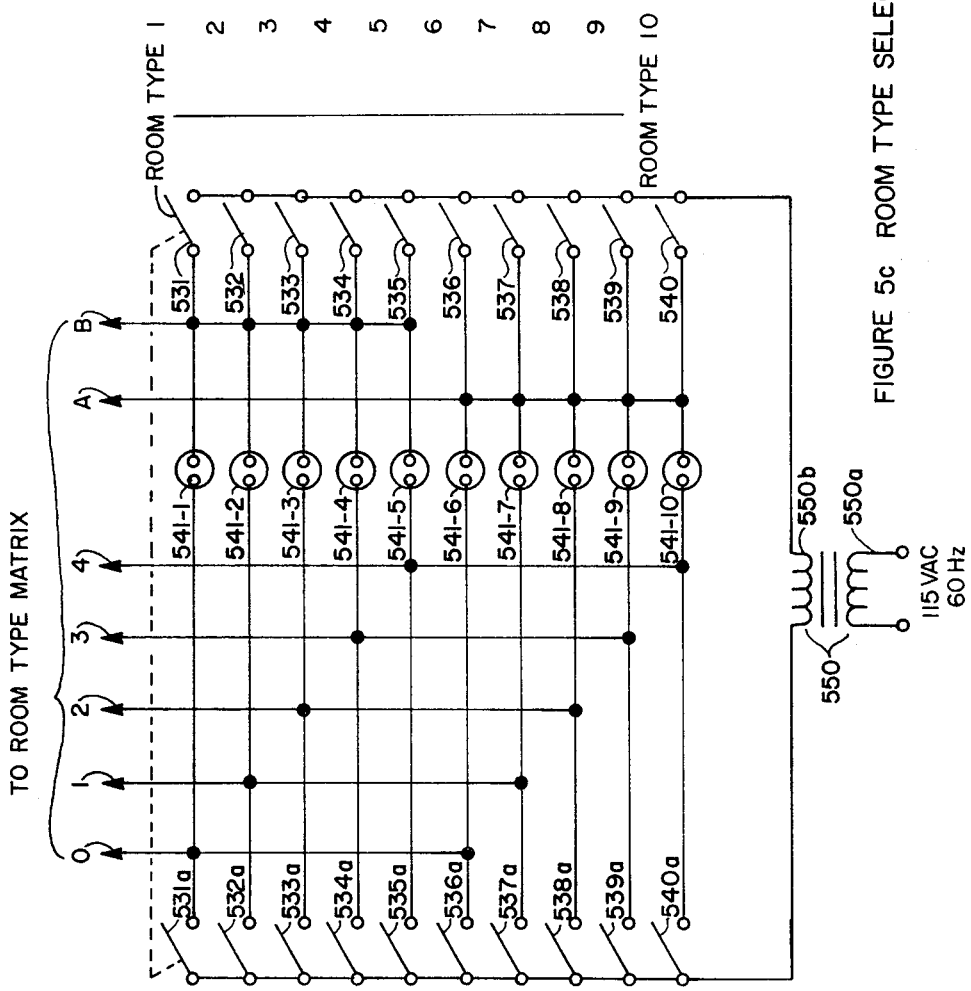
FIGURE 5c ROOM TYPE SELECT

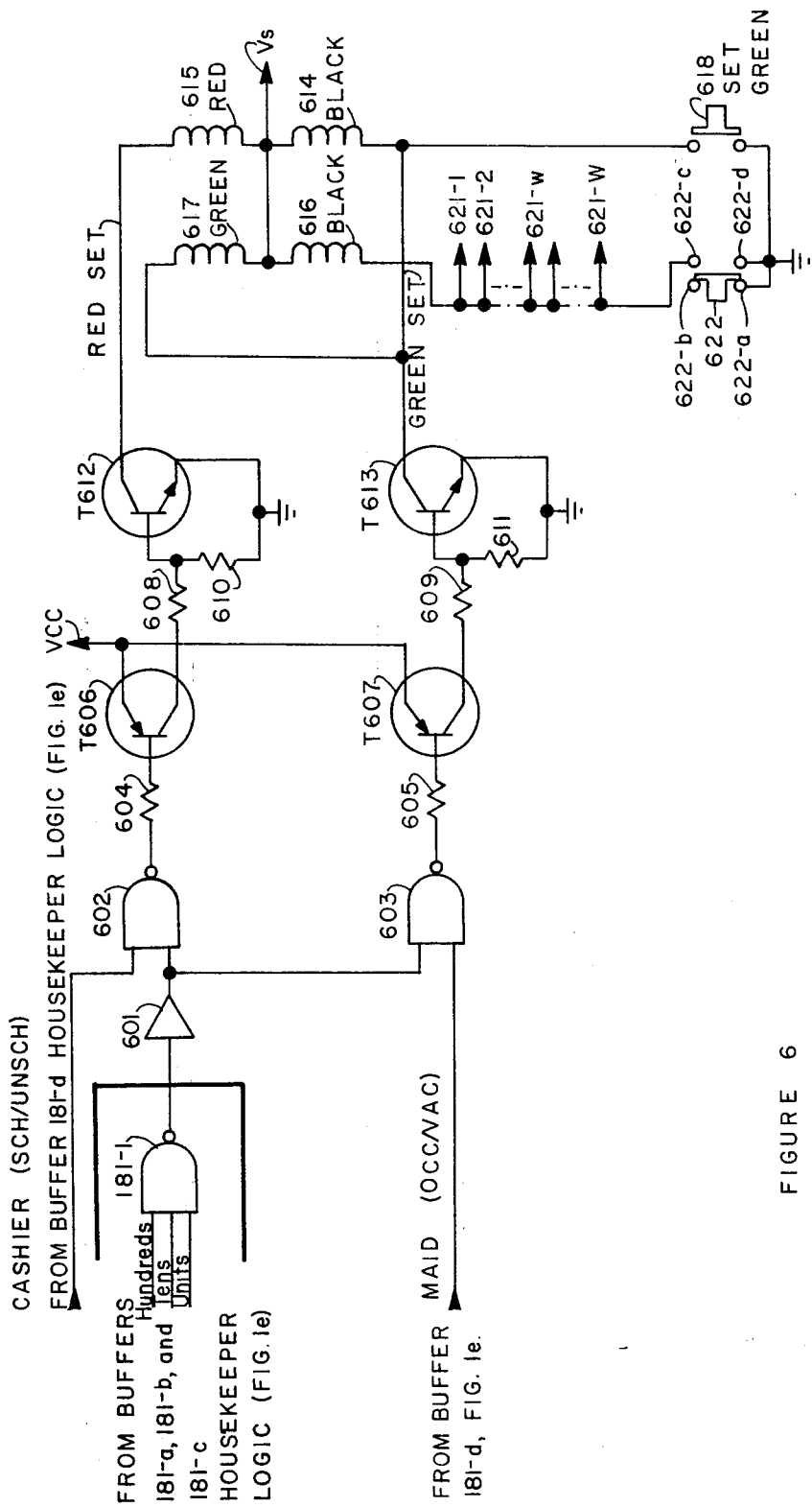
FIGURE 6  HOUSEKEEPER LOGIC AND DRIVER

ACOUSTICAL COUPLED TONE TRANSMITTER

TELEPHONE COUPLER
FOR RECEIVING DATA FROM REMOTE UNITS VIA TELEPHONE

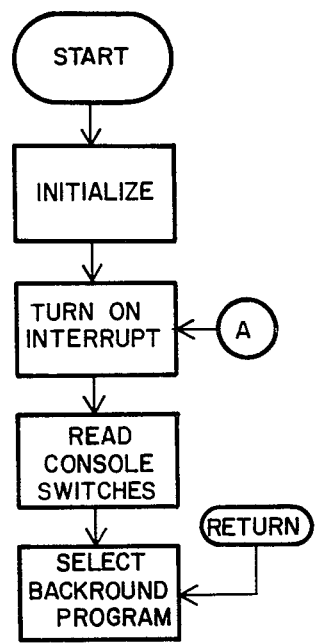
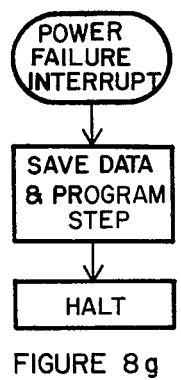
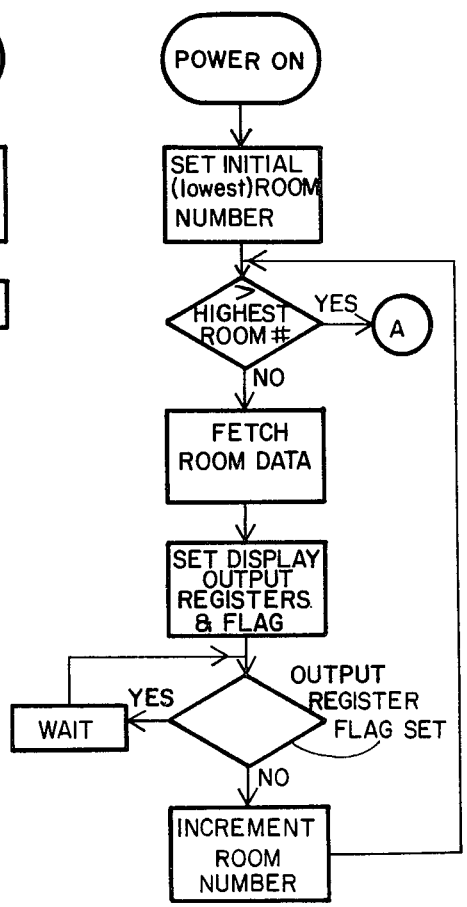
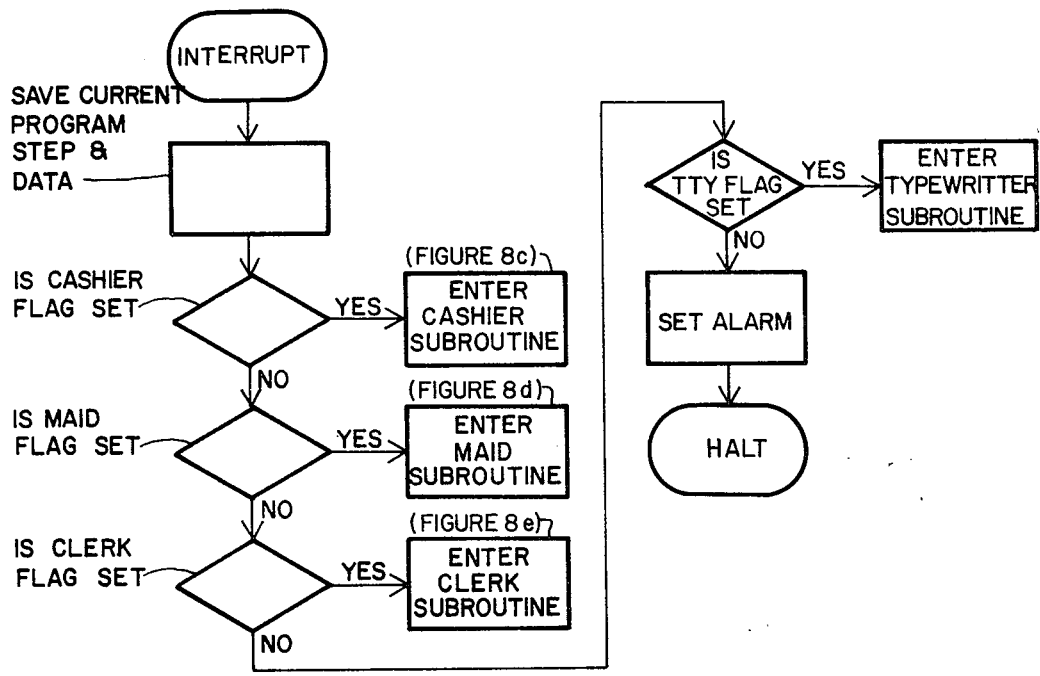

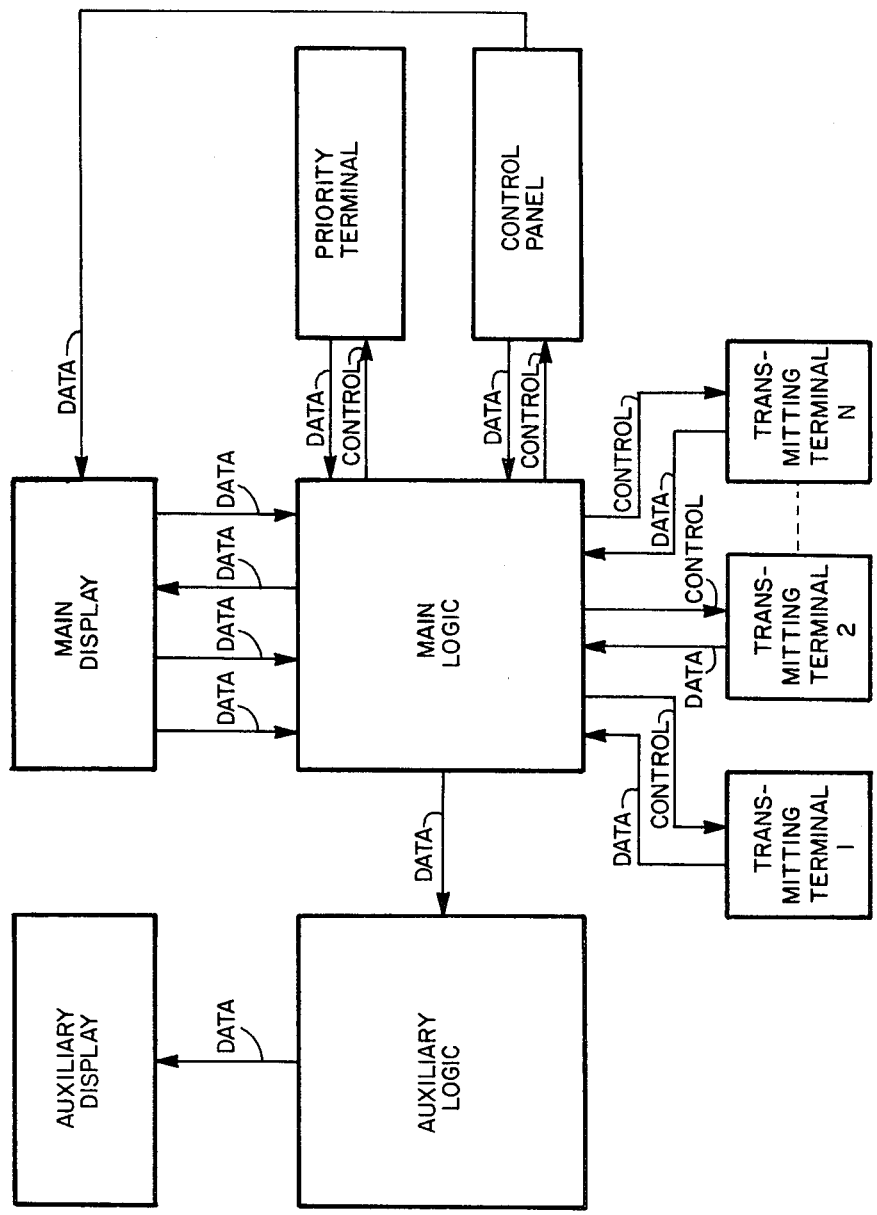
FIGURE 9 GENERALIZED STATUS SYSTEM

STATUS SYSTEM

CONTENTS

Abstract of the disclosure
Background of the invention
  Field of the invention
  Prior art
Summary of the invention
Description of the drawings
Detailed description
  Main terminal
    Pulse duration modulator 210
    Tone detector 235
    Pulse shaper and isolator 233
    Clock
  Main logic
    Scan ring 10 and control unit 11
    Pulse width detector 12 and decoder
    Auxiliary reset or fail-safe circuit
  Main display
    Main display panel, arrangement and color code
  Housekeeper display
  Clerk's control panel
    Error monitor and display
    Clerk's display panel, arrangement
    Up-down counters
  Cashier's terminal
  Auxiliary transmitting terminal using telephones
  Computer program logic
Claims

BACKGROUND OF THE INVENTION

1. Field of the Invention

This invention relates to systems for indicating the statuses of objects at different locations. This invention is particularly useful in indicating the statuses of hotel rooms.

2. Prior Art

Often it is necessary to monitor the statuses of objects such as rooms, bins, automobiles, or seats, to determine the condition of each object as a function of time. For example, in allotting seats on an airplane, the clerk must first determine whether a given seat is assigned or unassigned, and, after assigning that seat to a departing passenger, must re-label that seat as "occupied" to prevent another clerk from assigning the same seat to another passenger.

Similarly, in inventorying a warehouse, it is convenient to have a central display panel indicating the contents of selected bins or sections of the warehouse. Such a display would, for example, indicate the number of units present in a bin and the types of such units, as well as signal when the units in a bin drop beneath a minimum number.

In hotels, it is convenient for the desk clerk and/or housekeeper, to know whether a given room is occupied or vacant and whether or not it is made up. In addition, the desk clerk should know at all times the total number of rooms vacant. This ensures that at all times the hotel is aware of all rooms capable of being rented, thereby maximizing the income to the hotel.

In the automobile rental business, the rental clerk must know at all times the number of cars rented and the number of cars available to be rented. In addition, he must know which cars are being serviced and the type of service required for each car to ensure that all cars capable of being rented at a given time can be so rented.

One problem with prior art attempts to solve these and similar problems is that they required large numbers of people to constantly monitor and update the information about the objects being monitored. This is expensive. Moreover, the information gathered is only as accurate as the people are reliable. Errors often occur in this information, resulting in lost income and, consequently, lost profits.

To overcome some of these problems, systems have been proposed to monitor automatically the statues of objects. One prior art system for indicating the statuses of hotel rooms indicates not only the status of each room in the hotel, but theoretically at least, also the location of each maid in the hotel as well as the time each maid spends in a given room preparing the room for occupancy. However, this system requires transmitting stations in each room together with expensive, bulky conduits and conductors from each room to the central desk, the cashier, and to the housekeeper's office. Moreover, experience with systems typified by this system shows that people resent strongly the constant monitoring of their location, as well as the monitoring of their performance of a given task. In addition, the installation of conduits and multiple conductors for each room in an existing hotel usually requires the services of painters, carpenters, and other tradesmen. During installation guests are disrupted and rooms are put out of order resulting in lost income. As a result, acceptance of systems such as this prior art system has been slow both due to their high installation costs and the difficulty of convincing employees that they should use the system.

In addition, systems such as this prior art system contain no structure for detecting erroneous information entered by the room clerk, maid, inspectress, or cashier and thus occasionally indicate the wrong status for a room. If the system uses lamps to indicate status, constant maintenance is necessary to replace burned out lamps which give false or no information.

SUMMARY OF THE INVENTION

This invention, on the other hand, overcomes the problems of the prior art status systems by providing a system which cross-checks input data for accuracy and which indicates any inaccuracies in the input data by visibly identifying (as in a print-out) the object whose status is in error and the type of error. The system of this invention can be adapted to provide status information on a large variety of objects, ranging from hospital beds to airline seats to hotel rooms. The system uses either commonly available telephone lines or readily available twisted pairs for the transmittal of information from each transmitting station to the logic and display units. Information is transmitted from outlying stations to the logic unit in such a manner as to maintain the displayed status information reasonably up to date. The system detects and displays errors in status information arising from a wide variety of causes, including conflicting information put into the system by several different individuals.

According to this invention, a status system comprises a main logic unit together with a central display for displaying the status of each object being monitored, and a plurality of input or transmitting terminals for transmitting the status of each object to the main logic. The main logic sequentially and periodically interrogates each transmitting terminal to determine if information has been placed at that terminal for processing by the main logic. Upon detecting such information at a transmitting terminal, scanning of the transmitting terminals stops and the information in the transmitting terminal is transferred to the main logic. If conflicting information concerning a given object is transmitted to the main logic at different times, the object about which the conflicting information has been received is identified on a display panel together with the type of error. This allows individuals to check out and correct the error. Priority in data transmission to the main logic is given to information transmitted from a selected input terminal.

One embodiment of this invention is particularly suitable for displaying the statues of rooms in hotels or motels. This particular embodiment contains a main logic unit which operates upon data transmitted from a plurality of transmitting terminals — called maid terminals — located throughout the hotel, a cashier's terminal and a clerk's control panel. The transmitted data is operated upon in the main logic and then displayed so as to indicate the status of each room in the hotel. A main display indicates three conditions: whether the room is (1) occupied, (2) vacant and not-made-up, or (3) vacant and made-up, ready for a new occupant. The information on the main display is capable of being corrected or updated not only by new information from the maid terminals, but also by information placed into the system by the room clerk and the cashier. The room clerk can change the status of any room to any status that may be desired. The cashier, at the time the occupant of a room checks out, has priority over any maid terminal to change the status of the room from "occupied", to "vacant-not-made-up." The clerk's display, in addition, contains a running count of total rooms occupied, total rooms vacant, total number of rooms from which the occupants are scheduled to check-out, and total number of rooms reserved for new occupants.

When a person checks into a room, the rooms-occupied count increases by one while the rooms-vacant count decreases by one. If the person had previously made a reservation, the reservation count simultaneously decreases by one. When a person checks out, the cashier indicates whether the check-out was scheduled or unscheduled, and if scheduled, the scheduled check-out count decreases by one. Thus at any instant, the status of each and all rooms in the hotel, whether occupied or vacant, and if vacant, whether ready to rent, is indicated. Likewise, the total expected check-outs for the day as well as the total number of rooms reserved are also indicated on the display.

In addition, a switch allows the clerk to high-light on the main display all rooms of a given type, such as rooms with a double bed, rooms with twin beds, rooms with king-type or queen-type beds, or rooms with sitting areas and extra features. By quickly perusing the color code adjacent such high-lighted rooms, the clerk can instantly determine the status of each such room by type. This facilitates the prompt registration of guests. For example, if a guest requests "twin beds" the clerk presses the "twin-bed switch" which then prominently high-lights each such room of that type. The clerk then sells a specific room of that type shown as "vacant, made-up."

The housekeeper likewise possesses a display controlled by the main logic. However, the housekeeper's display, while similar to the main display, is considerably simpler, showing only the rooms to be "made-up" and the rooms already made up. In addition the rooms that have been cleaned while occupied and then subsequently vacated are also indicated and differentiated from those rooms requiring complete clean-up. This is important because it aids the housekeeper to use efficiently her employees. The logic and the driving circuits are similar to those used in the main display.

The information sent to the main logic is derived primarily from a plurality of transmitting terminals called "maid terminals." Maid terminals are placed conveniently throughout the hotel. Each hotel maid is given a set of rooms to clean and make up for occupancy. Before a room is considered ready for occupancy, the room is usually inspected by a housekeeper. After inspecting a series of rooms, the housekeeper goes to the nearest maid terminal—located, for example, in a linen closet—and, with respect to each room, enters the room number and pushes an "occupied" or a "vacant" status button to denote that the room is made up. The transmitting terminal converts the digital room number into binary code signals and likewise converts the room status into a binary code. Sixteen bits of binary information are usually adquate to transmit both the room number and its status to the main logic. More bits can, of course, be used, if necessary.

The main logic continuously scans, at a selected frequency, all maid terminals and the clerk's control, which appears to the main logic as a main terminal. When the scanning circuit detects the pressing of a status button at a given maid terminal, scanning immediately stops, and a tone signal is sent to activate that transmitting terminal. The binary information representing the room number and its status is then transmitted serially at a selected frequency to the main logic. A binary one is represented by a pulse of a long duration, while a binary zero is represented by a pulse of a short duration. Thus the binary information is encoded using PDM techniques. Other encoding techniques could be used, if desired. But the PDM technique used is particularly advantageous in that the data pulses so generated can later be used as a source of clocking pulses at various places in the system.

The main logic stores the transmitted data in buffer shift registers. The data is converted into parallel form in serial-to-parallel converters and then is used to control a switching matrix. The switching matrix automatically shunts the vacant or occupied status signal to the correct driving circuits in the main display and in the housekeeper's display. These driving circuits then change the status code—usually a combination of colors—visible to the room clerk on the main display adjacent to the room number. If the room is vacant, but made up, the color shifts, for example, from "Black-Red" to "Green-Black." If the data indicates that the room is made up but occupied, the color stays at "Black-Black" at the clerk's display and shifts to "Green-Black" at the housekeepr's display.

Often, the status information transmitted to the main logic from a maid terminal is in conflict with the information placed into the main logic by the cashier or the clerk. For example, the cashier may have received full payment from, and checked out, the person occupying the room. The cashier thus transmitted a signal to the main logic indicating the room to be vacant, in need of being made-up. After the room is made-up, however, the inspector may have indicated the room to be occupied. This conflict between the cashier and the inspector activates an error monitor on the clerk's display which then shows the number of the room whose status is in error as well as the type of error. The clerk or the housekeeper then dispatches a person to check out the status of the room. This type of error is important to detect and record because it can discomfort and inconvenience a guest and the hotel employees. For example, placing a guest in a still occupied room embarrasses all concerned, confuses the delivery of messages, and often leads to incorrect billing.

A second type of error is known as a "skip." The inspector transmits to the main logic the fact that the room is vacant. However, the cashier has no record of the person occupying the room having checked out. Immediately, the room number is again displayed on the clerk's display together with the fact that the error is a skip type. This type of error must also be immediately detected and corrected because an "occupied" room that is actually vacant is not earning revenue. A "skip" can be caused by a variety of circumstances. For example, a guest can leave without paying his bill; a guest can have a charge account and simply depart without stopping at the cashier; and a cashier can make an error in reporting a check-out therefore carrying the room as still occupied.

The status system of this invention provides an instantaneous inventory of the status of the rooms in a hotel. Each transmitting terminal including the clerk's control panel and the cashier's terminal, as well as the maid terminals, is connected to the main logic by a simple twisted pair, such as is used with a telephone. Because the signals are transmitted from the station at low frequencies, well within the frequency bandwidth of the twisted pair, the installation of this computer is greatly simplified compared to the installation of prior art status systems. Moreover, in some situations, the transmitting stations can be connected directly to telephones within the hotel, thereby using the existing wiring in the hotel. A wide variety of transmission methods including wireless, can also be used with this invention. The status system of this invention is in one embodiment, hard wired and thus requires no programming. Consequently, the computer is extremely simple to operate. Alternatively, this system can be implemented with an appropriately programed general purpose computer.

DESCRIPTION OF THE DRAWINGS

FIG. 1 is a schematic block diagram showing the interrelationship of the functional units of the status system of this invention adapted for use in a hotel or motel;

FIG. 1a shows in more detail Main Logic 1 shown in FIG. 1;

FIGS. 1b and 1c show in more detail the scan ring, data dates and logic of Main Logic 1 in FIG. 1;

FIGS. 1d and 1e show the logic of the pulse width detector, decoder, and series-to-parallel converter shown in FIG. 1a;

FIG. 1f shows the wave forms at various positions in the pulse width detector shown in FIG. 1d;

FIG. 1h shows a typical NAND gate for detecting the room number transmitted through buffers 181-1 through 181-3.

FIGS. 2a and 2b show the logic of a typical maid terminal shown in FIG. 1;

FIGS. 2c and 2d show in more detail the shift register 216, tone detector 235, and pulse shaper and isolater 233 shown in FIGS. 2a and 2b;

FIGS. 3a,3b,3c and 3d show the logic of the cashier's terminal 3 in FIG. 1;

FIGS. 4a, 4b, 4c, and 4d show the logic associated with the clerk s control panel, including the skip/error register and the digital counters and display shown in block 4 of FIG. 1;

FIG. 4e shows schematically a printer used to print out the numbers of the rooms the statuses of which are in conflict, together with the code identifying the type of conflict;

FIG. 4f shows clock 217.

FIG. 4g shows the arrangement of the switches, buttons and displays on the Clerk's Control Panel 4;

FIGS. 4h, 4i, 4j and 4k show the detection and logic circuits used to control the up/down counters which retain the numbers displayed on the Clerk's Control Panel (FIG. 4g) giving reservations, scheduled checkouts, occupancies and vacancies.

FIG. 5a shows the coil drivers and the skip/error signal generators associated with Main Display 5 in FIG. 1;

FIG. 5b shows the arrangement of the switches and numbers on the Main Display Panel and explains the color code used in this invention;

FIG. 5c shows the room-type select logic;

FIG. 6 shows the logic and driver circuits associated with Housekeeper's Display 7 in FIG. 1;

FIGS. 8a through 8h show the logic used to program a general purpose computer to perform the logical functions performed by the special purpose computer shown in FIGS. 1 through 7c; and FIG. 9 shows the various functional units of a status system, constructed according to the principles of this invention, suitable for monitoring the statuses of any one of several types of objects.

DETAILED DESCRIPTION

Figure 1G:
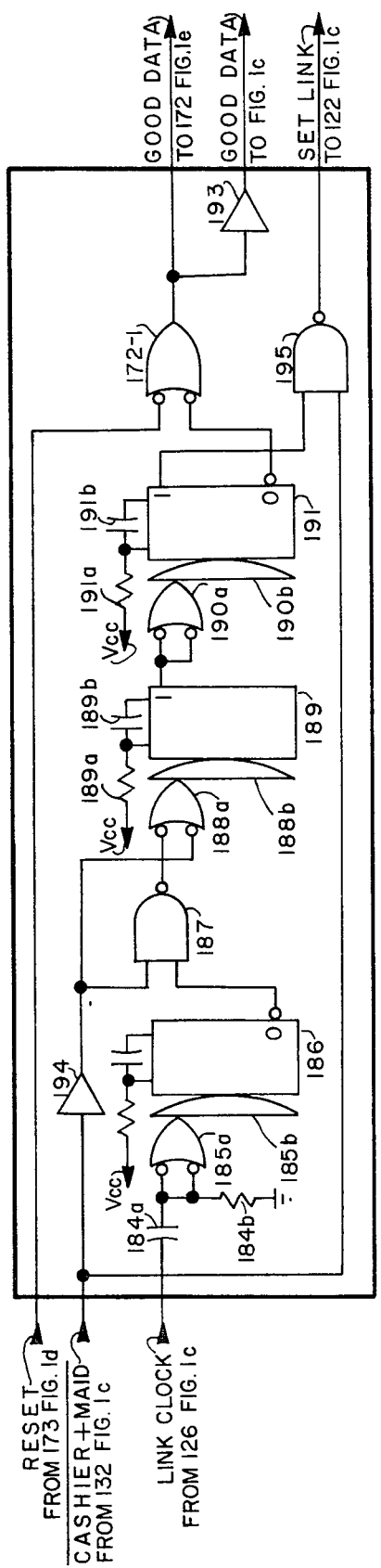
FIG. 1g shows the auxilary reset pulse generator used to restart the system in the event of malfunction.

The specific embodiment of the computer of this invention described below is suitable for use in a hotel or motel. However, it should be understood that this description is exemplary only and that the status computer of this invention can be used to indicate the statues of a wide variety of other objects, the conditions of which must be monitored.

A status system suitable for use in a hotel is shown in schematic block form in FIG. 1. In the following explanation, those drawings describing the logic or circuitry contained in a given functional block of FIG. 1 are numbered with the same number used to denote that block in FIG. 1, followed by a letter. This simplifies the correlation of the various drawings to the functional units shown in FIG. 1.

The drawings accompanying this specification do not, of course, show all the circuitry of the computer. Rather, these drawings are selected to illustrate the logic employed in each of the functional units of the computer. To avoid unwarranted redundancy, however, only one logic circuit of a given type is shown and described in detail in the specification, even though the actual computer may contain a plurality of such circuits.

In the status system shown in FIG. 1, signals from a maid terminal 2-i identifying a room and its status are transmitted to main logic 1. From main logic 1, control signals derived from these signals are used to control the status displayed adjacent the room number on main display 5. Similar signals derived in housekeeper logic 6 control the status displayed adjacent this same room number on housekeeper display 7. Signals from cashier terminal 3, or the clerk's control 4 also control the status displayed adjacent a room number on both displays 5 and 7.

The description of the status system which follows begins with a description of Maid Terminal 2-i, where i is an integer representing the ith of the N maid terminals, and N is an integer representing the total number of maid terminals used with the status computer. The data input to the computer from the ith maid terminal will then be followed through Main Logic 1 to Main Display 5, Housekeeper Logic 6 and Housekeeper Display 7. Conflicts between data from a maid terminal and Cashier's Terminal 3 will be shown to influence the error monitor at the Clerk's Control Panel 4. The Cashier's Terminal 3 and the Clerk's Control Panel 4 will then be described.

Then, an alternative structure for transmitting information to Main Logic 1 using telephones will be described. Finally, the logic associated with an implementation of the status system of this invention on a general purpose digital computer will be described.

The logic symbols used in the drawings will be similar to those described in MIL-STD-806B. Where deviations occur, the functions represented by the symbols shown will be obvious from the text.

MAID TERMINAL

FIGS. 2a and 2b show schematically the logic at a Maid Terminal. To transmit information concerning the status of a room to the Main Logic, the housekeeper first enters the room number into the Maid Terminal by setting dials 201–1 through 201–3 (FIG. 2a) on switches 206–1 through 206–3 to the decimal numbers corresponding to the room number. These decimal numbers are converted directly into binary-coded-decimal by having the setting of each dial 201–1 through 201–3 connect to a potential source selected ones of four contacts contained within converters 202–1 through 202–3. The potential on these selected contacts is then lowered at a selected time by a low-level signal from a corresponding potential source (NAND gates 215–2 to 215–4). The low level output signals on the selected contacts represent binary ones, while the normal high level output signals on the other contacts represent binary zeroes. The combined low level and high level signals represent in binary form, the decimal number set on the corresponding switch dial.

Switch 206–1 converts the units digit of the decimal number placed in dials 201 into binary, switch 206–2 converts the tens digit of this decimal number into binary, while switch 206–3 converts the hundreds digit of this decimal number into binary.

The decimal number represented by the setting of each dial is retained in the switch by the dial setting until the dial is reset.

After setting the room number in dials 201–1 through 201–3, the housekeeper next presses either "vacant" button 240 or "occupied" button 241 (FIG. 2b). "Vacant" button 240 is pressed when the guest formerly in the room has removed his luggage from the room and the room is made-up, ready for a new occupant. "Occupied" button 241 is pressed to indicate that the guest still occupies the room, but that the room is made-up.

As shown in FIG. 2b, "vacant" switch 240 normally is in contact with nodes 240a and 240b so as to short-circuit capacitor 240e. Because node 240b is at ground potential, the voltage on both sides of capacitor 240e is at ground potential. Similarly, "occupied" switch 241 is normally in contact with nodes 241a and 241b so as to short-circuit capacitor 241e. Because node 241a is at ground potential, both sides of capacitor 241e are also at ground.

The pressing of either "vacant" button 240 or "occupied" button 241 results in applying the voltage $V_{cc}$ (the normal voltage of nodes 240d and 241d) to one side of either capacitor 240e or 241e respectively. Initially there is zero charge on both capacitor 240e and 241e. Thus when button 240 or 241 is pressed, a surge of current flows through either resistor 242 or 243, respectively, with the result that the voltage on line 242a or 243a drops suddenly from $V_{cc}$ to essentially ground. As either capacitor 240e or 241e charges, however, the voltage on either line 242a or 243a, respectively, exponentially rises to the supply voltage $V_{cc}$. Thus pressing either the "vacant" or "occupied" button results in a negative voltage pulse being applied to NAND gate 226. Consequently the output signal from NAND gate 226 shifts from a normally low value to a high value. This shift is coupled to one input lead each of NAND gates 225 and 227.

NAND gates 226 and 227 are cross-coupled together to form a bistable flip-flop. The rise in output signal level from NAND gate 226 is applied to one input lead to NAND gate 227. On the other input lead to NAND gate 227 is the normally high level signal on lead C1–8 from shift register 216 (to be explained later). Thus the output signal from NAND gate 227 drops from a high to a low level. This low level signal is coupled back to the other input lead to NAND gate 226. Thus the output signal from NAND gate 226 will remain high despite the exponential rise of the output voltage on either lead 242a or 243a back to $V_{cc}$.

The output signal from NAND gate 227 is also used to change the state of a flip-flop consisting of cross-coupled NAND gates 275 and 276. Normally, both input leads to NAND gate 275 contain high level signals. Thus the output signal from NAND gate 275 is a low level signal. Consequently, current flows from voltage source $V_{cc}$ through resistor 277 to ground through a ground connection in NAND gate 276. With the receipt, however, of a low level output signal from NAND gate 227 on one input lead to NAND gate 275, the level of the output signal from NAND gate 275 changes from low to high. This high level signal cuts off current flow through resistor 277 and is transmitted to one input lead to NAND gate 276. The other input lead to NAND gate 276 is connected to the output lead from "units" enabling NAND gate 215–4. The output signal from NAND gate 215–4 is normally high. Consequently, the level of the output signal from NAND gate 276 drops from normally high to low. Thus current now flows from voltage source $V_{cc}$ through the filament of bulb 279 to ground. Light 279 thus turns on, indicating that data is to be transmitted from the Maid Terminal. Light 279 remains on until, as will be described later, units NAND gate 215–4 is enabled to allow the transmission of the binary information representing the unit digit in the room number whose status is being transmitted. At this time, when data transmission from the Maid Terminal is three quarters complete, light 279 is turned off by changing cross-coupled NAND gates 275 and 276 back to their normal states. Light 279 could, if desired, be turned off at the end of data transmission.

The output signal from NAND gate 226 is also transmitted to one input lead to NAND gate 225. Normally, in the absence of a tone signal from Main Logic 1 (FIG. 1) received on lead 245, the signal levels on both input leads to NAND gate 225 are low. Thus the normal output signal from NAND gate 225 is high. The rise in the level of the signal from NAND gate 226 from low to high is not sufficient, by itself, to drop the level of the output signal from NAND gate 225 from its normally high level to a low level. To do this the levels of both input signals to NAND gate 225 must rise from low to high.

The other input signal to NAND gate 225 is taken from the "1" output lead of flip-flop 234. This signal is normally low level. However, pressing of either "vacant" or "occupied" button 240 or 241 respectively, changes the output signal from NAND gate 227 from normally high level to low level and thus changes NAND gate 231's output signal from normally low level to high level. (The signal levels on both input leads to NAND gate 231 are normally high.) This high level signal is transmitted through pulse shaper and isolator 233 and, on lead 245, to the scan ring 10 in Main Logic 1 (FIG. 1a). There, as will be seen later when the Main Logic is described, this high level signal disables the scan ring and allows a tone signal to be transmitted on lead 245 to the Maid Terminal for a selected time, typically about 50 milliseconds. This tone signal is transmitted from lead 245 through blocking capacitor 236 to tone detector 235.

Flip-flop 234 changes its state in response to a negative going change in signal level from tone detector 235. During the 50 milliseconds that the tone signal is transmitted from Main Logic 1 (FIG. 1), the output signal from tone detector 235 gradually rises to a maximum value. The tone signal then stops and the output signal from tone detector 235 begins decaying back to its initial value. About 30 milliseconds after this decay begins, flip-flop 234 is switched such that the signal level on its 1 output lead goes from low to high. This signal is applied to one input lead to NAND gate 225. Because the other input lead to NAND gate 225 is high, indicating that either a "vacant" or an "occupied" button has been depressed, the output signal from NAND gate 225 switches from a high to a low level.

A drop in the level of the signal from NAND gate 225 from high to low changes the output signal from NAND gate 223 from a normally low to a high level. This high level output signal is transmitted on lead 244 to divider 216. The normally low signal level on lead 244 normally prevents the individual flip-flops within divider 216 from being toggled by the output signals from clock 217. The rise in signal level on lead 244, however, enables these flip-flops allowing them to be driven by the signals from clock 217. Thus, even though either "vacant" button 240 or "occupied" button 241 has been depressed, the receipt of a tone signal is essential to enable divider 216.

NAND gate 223 is cross-coupled with NAND gate 224 to form a bistable flip-flop. One input lead to NAND gate 224 is connected to the output lead from NAND gate 223. The other input lead to NAND gate 224 is connected at node 271a between capacitor 271 and resistor 272. Resistor 272 is typically around 100k ohms or larger. Capacitor 271 couples this input lead to lead E1–9 from divider 216. Normally, this input lead is held at a high level by the current from NAND gate 224 through resistor 272. When, however, the output signal on lead E1–9 changes, in a manner to be described later, from a high level to a low level at the end of data transmission, a momentary negative signal pulse is produced at node 271a by capacitor 271 differentiating this change. This negative pulse shifts the level of the output signal from NAND gate 223 from high back to its normal low. This occurs only after all the data has been transmitted from the Maid Terminal.

The signal level from NAND gate 222, cross-coupled with NAND gate 221 to form a bistable flip-flop, indicates whether or not "vacant" button 240 or "occupied" button 241 has been pressed. Pressing of "occupied" button 241 has no effect on the level of the signal on lead 246. Thus the output signal level from NAND gate 222 remains normally high when "occupied" button 241 is pressed. However, when "vacant" button 240 is pressed, a negative-going signal pulse is transmitted on lead 246 to one input lead of NAND gate 221. The drop in voltage on lead 246 changes the level of the output signal from NAND gate 221 from low to high. This high level signal is transmitted to one input lead to NAND gate 222. The signal level on the other input lead to NAND gate 222, derived from the "hundreds" enabling gate 215–2, is normally high except when the hundreds digit in the room number is to be transmitted to Main Logic 1 (FIG. 1). Consequently, the output signal from NAND gate 222, normally high, drops from high to low in response to the pressing of "vacant" button 240. This low level signal is transmitted through NAND gate 220 — enabled by a high level signal from inverter 281 for the time the output signal from NAND gate 215–1 is low — as a high level signal and then is sent to OR gate 207–4 to be transmitted in a manner described later, to Main Logic 1. An "occupied" signal on the other hand results in a low level output signal from NAND gate 220.

The output signal from NAND gate 220 is transmitted directly to one of the four input leads to OR gate 207–4. The other inputs to OR gate 207–4 are connected directly to switches 206–3, 206–2 and 206–1 respectively. These switches contain the binary-coded-decimal number of the room whose status is being transmitted.

Once divider 216 is enabled by the high level signal from NAND gate 223, the input signal to divider 216 from clock 217 drives divider 216 at the clock frequency. Divider 216, shown in more detail in FIG. 2c, essentially consists of a series of flip-flops. Each flip-flop is driven by a signal from the 1 output lead of the preceding flip-flop. Thus flip-flop 216–1 is driven directly by the input signal from clock 217 and toggles once each clock cycle. The output signals from flip-flop 216–1 on the leads labeled 5 and 6 shift levels once each cycle of the signal from clock 217. The output signal on lead 5 from flip-flop 216–1 is used to toggle flip-flop 216–2. Again, the output levels on the leads labled 9 and 8 from flip-flop 216–2 change once each cycle of the signal on lead 5 from flip-flop 216–1 or once each two cycles of the signal from clock 217. Each flip-flop thus divides the frequency of its toggling signal by two. Flip-flops 216–3 through 216–6 each are driven by the signal from the 1 output lead of the preceding flip-flop.

Each pair of flip-flops is labeled C1, D1, or E1. The corresponding leads from each pair of flip-flops are identically numbered.

In FIG. 2a, the paths followed by the leads from each section of flip-flop 216 are not shown as lines but rather are denoted by the section of the divider from which they come together with their number. Thus lead 9 from section C1 of divider 216 is labeled C1-9 and is shown in the bottom of FIG. 2a as being connected ton one input lead of both NAND gate 212 and NAND gate 213. Likewise, lead 6 from section C1, labeled C1-6, is shown connected to the other input lead of NAND gate 212.

Figure 2E:
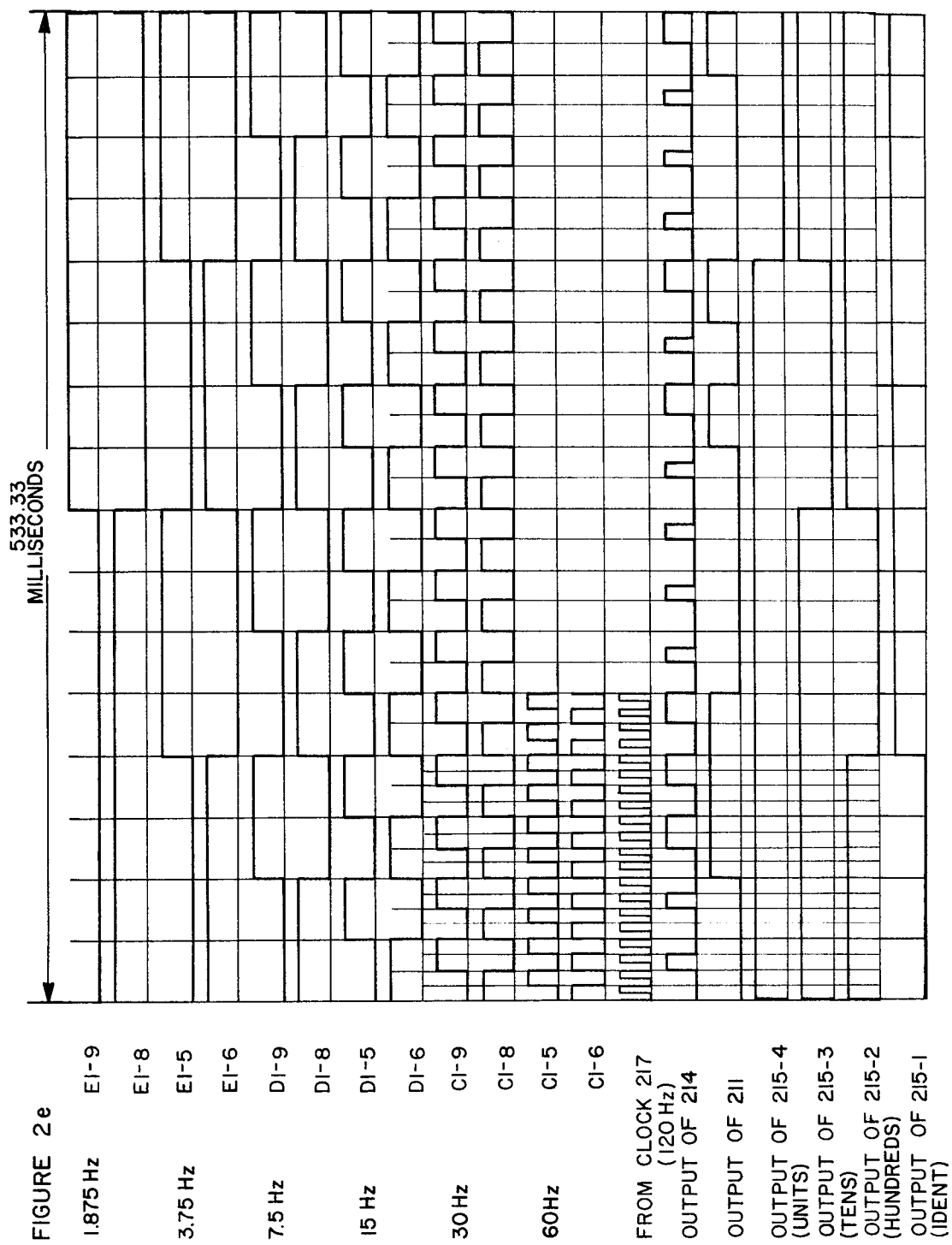
FIG. 2e shows the wave forms from shift register 216 in FIG. 2a and a typical output pulse train from pulse duration modulator 210.

The relationships of the signal levels on the output leads from sections C1, D1, and E1 of divider 216 are shown in FIG. 2e. In FIG. 2e, each lead is identified by both divider section and number. Initially, the signal level on lead 8 from section E1 of divider 216 is high. Because lead E1-8 is located six flip-flops from clock 217, the signal level on lead E1-8 remains high for 32 cycles of the signal from clock 217. 64 cycles of the signal from clock 217 are required for the signal level on lead E1-8 to complete one cycle. On the other hand, the signal level on lead E1-5, driven by a flip-flop located five flip-flops from clock 217, requires 16 cycles of signal from clock 217 to shift from an initially high value to a low value. The signal levels on the other leads from register 216 behave in proportionally the same manner. It should be noted that hereafter time durations will be referred to in terms of cycles of the signal from clock 217 unless otherwise stated.

The four leads from section E1 of divider 216 are connected selectively, in pairs, to NAND gates 215–1 through 215–4. NAND gates 215–2 through 215–4 enable switches 206–3 through 206–1, respectively, when the signals on the output leads from these NAND gates drop from high to low levels. An analysis of the wave forms on the input leads to these gates, shown in FIG. 2e, shows that NAND gates 215–1 through 215–4 produce low level output signals sequentially, each for 16 consecutive cycles of the signal from clock 217.

The four leads from section D1 of divider 216 are connected in selected pairs to NAND gates 208–1 through 208–4. The signals on these leads, shown in FIG. 2e, enable, in sequence, these four NAND gates, each for four consecutive cycles of the signal from clock 217.

As shown in FIG. 2e, initially the signal levels on leads D1-6 and D1-8 from divider 216, connected to enable NAND gate 208–1, are high. The signal level on lead D1-6 remains high for four cycles of the output signal from clock 217, while the signal level on lead D1-8 remains high for eight cycles of the signal from clock 217. Thus NAND gate 208–1 is enabled for four cycles of the output signal from clock 217. During this period, NAND gate 208–1 passes the output signal from OR gate 207–1. The input leads to OR gate 207–1 are connected directly to the 8 output lead from switches 206–1, 206–2, and 206–3. Because these switches are not enabled at this time, the input signals on the leads to OR gate 207–1 are high level and represent binary zeroes.

As shown in FIG. 2e, after four cycles of the signal from clock 217, NAND gate 208–1 is disabled and NAND gate 208–2 is enabled by the signals on lead D1-5 and D1-8 from divider 216. NAND gate 208–2 passes the output signals from OR gate 207–2. The input leads to OR gate 207–2 are connected to the 4 binary digit stored in switches 206–1 through 206–3. Because these switches have yet to be enabled, the output signal from OR gate 207–2 is also a binary zero or a low level signal.

From the 9th through the 12th cycles of the signal from clock 217, NAND gate 208–3 is enabled by the output signals on leads D1-6 and D1-9 from divider 216. One input lead to NAND gate 208–3 is connected to the output lead from OR gate 207–3. OR gate 207–3 has three input leads connected to the 2 binary lead from switches 206–1 through 206–3. These switches, however, have yet to be enabled so binary zeroes (high level signals) are present on these input leads to OR gate 207–3. The fourth input lead to OR gate 207–3 is connected to the output lead from enabling NAND gate 215–1. This output lead has a low level signal reflecting the fact that the two input leads to this NAND gate, connected to leads E1-6 and E1-8 from divider 216, simultaneously contain high level signals for the first 16 cycles of the signal from clock 217 (see FIG. 2e). Accordingly, the output signal from OR gate 207–3 is a high level signal. This high level signal is transmitted through NAND gate 208–3 and appears as a low level signal on its output lead. From NAND gate 208–3 this low level signal is transmitted to pulse duration modulator 210.

On the 13th through 16th cycles of the signal from clock 217, NAND gate 208–4 is enabled by the signals on leads D1-5 and D1-9. The other input lead to NAND gate 208–4 is connected to the output lead from OR gate 207–4. Three input leads to OR gate 207–4 are connected to the 1 binary output leads from switches 206–1, 206–2, and 206–3. The fourth input lead to OR gate 207–4 is connected to the output lead from NAND gate 220. As discussed above, the output signal from NAND gate 220 is a high level signal when "vacant" button 240 has been pressed and is a low level signal when "occupied" button 241 has been pressed. A low or high level signal passes through OR gate 207–4 and emerges from NAND gate 208–4 as a low or high level signal respectively.

During the second 16 cycles of the output signal from clock 217 (FIG. 2e), the signal level on lead E1-6 drops from high to low thereby disabling identify gate 215–1. However, the signal level on lead E1-5 rises from low to high thereby enabling NAND gate 215–2. NAND gate 215–2 in turn produces a low level output signal which is inverted and enables "hundreds" switch 206–3 containing the "hundreds" digit of the room number whose status is being transmitted to the Main Logic.

It should be noted that the drop in output voltage from NAND gate 215–2 is also transmitted directly to one input lead of NAND gate 222 cross-coupled with NAND gate 221 to form a bistable flip-flop. The low signal level on this input lead to NAND gate 222 drives the output signal from NAND gate 222 high thereby changing the output signal level from NAND gate 221 from high to low.

The high level signal from NAND gate 222 is also transmitted to one input lead of NAND gate 220. The other input lead to NAND gate 220 is connected through inverter 281 to the output lead from NAND gate 215–1. The output signal from NAND gate 215–1 is normally high except when gate 215–1 is enabled by high level signals from divider 216. Thus the output signal from inverter 281 is normally low. This low level signal applied to one input lead of NAND gate 220 insures that the output signal level from NAND gate 220 goes high except when the output signal from NAND gate 215–1 is low. Thus the output signal level from NAND gate 220 switches to its normal high level indicating a binary zero. Since this output lead from NAND gate 220 is connected to one input lead to OR gate 207–4, OR gate 207–4 is now able to pass binary ones or zeroes from switches 206. Removal of any low signal level from NAND gate 220 representing a binary one is essential to allow OR gate 207–4 to pass the information from switches 206.

OR gate 207–1 represents the 8 digit of each four-bit binary code word being transmitted to the Main Logic, OR gate 207–2 represents the 4 digit of each such binary code word, OR gate 207–3 represents the 2 digit of each such binary code word and OR gate 207–4 represents the 1 digit of each such binary code word. OR gates 207–1 through 207–4 are connected to one input lead of NAND gates 208–1 through 208–4 respectively. As explained above, in conjunction with FIG. 2e, NAND gates 208–1 through 208–4 are sequentially enabled by output signals from section D1 of divider 216. Each NAND gate is enabled for four cycles of the signal from clock 217. During these four cycles the enabled NAND gate passes the signal level from the corresponding connected OR gate 207 to pulse duration modulator 210. The result is a sequence of four pulse-duration-modulated pulses, obtained from pulse duration modulator 210 in a manner to be described, representing the decimal digit stored in switch 206–3. This decimal digit is the "hundreds" digit of the room number.

Switch 206–2 stores the "tens" digit of the room number. After 16 cycles of the signal from clock 217, NAND gate 215–2 is disabled and NAND gate 215–3 is enabled by the signals on leads E1–6 and E1–9 from divider 216. NAND gate 215–3 then enables switch 206–2 allowing the binary-coded-decimal information stored in switch 206–2 to be transmitted to OR gates 207–1 through 207–4 respectively. Again, NAND gates 208–1 through 208–4 are sequentially enabled by signals from divider 216 with the result that pulse duration modulator 210 produces a sequence of four pulse-duration-modulated output pulses representing the tens digit of the room number.

Switch 206–1 contains information representing the "ones" digit of the decimal room number. At the beginning of the fourth sequence of 16 pulses from clock 217, NAND gate 215–3 is disabled and NAND gate 215–4 is enabled by the output signals on leads E1–5 and E1–9 from divider 216. NAND gate 215–4 then enables switch 206–1 allowing the binary-coded-decimal information stored in switch 206–1 to be transmitted through OR gates 207–1 through 207–4 and NAND gates 208–1 through 208–4. Again this binary-coded-decimal information is pulse-duration modulated by circuit 210 and transmitted as a sequence of four pulse-duration-modulated pulses to Main Logic 1 (FIG. 1).

PULSE DURATION MODULATOR 210

The signals from NAND gates 208 arriving at pulse duration modulator 210 first pass through inverter 211. From inverter 211, the signals are transmitted to one input lead of NAND gate 213. The other input lead to NAND gate 213 is connected to lead C1–9 from divider 216.

As shown in FIG. 2e, the voltage on lead C1–9 is low for the first two cycles of the signal from clock 217 and then goes high for the next two cycles of this signal. Thus while NAND gates 208 each are enabled for four clock cycles by the signals on the leads from section D1 of divider 216, NAND gate 213 is enabled for only the last two of each four clock cycles by the signal on lead C1–9. Thus on receipt of a high level signal representing a binary one from inverter 211 for four clock cycles, NAND gate 213 produces a low level output signal for only two clock cycles. This low level signal is inverted and passed by OR gate 214 as a high level signal for the last two of four clock cycles. Thus a binary one is encoded into a pulse with a duration of two clock cycles.

The other input lead to OR gate 214 is connected to the output lead from NAND gate 212. The two input leads to NAND gate 212 are connected to leads C1–9 and C1–6 from divider 216. As shown in FIG. 2e, the signal level on lead C1–6 is high for the first and third of each four cycles of the signal from clock 217, and then is low for the second and fourth of each four cycles of this signal. Thus, NAND gate 212 produces a normally high output signal except during the third of each four cycles of the signal from clock 217 when the signal levels on leads C1–6 and C1–9 are both high. For this one cycle, the level of the output signal from NAND gate 212 drops low, and in the presence of a low level signal from inverter 211, representing a binary zero, is passed by NOR gate 214 as a high level signal. Thus a binary zero is encoded into a pulse with a duration of one clock cycle.

As shown in FIG. 2e, the signal level on lead E1–6 is initially high for sixteen cycles of the signal from clock 217, while the signal level on lead E1–8 is initially high for 32 cycles of the signal from clock 217. Thus, for the first 16 cycles of the signal from clock 217, the output signal from NAND gate 215–1 is low. This output signal, inverted and continuously applied to OR gate 207–3, is passed by NAND gate 208–3 during the third four cycles of the output signal from clock 217. This signal from NAND gate 215–1, always low level, identifies the source of the room number to follow as a maid terminal. Therefore, the output signal level from OR gate 214, representing the 2 digit of the "identify" binary code word, is always high for two cycles of clock 217.

The 1 digit of the "identify" binary code word tells whether the room whose number is being transmitted is "occupied" or "vacant". The pressing of "occupied" button 241 results in the corresponding output signal from pulse duration modulator 210 being a high level pulse of two cycles duration; pressing of "vacant" button 240 results in the corresponding output signal from pulse duration modulator 210 being high for one cycle duration.

The first four pulses in the line labeled "output of 214" of FIG. 2e, represent the pulse sequence from NOR gate 214 in response to the pressing of "occupied" button 241. If "vacant" button 240 had been pressed the fourth pulse in this sequence would be of only one cycle duration.

FIG. 2e also shows in the fifth through the sixteenth places in this same line, that the room number whose "occupied" status is being transmitted to the main logic is "851."

TONE DETECTOR 235

FIG. 2d shows the circuit used in tone detector 235. The tone from Main Logic 1, a signal with a frequency typically around 2kc, is transmitted through blocking capacitor 236 from main line 245, and coupled by means of transformer 251 to the base of NPN transistor 252. Capacitor 236 together with transformer 251 form a bandpass filter with a center frequency around 2kc. A positive voltage on the base of transistor 252 turns on transistor 252 resulting in the charging of capacitor 257 through diode 256 and resistor 255. The charge on capacitor 257 turns on transistor 258, connected as an emitter follower, thereby generating a voltage drop across load resistor 259.

After 50 milliseconds, as will be seen later in the section on the Main Logic 1, the tone signal from Main Logic 1 stops. Consequently, transistor 252 shuts off and the charge stored in capacitor 257 dissipates through the base-emitter junction of transistor 258 and resistor 259 to ground. As the current through resistor 259 decreases, the voltage drop across this resistor also decreases. After about 30 milliseconds, the negative drop in output voltage across resistor 259, which is inverted to a positive voltage rise at the input to flip-flop 234, drives flip-flop 234, changing the signal level on its 1 output lead from low to high.

PULSE SHAPER AND ISOLATOR 233

FIG. 2d also shows in more detail the pulse shaper and isolator 233 used in FIG. 2b. The output signal signal from NAND gate 231 passes through resistor 232, and, if a positive voltage pulse, turns on and saturates NPN transistor 260. The voltage drop across collector load resistor 261 shuts off transistor 262 thereby raising the voltage on the collector of transistor 262 to that of the power supply attached to the emitter of PNP transistor 263. Transistor 263, connected in the common base configuration with the base attached to voltage supply $V_{cc}$, acts as an isolation switch. In the absence of a voltage pulse from NAND gate 231, main line 245 is at 0 volts. Accordingly, a positive voltage pulse from NAND gate 231 results in turning on transistor 263 to pass this positive voltage pulse to Main Logic 1 on transmission line 245.

Thus circuit 233 shapes the pulses transmitted from a maid terminal. In the absence of a high level signal from NAND gate 231, transistor 262 is on and acts as a short-circuit, holding the voltage on the emitter of transistor 263 at almost ground.

It should be noted that after two cycles of the signal from clock 217, the signal on lead C1–8 from divider 216 changes from a high level to a low level. This changes the level of the output signal from NAND gate 227 (FIG. 2b) from low to high and likewise changes the level of the output signal from NAND gate 226 from high to low. Simultaneously, flip-flop 234 is reset such that the signal level on the 1 output lead drops from high to low.

As a result of the change in signal levels from NAND gate 226 and flip-flop 234, the output signal from NAND gate 225 changes from low to high. Connected to one input lead of NAND gate 223, this change of signal level has no effect immediately, however, on the output signal level from NAND gate 223 because the signal level on the other input lead to NAND gate 223 remains low. This low signal level, derived from the output lead from NAND gate 224 is retained until the signal level on lead 270, connected to lead E1-9 from divider 216, changes from high to low. As described earlier, this negative signal level change results in the apparent input signal level on one input lead to NAND gate 224 dropping from a high to a low level. This drives the output signal level from NAND gate 224 high and drives the output signal from NAND gate 223 low. Transmitted on lead 224 to shift register 216, this low level signal disables divider 216.

CLOCK 217

Clock 217 can be any source of repetitive signals. In one embodiment, each maid terminal contains its own clock 217 which produces an output signal with a frequency twice the line frequency. This clock, in the embodiment shown, is a full-wave rectifier. As is well known, the unfiltered output signal from a full-wave rectifier has a fundamental frequency twice the input supply frequency. Techniques for obtaining a signal of a selected shape, such as a square wave, from this fundamental component are well known, so clock 217 will not be described in detail. Furthermore, other sources of timing pulses can also be used, such as oscillators. FIG. 4f shows the circuit of clock 217.

MAIN LOGIC

FIG. 1a shows schematically the various components within Main Logic 1 (FIG. 1). Maid Terminal 2-i, where i is an integer between 1 and N, is interrogated from control unit 11 in response to a pulse continuously cycled through scan ring 10. Scan ring 10 in turn is driven by a clock signal, typically at a frequency of 1 kilohertz, generated in control 11.

Scan ring 10 consists of a series of flip-flops through which is driven a pulse. The presence of the pulse in a given flip-flop produces a high level signal, which, when transmitted to control 11 provides a high level signal on one input lead to an AND gate associated with a corresponding maid terminal. If the "vacant" or "occupied" button associated with the maid terminal has been pressed, indicating that a room number has been entered at the maid terminal and its status determined, a second input lead to that AND gate has a high level signal. A tone signal from a tone generator contained within control 11 is then transmitted through the activated AND gate to the maid terminal. After the receipt of this tone signal, the maid terminal as described above, sends back to control 11 the data associated with the status of the room.

The simultaneous occurrence of the scan ring pulse at the AND gate which passes the tone signal together with the earlier or simultaneous pressing of the "vacant" or "occupied" button 240 or 241 respectively (FIG. 2b) at the corresponding maid terminal stops the driving of scan ring 10. Control 11 thus remains locked on that maid terminal until the data contained there is transmitted through control 11.

From control 11 the received data is sent to pulse width detector 12 where it is converted to high or low level signals representing binary ones or zeroes depending upon the widths of the received pulses. The binary ones and zeroes which indicate the number and the status of the room, are then stored in shift register 13. From shift register 13, these data are transmitted to "1 of 10" decoder 14 where they are converted into decimal numbers and a status indication. Transferred to buffer 15, the decimal numbers are used to activate the driving circuits which drive, on Main Display 5, the status indicators associated with that room. Signals stored in buffer 16 control the status symbol shown on Main Display 5 opposite the room number stored in buffer 15.

Signals from control 11 are also sent to circuits in Housekeeper Logic 6 substantially identical to pulse width detector 12, shift register 13, "1 of 10" decoder 14 and buffers 15 and 16. The information processed in the housekeeper logic is used to control the room statuses displayed on Housekeeper Display 7.

SCAN RING 10 AND CONTROL UNIT 11

Portions of scan ring 10 and control 11 are shown in more detail in FIGS. 1b and 1c. For simplicity, only four of the N flip-flops comprising scan ring 10 are shown in FIG. 1b. In addition, the logic associated with each section of the scan ring for interrogating a given maid or transmitting terminal is shown only once to avoid redundancy.

As shown in FIG. 1b, scan ring 10 contains at least one more flip-flop 101 than there are maid terminals sending information to main logic 1. This additional flip-flop allows the clerk's control panel to also be connected to one flip-flop 101 in scan ring 10. Flip-flops 101 each have two output terminals, a 1 output terminal, a high signal level on which represents a binary one, and a 0 output terminal, a high signal level on which represents a binary zero. A pulse from flip-flop 122 (FIG. 1c) is placed in the first flip-flop in the scan ring, flip-flop 101-1. This pulse is represented by the signal level on the 1 output lead from flip-flop 101-1 going high and is preceded by a scan reset signal from inverter 103 which resets all flip-flops 101 such that the signal levels on their 1 output leads are low at the start of each scan cycle.

Scan ring 10 is driven through NAND gate 126 (FIG. 1c) and inverters 123 and 104, by a signal from clock 131. Typically this clock signal is 1 kc. When the output signal level from clock 131 goes high, as it does once each cycle, NAND gate 126 produces a low level signal which is inverted to a high level signal in inverter 123, provided the other two input leads to NAND gate 126 contain high level signals, as they normally do. This high level signal, which is inverted again in inverter 104 before reaching the flip-flops 101 comprising the scan ring, then drives each flip-flop 101.

Each flip-flop 101 changes its state only if the 1 output lead from the preceding flip-flop is at a high level at the time the input signal to the flip-flop changes from a low to a high level. Thus when flip-flop 101-1 has a high level signal on its 1 output lead, the output signal on the 1 output lead of flip-flop 101-2 is shifted from a low level to a high level. On the next clock cycle, flip-flop 101-3 is driven such that the signal on its 1 output lead changes from a low level to a high level signal. Thus a binary pulse is driven along the scan ring. At the last flip-flop in the scan ring, the binary pulse is removed from the scan ring and sent to flip-flop 122 (FIG. 1c) on leads X and X', shown in FIGS. 1b and 1c. Flip-flop 122 then reshapes the pulse and transmits it back into flip-flop 101-1 on leads A and A'. Flip-flop 122 is driven by the output signal from NAND gate 126 derived from clock 131.

When flip-flop 101-1 has a high signal level on its 1 output lead, this high level signal is transmitted to one input lead of NAND gate 110-1 (FIG. 1b). The second input lead to NAND gate 110-1 is connected to a "Ready Key" signal generator through inverter 106. As will be described shortly, the signal level on the "Ready Key" line, normally a low level signal, is derived from the 1 output lead of flip-flop 141 (FIG. 1c) and is applied to NAND gate 110-1 through inverters 142 and 106.

The high signal level on the 1 output lead from flip-flop 101-1 is also applied to one input lead to NAND gate 114-1. The high level signal transmitted from Maid Terminal 2-i (FIG. 1a) on lead 245-1 when "vacant" or "occupied" button 240 or 241 respectively (FIG. 2b), is pressed passes through the secondary coil of transformer 112-1 and raises the signal level on the other input lead of NAND gate 114–1 thereby generating a low level signal on the output lead from NAND gate 114–1. The request to transmit data to Main Logic 1 from Maid Terminal 2–1 thus passes through NAND gate 114–1 but is inverted in polarity. From NAND gate 114–1 the data is transmitted through an inverter to one input lead of OR gate 117–1.

OR gate 117–1 is just one of a plurality of K OR gates 117, where K is an integer representing the total number of OR gates 117. Each OR gate 117 has four input leads and thus receives data from four maid terminals. However, the last input lead on OR gate 117–K receives input data from the Clerk's Control Panel 4 (FIG. 1). The output signal from each OR gate 117 is passed through a corresponding inverter 116 and then passed on a selected one of leads 118–1 through 118–K to a selected one of OR gates 119–1 through 119–P, where P is a selected integer. Each OR gate 119 receives data from a selected number of leads 118. OR gates 119 funnel the received data onto a single transmission line, line 102.

The normal signal level on line 102 is low. The pressing of either vacant or occupied button 240 or 241 respectively (FIG. 2b) changes this signal level to high. This high signal level is then transmitted to one input lead of NAND gate 121. The other two input leads to NAND gate 121 are connected respectively to the output lead from NAND gate 134 and to the line labeled "Good Data."

NAND gate 134 is cross coupled with NAND gate 135 to form a bistable flip-flop. Normally, in the absence of a request from the cashier for access to the main logic, the output signal level from NAND gate 134 is high, and the output signal level from NAND gate 135 is low. As will be seen later, in the absence of data being transmitted to the main logic from a maid terminal or the clerk's control panel, the cashier has priority in the transmission of data over all other transmitting stations. Thus the cashier, upon request, stops the normal operation of the scan ring so that data can be transmitted to the main logic indicating that the occupant of a given room has checked out. The cashier, however, cannot interrupt transmission of data from either a maid terminal or the clerk's control panel. The logic shown in FIG. 1c, as will now be described, ensures that the cashier, on request, has priority in the transmission of data over the maid or the clerk, but at the same time, does not interrupt the transmission of data already in progress at the time of the cashier's request.

In the absence of a request from the cashier for access to the main logic, the signal level on the "Cashier Request" line is low. Thus one input signal to NAND gate 130 is low and the output signal level from NAND gate 130 is high. This high level signal is applied to one input lead to NAND gate 135. The other input lead to NAND gate 135, connected to the output lead from NAND gate 134, also contains a high level signal. These two high level signals ensure that the output signal level from NAND gate 135 is low. Applied to one input lead of NAND gate 134, this low level signal ensures that the output signal level from NAND gate 134 is normally high. The signal level on the other input lead to NAND gate 134 is derived from the "Good Data" line. The signal level on this line is normally high.

The signal level on the "Good Data" line drops to a low level signal only for a short time (about one millisecond) after the receipt of 16 good data pulses from either a maid terminal, the clerk's control panel, or the cashier.

For its brief duration, the good data pulse disables NAND gate 130. This prevents the cashier from transmitting data into the system. For the same time, the good data pulse likewise disables NAND gate 121 preventing data from being transmitted to the main logic from either a maid terminal or the clerk's control panel. A good data pulse thus allows the system time to be reset to its normal operating condition after the receipt of 16 data pulses from either the cashier, a maid, or the clerk before new data is transmitted to the system. The good data pulse also disables flip-flop 128 for one millisecond preventing the level of the output signal on flip-flop 128's 1 output lead from going high before the reset pulse on the "Good Data" line ends. This prevents NAND gate 129 from being enabled during the reset pulse duration.

Thus, in the absence of either the transmission of data from the cashier's terminal to the main logic or of a good data reset pulse, the receipt of a high level signal on lead 102 indicating that a maid terminal is ready to transmit the status of a room to the main logic results in the output signal from NAND gate 121 dropping from a high to a low level signal. The level of the input signal to flip-flop 127 from NAND gate 121 then goes from low to high. This input signal, combined with the high level signal derived from the 1 output lead from flip-flop 127 (this signal is a low level signal but is inverted prior to being applied to the input to flip-flop 127) results in shifting the level of the output signal on the 0 output lead from flip-flop 127 from high to low. Inverted in inverter 137 to a high level signal, this signal is applied together with the normally high level signal from NAND gate 134 to AND gate 140. The output signal from AND gate 140 toggles flip-flop 141 such that the output signal level on its 1 output lead rises from low to high. Passed through inverter 142 to the "Ready Key" line, the signal is re-inverted in inverter 106 to a high level signal. This high level signal is applied to one input lead of all NAND gates 110. Because NAND gate 110–1 has a high level signal on its second input lead derived from the high level on the 1 output lead of flip-flop 101–1 in scan ring 10, NAND gate 110–1 passes the output signal from tone oscillator 120 to Maid Terminal 2–1. As described above in the Maid Terminal section, this tone signal is used to initiate the transfer of data from the maid terminal.

Tone oscillator 120 in one embodiment, comprises an oscillator producing an output signal at 4 kc. Passed to the input of flip-flop 120a this tone signal is cut in frequency to 2 kc and converted to a square wave and then applied through inverter 105 to one input of each of NAND gates 110.

The drop in the signal level on the 0 output lead from flip-flop 127 is also applied to one input lead of NAND gate 126 disabling this NAND gate. A second input lead to NAND gate 126 is connected to the output lead of NAND gate 134. This lead's signal level is normally high in the absence of a cashier's request. The signal on the third input lead to NAND gate 126 is derived from clock 131. When all three input signals to NAND gate 126 are high, the output signal from NAND gate 126 is low. When one input signal to NAND gate 126 is low, its output signal is high.

Clock 131 normally produces an output signal at a frequency of 1 kc. Thus once each millisecond, the signal level from clock 131 drops from high to low. The output signal level from NAND gate 126 switches from low to high at the same rate. Passed through inverters 123 and 104, this output signal is used to drive scan ring 10. However, when the output signal on the 0 output lead from flip-flop 127 goes low, NAND gate 126 is disabled, and produces only a high level signal even though clock 131 continues to produce an output signal at a frequency of 1 kc. Thus the scan ring is disabled upon receipt of a request from a maid terminal or the clerk's control panel to transmit data to the main logic.

The "Ready Key" signal on the 1 output lead from flip-flop 141 remains high for about 50 milliseconds until capacitor 141a, connected to voltage supply $V_{cc}$ through resistors 141b and 141c, the latter resistor being variable, charges, thereby switching flip-flop 141 back to its normal state. The high signal level on the "Ready Key" line allows the signal from tone oscillator 120 to be transmitted for about 50 milliseconds to the particular maid terminal requesting access to the main logic. As described above in the Maid Terminal section, data starts transmitting from the maid terminal about 30 milliseconds after the tone signal ends.

Data is transmitted from Maid Terminal 2–1 on lead 245–1 to control 11 (FIG. 1a) in Main Logic 1. The information transmitted from a maid terminal is transmitted at a frequency determined by the frequency of the output signal from clock 217 (FIG. 2b). Because clock 217 is driven by a signal derived by full wave rectifying the line frequency, the signal from clock 217 has a frequency of 120 hertz. As also described above in the Maid Terminal section, one piece of data is transmitted every four cycles of the signal from clock 217. Thus data is transmitted from a maid terminal at a frequency of 30 hertz. Sixteen pieces of data are transmitted from a maid terminal. This takes 0.533 seconds. Of course, other data transmission rates can be used if desired.

The data from maid terminal 2-1 is transmitted through the secondary winding of transformer 112-1, past a low-pass filter consisting of parallel-connected resistor 115-1a and capacitor 115-1b and into one input lead of NAND gate 114-1. NAND gate 114-1 is still enabled by the high level signal on the 1 output lead of flip-flop 101-1 in scan ring 10. From NAND gate 114-1 this data is transmitted, as described above, through OR gate 117-1, inverter 116-1, on lead 118-1, to OR gate 119-1. From OR gate 119-1, this data is transmitted to one input lead to NAND gate 129. The other input lead to NAND gate 129 is connected to the 1 output lead from flip-flop 128. It should be noted that the termination of the "Ready Key" signal from flip-flop 141 toggled flip-flop 128, driving the signal level on flip-flop 128's 1 output lead from its normally low level (where it prevents NAND gate 129 from passing the tone signal from tone oscillator 120 through to the data registers in the main logic) to a high level thereby enabling NAND gate 129. Thus NAND gate 129 is enabled for the transmission of data from either a maid terminal or the clerk's control panel.

The output signal from NAND gate 129 is transmitted to one input lead of OR gate 136. The other input lead to OR gate 136 is connected to the data input lead from the cashier. When high level data pulses from OR gate 119-1 arrive at NAND gate 129, the output signal level from NAND gate 129 switches from high to low in response to these pulses. The output signal from OR gate 136 therefore switches from low to high for the duration of each data pulse from the transmitting terminal.

Before describing further the processing of the data received from OR gate 136, the operation of control unit 11 upon receipt of a cashier's request will be described. A request by the cashier to transmit data to the main logic is initiated by a high level signal on the "Cashier Request" line. This high level signal, combined with the normally high level signal on the "Good Data" line results in the output signal from NAND gate 130 dropping from a high to a low level. Consequently, the output signal from NAND gate 135 rises from a low to a high level. Transmitted to one input lead of NAND gate 134, this high level signal, combined with the high level signal on the "Good Data" line forces the output signal from NAND gate 134 from a high to a low level. The low level output signal from NAND gate 134 disables flip-flop 141. This prevents the clerk or a maid from changing the state of flip-flop 141.

The high level signal from NAND gate 135 is transmitted to one input lead to NAND gate 133. The other input lead to NAND gate 133 is derived from the 0 output lead of flip-flop 127. This output lead has a normally high level signal. The combination of the two high level signals at the input leads to NAND gate 133 changes the level of its output signal from normally high to low. Inverted in inverter 138, a high level signal is transmitted to the cashier to enable the transmission of data from the cashier. The cashier then, in a manner to be described later in the section labeled Cashier's Terminal, transmits data on the lead labeled "Cashier Data Input" to OR gate 136. This data is transmitted through OR gate 136 and processed in the same manner as is data from either a maid terminal or the clerk's control panel.

It should be noted that the drop in the level of the signal from NAND gate 134 in response to the cashier's request, disables NAND gate 126 inhibiting the driving of scan ring 10 by clock 131. There is, however, a possibility that the particular flip-flop 101 in which the binary pulse is located will correspond to a terminal (either a maid terminal or the clerk's control) at which a person attempts to place data into the system simultaneously with the transmittal of data from the cashier. To prevent this from occurring, the output signal from NAND gate 134, which is a low level signal during the transmission of data from the cashier's terminal, is applied to one input lead of NAND gate 121, thereby disabling NAND gate 121.

After completion of the transmittal of data from the cashier's terminal, a low level reset pulse is transmitted on the "Good Data" line to one input lead to NAND gate 130. This low level pulse is also applied to one input lead to NAND gate 134 thereby driving the output signal from NAND gate 134 back to its normal high level. This high level signal from NAND gate 134 then combined with the normally high level output signal from NAND gate 130 generated by the low signal level on the "Cashier Request" line combined with the low reset pulse, results in the output signal from NAND gate 135 switching from a high to a low level. During the presence of the low level reset pulse on the "Good Data" line, NAND gate 121 is likewise disabled thereby preventing data from a maid terminal or the clerk's control panel from being transmitted to the main logic.

The low level reset pulse on the "Good Data" line is also transmitted to one input lead to flip-flop 127. This low level pulse, inverted at the input to flip-flop 127, occurs while the level of the output signal from the 0 output lead from flip-flop 127 is also low. This output signal is also applied to one input to flip-flop 127 and inverted at this input. The combination of these two low level signals resets flip-flop 127 such that the signal level on its 0 output lead becomes a high level signal and the signal level on its 1 output lead becomes a low level signal.

It should be noted that during the transmission of data from a maid terminal or the clerk's control panel, the low level output signal on the 0 output lead from flip-flop 127 is applied to one input lead of NAND gate 133. The other input lead to NAND gate 133 is connected to the output lead from NAND gate 135. Thus upon receipt of a request from the cashier to transmit data to the main logic while data is being transmitted from a maid terminal or the clerk's control panel, NAND gate 133 is disabled preventing the cashier from interrupting the transmission of data. The data reset pulse on the Good Data line returns the system to its normal state waiting for data from the cashier, a maid terminal, or the clerk.

It should be noted that a signal is derived from control unit 11 (FIG. 1c) to indicate that neither the cashier nor the maid are transmitting data to the main logic. Thus OR gate 132 normally produces a low level output signal. When, however, either the output signal from NAND gate 134 or on the 0 output lead from flip-flop 127 drops to a low level, the output signal from OR gate 132 rises to high level signal indicating that data is being transmitted to the main logic from the cashier or maid (including the clerk). This lead is labeled $\overline{\text{Cashier} + \text{Maid}}$.

PULSE WIDTH DETECTOR 12 AND DECODER

The data from OR gate 136 (FIG. 1c) is transmitted to pulse width detector 12 shown in FIG. 1d. Detector 12 is located in Main Logic 1. A pulse width detector similar to the detector shown in FIG. 1e is located in Housekeeper Logic 6. The data from OR gate 136 (FIG. 1c) is also sent to this detector. Noise on the input data is removed by a filter consisting of resistors 145, 146, and capacitor 147. The input data is then transmitted through a wave shaper consisting of tandomly connected inverters 148 and 149. From inverter 149 the data is sent to one-shot 150.

As shown in FIG. 1f, one-shot 150 produces an output pulse whose duration is about one and one-half times the period of the signal from clock 217 (FIG. 2b). The leading edges of the pulses produced by one-shot 150 are synchronized in time with the leading edges of the data pulses on the output lead from inverter 149. One-shot 151 next produces a sequence of output pulses of extremely short duration, as shown in FIG. 1f. These output pulses are produced by the output signal from one-shot 150 going from a high to a low level. This change in signal level is inverted prior to being applied to one-shot 151. From one-shot 151, the output pulses are applied to one input lead of NAND gate 153. To the other input lead of NAND gate 153 are applied the data pulses from inverter 149. Because the pulses from one-shot 151 are synchronized with the trailing edges of the pulses from one-shot 150, a short-duration data pulse from inverter 149, representing a binary zero does not overlap in time with the short pulse generated by one-shot 151 in response to this data pulse. Consequently, NAND gate 153 produces a uniform high level signal on receipt of the binary zero.

On receipt of a binary one pulse, which has a duration of two cycles of clock 217 (FIG. 2b), the short-duration output pulse from one-shot 151 overlaps in time the latter portion of the data pulse representing the binary one. Consequently, the output signal from NAND gate 153 drops from its normally high value to a low value for the duration of the overlap of these two pulses. Inverter 154 inverts the signal from NAND gate 153. Thus on the output lead from inverter 154, binary one's are represented by short-duration pulses and binary zeroes are represented by the absence of such pulses. Duration modulated pulses have thus been converted to two-level logic pulses.

The output pulses from one-shot 151 drive one-shot 152 thereby producing a sequence of clocking pulses (shown in FIG. 1f) used to place the transmitted binary data representing a room number and its status into storage registers 170–1 through 170–4 (FIG. 1e).

The clocking pulses from one-shot 152 drive NAND gate 155. The signal level on the other input lead to NAND gate 155 derived from the 0 output lead of flip-flop 167, is normally at a high level. The output signal from NAND gate 155, normally a high level signal due to the normally low level signal on the output lead from one-shot 152, drops, in response to the high level input pulse from one-shot 152, to a low level.

The output clock pulses from NAND gate 155 drive "Divide by 16" circuit 166. Divider 166 produces an output pulse in response to 16 clock pulses from NAND gate 155. This output pulse drives flip-flop 167 changing the signal level on both its 0 and 1 output leads. The signal level on its 0 output lead drops from a high to a low level, disabling NAND gate 155, while the signal level on its 1 output lead rises from a low to a high value.

The output pulses from NAND gate 155 also drive storage register 170–1 through 170–4. Placed in registers 170 are the data pulses from inverter 154 (FIG. 1d). These pulses first enter register 170–1. After four pulses from NAND gate 155, register 170–1 is full. The next pulse from NAND gate 155 stores the fifth piece of data from inverter 154 in register 170–1 and transmits the first piece of data to be stored in register 170–1 to register 170–2. This process continues until all the registers are full, the first piece of data placed in register 170–1 now being located in register 170–4.

Register 170–4 now contains the binary pulses representing the status of the room, that is, whether the room is vacant or occupied, and also whether the status information is from the cashier's terminal (in which case register 170–4 contains the binary number 0000 when the checkout is unscheduled and the binary number 0001 when the checkout is scheduled) or from a maid terminal (in which case register 170–4 contains the binary number 0010 when the room is vacant, or the binary number 0011 when the room is occupied). This information is called the "Identify" information because the second bit from the right in this binary number identifies the source of the status information (a 1 in this location means the status information is from a maid terminal or the clerk, while a 0 in this location means the binary information is from a cashier's terminal.).

Register 170–3 contains the binary information representing the hundreds digit of the room number whose status has just been transmitted. Register 170–2 contains the binary information representing the tens digit of this room number while register 170–1 contains the binary information representing the units digit of this room number.

From registers 170–1 through 170–3 the stored binary information is transmitted to "1 of 10" decoders 171–1 through 171–3 respectively where the room number is reconverted to a decimal form. The shift in signal level from low to high on the 1 output lead from flip-flop 167 in response to the receipt of 16 pieces of data, is transmitted to one input to AND gate 177 (FIG. 1d). This signal drives one-shot 176 which immediately produces an output pulse of 200 milliseconds duration. This output pulse does two things. First, it activates, through pulser switch matrix 182 (to be described later), a drive circuit which produces a signal to drive Main Display 5 (FIGS. 1 and 5a). Second, this output pulse is inverted and transmitted through OR gate 175 to AND gate 174. The drop in level of this pulse at the end of 200 milliseconds drives one-shot 173. The output pulse from the 0 output lead of one-shot 173 is sent through OR gate 172–1 (FIG. 1g) and inverter 172 (FIG. 1e) to reset flip-flop 167 and through inverter 172-2 (FIG. 1d) to reset "Divide by 16" circuit 166 in preparation for the next sequence of data to be transmitted to MainLogic 1 (FIG. 1) as well as to clear registers 170–1 through 170–4 (FIG. 1e).

The decoded room number is transmitted from decoders 171–1 through 171–3 to buffers 181–a through 181–c, respectively, which, in one embodiment, comprise inverters connected to the output leads from decoders 171. From buffers 181 high-level signals are sent to one of a plurality of NAND gates similar to the gate 181–m shown in FIG. 1h, where m is an integer representing the mth of M rooms. The mth NAND gate has three input leads, a units input, a tens input, and a hundreds input. A particular NAND gate is activated only when a high level signal appears simultaneously on each input lead. Only one NAND gate 181 is activated at a time because each such NAND gate has its input leads connected to only those output leads from buffers 181–a through 181–c corresponding to one room number. From NAND gate 181–m the room number is sent to Main Display 5 to activate the status indicator associated with the correct room number. Circuitry similar to that shown in FIGS. 1d, 1e and 1g is contained in Housekeeper Logic 6. The room number from this circuitry is sent to Housekeeper Display 7.

Register 170–4 stores three types of information. First, when the cashier transmits a room number to the main logic, the cashier automatically is indicating that the occupant of the room has checked out and that the room is thus vacant. The four binary bits in register 170–4 are 0000 when the checkout is unscheduled and 0001 when the checkout is scheduled. When the maid transmits a room number to the main logic, she indicates whether or not the room is vacant or occupied. If vacant, the four binary bits in register 170–4 are 0010; if occupied these four bits are 0011.

When one-shot 176 (FIG. 1d) is activated upon the receipt of 16 bits of binary data, this one-shot produces a high level signal on its 1 output lead for 200 milliseconds, as discussed above. This drive signal is sent to one input lead of each of NAND gates 182–5, 182–6, and 182–7 (FIG. 1e).

NAND gate 182–5 has its other input lead connected through inverter 182–1 to the 2 binary position in register 170–4. Only when the cashier has transmitted data does this particular location in register 170–4 contain a binary zero. Inverted in inverter 182–1, this binary zero is applied as a high level signal to the other input of NAND gate 182–5. Thus the output signal from NAND gate 182–5 drops from a normally high value to a low value for 200 milliseconds when the cashier has transmitted information to registers 170.

When the maid has indicated that the room was vacant; the 2 binary location in register 170–4 contains a binary one, and the 1 binary location in register 170–4 contains a binary zero. Thus the input signal to inverter 182–1 is high and the input signal to inverter 182–2 is low. Inversely, the output signals from inverters 182–1 and 182–2 are respectively low and high.

Inverter 182–4 inverts to a high level the low level signal from 182–1 and applies this to one input lead to both NAND gates 182–6 and 182–7. The high level 200 millisecond output signal from one-shot 176 is also applied to one input lead of both NAND gate 182–6 and NAND gate 182–7. Thus all three leads to NAND gate 182–7 contain high level input signals and the output signal from this NAND gate goes to a low level indicating that vacant button 240 was pressed at a maid terminal.

Likewise, analysis of circuit 182 shows that when occupied button 241 is pressed at a maid terminal, the output signal from NAND gate 182–6 drops to a low level indicating that the room is occupied.

The low level signals from gates 182–5, 182–6 and 182–7 last for 200 milliseconds, the time necessary to drive the appropriate display indicator in both Main Display 5 and Housekeeper Display 7. The display drive circuits will be described later in the sections entitled Main Display and Housekeeper Display.

AUXILIARY RESET OR FAIL-SAFE CIRCUIT

There are several possible failure modes which will disable the main logic. First, a maid terminal or a clerk's terminal might fail such that a high level signal is transmitted continuously to control 11 in Main Logic 1 on the corresponding one of leads 245. In this situation, each time the binary pulse driven through scan ring 10 arrives in that flip-flop 101 corresponding to the failed maid or clerk terminal, scan ring 10 will stop and lock on this maid terminal. However, because neither vacant nor occupied button 240 or 241 respectively (FIG. 2b) has been pressed, no data will ever be transmitted from this maid terminal to Main Logic 1 in response to the tone signal. Consequently, the system will be disabled unless some structure is provided to generate a reset pulse after a given time has elapsed without 16 data pulses being received by the main logic. The auxiliary reset or "fail safe" circuit shown in FIG. 1g does this.

Another source of error arises when for some reason less than 16 pieces of data are received by the main logic. The main logic then continues to wait for the 16th piece of data which is not forthcoming. The auxiliary reset circuit corrects this.

Finally, the auxiliary reset circuit also restarts scan ring 10 if the ring should shut off because, for example, of temporary power failure.

Another failure mode which the auxiliary reset circuit will not handle is a failure mode wherein a maid's terminal or clerk's terminal fails such that the signal level on lead 245 is always low. In this situation, the maid would press the occupied or vacant button. The light indicating data was to be transmitted would then turn on and remain on as no tone signal would ever be received at the maid terminal. Thus the failure of the light to turn off would indicate that the maid terminal had failed in a low mode.

The operation of the fail-safe circuit shown in FIG. 1g will now be described. The lead labeled Cashier + Maid has a normally low level signal on it except when the cashier, the maid or the clerk is transmitting data to the main logic. Then the signal level on this lead goes high. This high level signal is transmitted from NAND gate 132 (FIG. 1c), both to one input lead of NAND gate 195 (FIG. 1g) and through inverter 194 to one input lead of NAND gate 187, thereby disabling gate 187. On the other input lead to NAND gate 187 is the output signal from the 0 output lead from one-shot 186.

The drop in signal level on the output lead of inverter 194 in response to either the maid, the cashier or the clerk transmitting information to the main logic, is inverted in polarity by OR gate 188a and passed through AND gate 188b to one-shot 189. This negative-going signal from inverter 194 is thus used to trigger one-shot 189.

One-shot 189, which together with OR gate 188a and AND gate 188b comprises a circuit such as a Fairchild 9601, produces a positive output pulse on its 1 output lead for about twice the time necessary to transmit 16 bits of data from a transmitting station to the main logic. Thus, one-shot 189, when triggered, produces an output signal whose level changes immediately from low to high. This high level signal lasts for about one second and then returns to its former low level. The change in level from high to low is passed through OR gate 190a, and AND gate 190b to trigger one-shot 191. One-shot 191 is adjusted by selecting the values of resistor 191a and capacitor 191b, to produce a high-level output pulse of about 1 millisecond duration. This high-level output pulse is transmitted to one input lead of NAND gate 195. NAND gate 195 was enabled by the signal level on the Cashier + Maid lead going high in response to either the cashier, maid or clerk requesting access to the main logic. Thus the high-level 1 millisecond pulse from one-shot 191 results in a low level pulse of 1 millisecond duration being produced on the output lead of NAND gate 195. This low level output pulse is transmitted to flip-flop 122, the reset flip-flop shown in FIG. 1c, and there used to initiate the scan ring operation. It should be remembered that flip-flop 122 not only starts the binary pulse through scan ring 10 but simultaneously with the placement of the binary pulse in flip-flop 122, all the other flip-flops 101–1 through 101–N are cleared to remove any binary pulses which might be stored therein. This ensures that only one binary pulse can be circulating through scan ring 10 at any one time.

Consequently, if one-shot 191 produces an output pulse while NAND gate 195 is still enabled, scan ring 10 is reset so as to begin its next scan at the first maid terminal. This scan again proceeds normally until the failed terminal is reached, at which time the reset pulse from one-shot 191 again sends the scan pulse back to the first maid terminal. Thus the failure of a maid terminal or a clerk's terminal such that a high-level signal is on lead 245 (FIG. 1b) results in not scanning all terminals beyond the failed terminal in the scan cycle. By pressing the occupied or vacant buttons on all terminals and observing on which terminal the data transmitted lights remain on, the failed terminal can be located.

One-shot 191 also contains a 0 output lead. The signal on this output lead is just the inverse of the signal on its 1 output lead. Thus the negative-going 1 millisecond pulse on the 0 output lead is inverted at the input to OR gate 172–1, passed through this OR gate, and then used to reset not only shift registers 170–1 through 170–4 but also "Divide by 16" circuit 166 and flip-flop 167.

The reset pulse derived from inverter 193, connected to the output of OR gate 172–1, is transmitted on the "Good Data" lead to control 11 shown in FIG. 1c and there used to reset the control logic to its normal, quiescent state.

It should be noted that if the high level signal on the Cashier + Maid lead is due to the normal operation of the circuit, this signal level will drop to a low value in about 0.6 seconds and thus disable NAND gate 195. Thus the reset pulse from one-shot 191 will not be transmitted to the main logic.

Another, though unlikely, failure mode occurs if for some reason pulses from clock 131, (FIG. 1c) fail to arrive at one-shot 186 while the signal level on Cashier + Maid lead is low. The input signal to one-shot 186 is derived from clock 131 through NAND gate 126. So long as clock 131 drives scan ring 10, clock pulses arrive at OR gate 185a through capacitor 184a and resistor 184b – connected as a differentiator — once each millisecond. Passed through both OR gate 185a, connected as an inverter and AND gate 185b, the negative-going spike from capacitor 184a triggers one-shot 186 once each millisecond. The time constant of one-shot 186 is about 2 milliseconds, just twice the period of the signal from clock 131. If clock pulses stop arriving at the input of one-shot 186, the output signal on the 0 output lead from one-shot 186 stays low for just two milliseconds after this last clock pulse arrives, and then reverts to a high-level signal.

The output signal from the 0 output lead from one-shot 186 is transmitted to one input lead of NAND gate 187. The signal on the other input lead to NAND gate 187 is derived from inverter 194. When the signal on the Cashier + Maid lead is low, as it normally is, the output signal level from NAND gate 187 drops from high to low. After about one second one-shot 191 produces a reset pulse, which, if the system is still disabled, restarts the system, if the system can be restarted.

MAIN DISPLAY

The output signals from Main Logic 1 (FIG. 1) are transmitted to Main Display 5 where they activate the appropriate coil driving circuit or circuits associated with the room whose status is being reported. FIG. 5a shows the circuit associated with only one room, room number 1. For convenience and simplicity, the identical circuits associated with the other rooms are not now shown. Although the numbers on all components in FIG. 5a should be followed by "—1" to indicate that the circuit shown is associated with room No. 1, this room designation is omitted for simplicity.

As shown in FIG. 5a, the appropriate output signal from NAND gate 181-1 attached to the output leads from buffers 181-a, 181-b, and 181-c is first passed through inverter 501 and then applied to one input lead each of NAND gates 502, 503, 506, and 507.

Usually, before the maid cleans and prepares a room for use, the prior occupant has checked out at the cashier's desk. At checkout, the cashier has entered the room number at the cashier's terminal (FIGS. 3a and 3b) and pressed a button on this terminal indicating the occupant of that room has checked out. As a result, a low level 200 millisecond pulse from NAND gate 182-5 (FIG. 1e) is inverted by and transmitted through buffer circuit 181-d (FIG. 1e), to one input lead of NAND gate 502 (FIG. 5). Because data from the cashier is processed in pulse width detector 12 (FIG. 1d) just like data from any other transmitting terminal, a high level pulse appears at the output of inverter 501 on the other input lead to NAND gate 502, indicating that the status display associated with room 1 is to be changed. Consequently, the output signal from NAND gate 502 has dropped from a high to a low level. This low level signal, applied to the base lead on PNP transistor T510 through base resistor 514, turns on normally-off transistor T510. The collector current from transistor T510 passes through resistors 516 and 517. NPN transistor T511 is then turned on by the voltage drop across resistor 517. T511's collector current passes through coil 522 thereby setting the "Red" indicator opposite the number of the room just checked out.

According to one color code employed with this invention, two black colors — "Black-Black" — opposite a room number indicates that the room is occupied. "Black-Red" opposite a room number shows the room to be vacant but not made up for occupancy. Thus the cashier's signal changes the colors displayed opposite a room number from "Black-Black" to "Black-Red." In addition, the colors "Green-Black" correspond to "Room vacant, ready to rent;" and the colors "-Green-Red" correspond to an anomolous situation where the cashier has erroneously transmitted to the main logic the number of a room already vacant and made up (and thus represented by the colors "Green-Black") as the room from which an occupant is checking out. This anomolous situation will be discussed later.

The low level signal from NAND gate 502 also changes the level of the output signal from NAND gate 504 — which together with NAND gate 505 comprises a bistable flip-flop — from low to high. Simultaneously, of course, the output signal level on NAND gate 505 has dropped from high to low. This shift in the state of the flip-flop comprising NAND gates 504 and 505 indicates that the occupant of the room associated with the flip-flop has checked out and that the room is vacant, ready to be made up. Later, when a high-level signal is transmitted to Main Display 5 on the "Maid Vacant" lead indicating that room number 1 has been made up and vacant, the three input leads to NAND gate 503 will all have high-level signals and the signal on the output lead from NAND gate 503 will thus drop to a low level for 200 milliseconds, the duration of the output pulse from one shot 176 (FIG. 1d).

The output lead from NAND gate 503 is connected through resistor 515 to the base of PNP transistor T512. A low level signal on the base of this transistor turns on this transistor thereby passing its collector current through resistors 518 and 519. Connected at the node between these two latter resistors is the base of NPN transistor T513. The voltage drop across resistor 519 turns on transistor T513 which thereby draws current through coils 520 and 523 to set the colors opposite room number 1 on the display to "Green-Black" indicating that the room is vacant and made up, ready for rental.

If by mistake, the maid presses the "occupied" button at the maid terminal, then the levels of the signals on the three input leads to NAND gate 507 go high rather than the levels of the signals on the input leads to NAND gate 503. The signal on the output lead from NAND gate 507 consequently would drop to a low value for 200 milliseconds. This drop in signal level is transmitted to the Clerk's Control Panel 4 (FIGS. 1 and 4a) where it indicates, in a manner to be described later, that an error exists as to the status of the room whose number is displayed. The clerk would then dispatch someone to determine the correct status of the room.

On the other hand, the maid might indicate that the room is vacant and made up when the occupant has yet to check out. In this situation, the output lead from NAND gate 504 would still carry a low-level signal while the output lead from NAND gate 505 would carry a high level signal. The receipt of a vacant signal would raise the signal levels on all three input leads to NAND gate 506 to high levels. Thus the output signal level from NAND gate 506 would drop to a low level indicating a "-skip". This signal would likewise be transmitted to the Clerk's Control Panel 4 (FIGS. 1 and 4a) where the room number and the fact that a "skip" had occurred with respect to this room would both be displayed.

Finally, it is possible that the occupant of a room has yet to check-out but the maid has made up the room. Consequently, the maid would press the "occupied" button at the maid terminal. Thus a high level signal would be received from buffer 181–d on the "Maid-Occupied" lead to NAND gate 507. The other two input leads to NAND gate 507 are connected to the output lead from inverter 501 and to the output lead from NAND gate 504. The signal level from inverter 501 is high. However, the output signal level from NAND gate 504 is still low as the occupant has yet to check out. Consequently, the output signal level from NAND gate 507 remains high and does not change in response to the "Maid Occupied" signal. Likewise, because the room is still occupied, the color on the display opposite the room number will remain "Black-Black."

Later, when the occupant of the room checks out, the cashier will transmit the room number together with the fact that the occupant has checked out to Main Logic 1 (FIG. 1). The main logic will then send a high level signal of 200 milliseconds duration on the "cashier" lead to Main Display 5 detailed in FIG. 5a. This high level signal will, as described above, together with the room number, activate NAND gate 502 and change the colors displayed opposite the room number from "Black-Black" to "Black-Red." The room will now have to be checked by the maid or housekeeper and even though the room earlier was made up, another signal with respect to this room will have to be transmitted to the main logic indicating that in fact the room still is made up. This ensures that before the clerk rents the room, a maid will check the room to empty ashtrays, clean the bathroom and perform other services essential to readying the room for rental.

The clerk by pressing button 509 (FIG. 5a) resets the state of NAND gates 504 and 505 to their nominal values wherein the signal level from NAND gate 505 is high. Pressing button 509 places a low-level signal on one input lead to NAND gate 505 through diode 508. At the same time, a current passes through coil 521 and diode 528 thereby setting the color adjacent the corresponding room number to either "Black-Black" or "Black-Red."

The "Black-Black" colors are obtained when the clerk rents a vacant and made up room represented by the "Greeen-Black" color on Main Display 5. Upon renting the room, the clerk pushes button 509 and changes the color displayed adjacent the room from "Green-Black" to "Black-Black."

The color "Green-Red" corresponds to the anomalous situation mentioned earlier where the cashier has erroneously transmitted to the main logic the number of a room already vacant and made up and thus represented by the colors "-Green-Black," as the room from which an occupant is checking out. Upon seeing the "Green-Red" colors opposite this room number on Main Display 5, the clerk sends the housekeeper to check the status of the room and at the same time presses the reset button 509 changing the colors adjacent the room number to "Black-Red" meaning the room is "vacant, not made up." But pressing button 509 also resets NAND gates 504 and 505 to their nominal states, indicating that the room is occupied. By setting the room number in the dials on the Clerk's Control Panel 5, and pressing button 470 (FIG. 4c) NAND gates 504 and 505 are reset, in a manner to be described in the Clerk's Control Panel section, to indicate the room is vacant. The displayed colors "Black-Red" now correspond to the room's status stored in the display logic. The housekeeper, upon checking the room, discovers the room to be made up. The housekeeper thereupon enters the room number and presses the "vacant" button at a maid's terminal. Consequently, the driver circuits in Main Display 5 (FIG. 5) reset the color adjacent the room to "Green-Black" indicating the room to be "vacant and made up."

The cashier can also erroneously transmit to the main logic the number of a room occupied, and thus represented by the color "Black-Black", when an occupant checks out. The color displayed adjacent this room would change to "Black-Red" indicating that the room is vacant and needs to be made up. The maid however would detect the fact that the room was occupied upon cleaning and making up the room. The transmittal from a maid's terminal of the room "occupied" signal would generate an error and call this casher's error to the clerk's attention. Upon confirming that the room indeed was still occupied, the clerk would first change the colors displayed adjacent the room number from "Black-Red" to "-Green-Black" from the Clerk's Control Panel 4 in a manner to be described later, and then to "Black-Black" by pressing button 509 (FIG. 5).

Of course, the colors displayed adjacent the number of the room from which the occupant has really checked out remain "Black-Black." The clerk thus regards this room as occupied even though it is truly vacant. The maid, however, upon cleaning the room notes that the room is vacant. Transmittal of the room vacant status to the main logic, generates a "skip" and thus calls the room number to the attention of the clerk. Upon checking with the cashier, the cashier would then confirm his error and the clerk would change the colors displayed adjacent this room number to "Green-Black" from the Clerk's Control Panel 4.

A third possibility is that the cashier erroneously transmits to the main logic the number of a room already denoted by the color "Black-Red" indicating the room already to be vacant in need of being made up. In this situation, the error would not be detected by the clerk and the room from which the occupant has really checked out would remain "Black-Black" on the panel. When, however, the maid enters the room from which the occupant actually checked out for daily cleanup, she would make up the room and transmit that the room was vacant to the main logic. This would generate a "skip" signal and again call the cashier's error to the clerk's attention. The colors displayed adjacent the room number would be corrected from Clerk's Control Panel 4 (FIG. 1) in a manner to be described.

MAIN DISPLAY PANEL, ARRANGEMENT AND COLOR CODE

FIG. 5b shows the arrangement of the Main Display Panel. The logic which controls the status displayed adjacent each room number is shown in FIG. 5a. A button 509 (FIG. 5a) is located to the left of each room number on the panel. The room numbers are placed in a vertical column on the panel. Each panel displays R room numbers, where R is a selected integer, typically 20. In one embodiment of this computer covering 320 rooms, 16 such display panels were used. Directly adjacent the room numbers are two vertical rows of colors. The first vertical row shows either black or green and the second vertical row shows either black or red. The colors adjacent a given room number are controlled by a logic and driving circuit identical to that shown in FIG. 5a. As explained above in the Main Display section, these colors indicate the status of the room. "Black-Black" means the room is occupied, "Black-Red" means the room is vacant, not made up, and "Green-Black" means the room is vacant, made up.

The fourth vertical column on the panel to the right of the room numbers contains colored switches which indicate which rooms (the statuses of which must be denoted by the colors "Black-Black") are scheduled to be checked out of within the hotel day. If a room's occupant is not scheduled to check out, the scheduled check-out color is solid black; if an occupant is scheduled to check out, this color is shifted by the clerk to "Orange-Black." The scheduled check-out colors are located on a switch. Thus to indicate that the occupant of a room is to check out that day, the clerk merely changes the switch so that the colors "Orange-Black" instead of "Black" show adjacent the room number. Changing this switch from "-Black" to "Orange-Black" increases by one the total "scheduled check-outs" for that day shown on the clerk's display panel (FIG. 4g). The way this occurs is described in the Clerk's Control Panel section, "Up-Down Counters" subsection.

The fourth colored column to the right of the room numbers on the main display panel indicates whether a room is reserved for that day. Both "vacant" and "occupied" rooms can be reversed. A solid "Black" color in the reservation column indicates that the room is reserved for that day. As with the "scheduled check-out" indicator, the "reservation" indicator likewise is a switch. Changing a switch from all "Black" to "Yellow-Black" increases by one the total "Reservations" shown on the clerk's display panel (FIG. 4g). Changing a reservation switch from "Yellow-Black" to "Black" decreases by one the total reservations shown on the clerk's display panel.

On the other hand, changing the "scheduled check-out" switch from "Yellow-Black" to "Black" has no effect on the total "scheduled check-outs" shown on the clerk's display panel. Only the pressing of the scheduled check-out button 336b (FIG. 3c) by the cashier will reduce the "scheduled check outs" shown on the clerk's display panel. The clerk usually flicks the "scheduled check-out" switch adjacent a room number on the main display panel (FIG. 5b) either when a person checks into the hotel and indicates he is going to check out within the hotel day, or when he is told the occupant is going to check out that day.

As discussed above in the Main Display Section, the clerk presses button 509 when a room is rented. This changes the status color displayed adjacent the room number from "-Green-Black" to "Black-Black." In a manner described in the Clerk's Control Panel Section, Up-Down Counters Subsection, each pressing of button 509 increases the "rooms occupied" count shown on the clerk's display panel (FIG. 4g) by one and decreases the "rooms vacant" count shown on this panel by one.

FIG. 5c shows the switch and wire arrangement used to high-light all the rooms of a given type. The column just to the right of the room numbers shown on the Main Display Panel (FIG. 5b) labeled "Room Type" contains lights. Each light is electrically connected to an appropriate switch in a room type select panel such that when that particular switch is pressed, the lights adjacent all rooms of the type denoted by that switch turn on. FIG. 5c shows ten room type selector switches. Thus ten different types of rooms can be categorized. Each switch contains two contacts, each of which is normally open-circuited. Upon pressing a given switch, for example switch 531, the arm associated with switch 531a is also brought into contact with its corresponding node such that current from a standard AC power supply flows through switches 531 and 531a turning on bulb 541–1. Bulb 541–1 indicates that all the room numbers on the Main Display Panel (FIG. 5b) adjacent to which a light turns on are of room type 1. Room type 1 might for example represent all rooms with double beds.

A two-of-seven code is used to minimize the number of leads required to turn on the light bulbs adjacent all room numbers of a given type. A two-of-seven code allows seven leads to represent 10 different room types. For example, all rooms of room type 1 have their room type lights wired to leads 0 and B. All type 2 rooms have their adjacent lights wired to leads 1 and B. All type 3 rooms have their lights wired to leads 2 and B.

Lead A is used in conjunction with leads 0 through 4 to denote room types 6 through 10.

The lights adjacent a given type room, for example the lights adjacent all rooms of type 1, are connected between lead 0 and lead B in parallel with each other and with light 541–1. The lights adjacent the other rooms representing other room types, are similarly connected in parallel with the appropriate light 541.

HOUSEKEEPER DISPLAY

Housekeeper Display 7 (FIG. 1) lists all the rooms by number. Beside each room two colors denote that room's status. "Black-Black" indicates that a room is occupied. "Black-Red" indicates that a room is in need of being made up. And "Green-Black" indicates that a room is made up.

It should be noted that the housekeeper's display indicates only whether a room is "occupied," "in need of being made up", and "made up". The status of the room, i.e. whether the room is "vacant" or "occupied" is not shown on the housekeeper's display. Thus the color combination "Green-Black" merely indicates that a room is made up and not that the room is vacant.

FIG. 6 shows the driving circuits in the housekeeper's display associated with room 1. The circuits used with the other rooms are identical. While the numbers used to identify the components in FIG. 6 should be followed by a −1 to indicate that the circuitry shown operates only on the colors displayed adjacent room number 1, for simplicity the −1 will be omitted from most of the numbers shown in FIG. 6.

It should also be noted that the circuitry in FIG. 6 is driven by signals from pulse width detector, shift register, decoder and buffer circuitry in Housekeeper Logic 6 similar to that shown in FIGS. 1d and 1e. Housekeeper Logic 6 also contains an auxiliary reset circuit similar to the circuit shown in FIG. 1g. The reset pulse from this circuit is used to reset the shift register, decoder and buffer circuitry in Housekeeper Logic 6. For explanatory convenience only, the input signals to the circuitry shown in FIG. 6 are labeled as coming from FIG. 1e though as explained above, these signals actually come from identical circuitry in Housekeeper Logic 6.

When the cashier checks out the occupant of a room, that room number is transmitted to registers 170–1 through 170–3 (FIG. 1e) and from these register through buffers 181-a through 181–c to the NAND gate 181–m corresponding to the room. m is an integer representing the number of the room from which the occupant checked out.

Shown in FIG. 6 is NAND gate 181–1, associated with room 1. The receipt of the binary-encoded decimal number 1 in registers 170–1 through 170–3 results in the input signals on the leads to NAND gate 181–1 going to high levels. Thus the output signal from NAND gate 181–1 drops to a low level. Inverted in inverter 601 to a high level signal, it is then applied to one input lead to NAND gate 602. The other input lead to NAND gate 602 is a high level signal derived from NAND gate 182–5 through buffer-inverter 181–d (FIG. 1e) indicating that the identify register 170–4 (FIG. 1e) contains the binary number 000X. NAND gate 602 thus produces a low level output signal. Applied through resistor 604 to the base of PNP transistor T606, this low level output signal turns on transistor T606. The collector current from transistor T606 passes through series-connected resistors 608 and 610. NPN transistor T612 is then turned-on by the voltage drop across resistor 610. The collector current through transistor T612 passes through coil 615 thereby changing the colors displayed opposite room 1 from "Black-Black" to "Black-Red" indicating that room 1 is vacant and must be made up.

When the room is made u the maid or housekeeper transmits its status to Main Logic 1. Signals are thus transmitted to NAND gate 603 from both NAND gate 181–1 (FIG. 6) through inverter 601, and from either NAND gate 182–6 (FIG. 1e) which produces a low-level 200 millisecond pulse when the room status is "occupied," or from NAND gate 182–7, which produces a similar pulse when the room status is "vacant". The signal from NAND gate 182–6 or 182–7 is passed through an OR gate (not shown) and inverted to a high-level signal before being applied to the "MAID (OCC/VAC)" lead to NAND gate 603. The combination of two high-level signals on the input leads to NAND gate 603 produces a low-level signal on the output lead from NAND gate 603. This low-level signal is applied, through resistor 605, to the base of transistor T607 and thus turns on transistor T607. Transistor T607's collector current passes through series-connected resistors 609 and 611. The voltage drop across resistor 611 turns on NPN transistor T613. Collector current through transistor T613 passes through coils 617 and 614 thereby to change the second color code corresponding to that room number from either "Black-Black" (if the room is occupied) or "Black-Red" (if the room is vacant) to "Green-Black" indicating that the room is made up and ready for occupancy.

Thus the signal from the maid terminal indicates only that a room has been made up. The housekeeper is not concerned with whether the room is vacant or occupied. The housekeeper must merely insure that each room which was used the previous night is cleaned and made up ready for use the following night. Whether the occupant be a new resident or a holdover from the previous night is of no concern to the housekeeper.

In the morning, the person (usually the housekeeper) who is responsible for monitoring the statuses of the rooms to be sure that they are made-up, ready for occupancy, first presses master reset button 622, immediately changing the colors adjacent blocks of rooms to either "Black-Red" or "Black-Black", denoting that the rooms were used the previous night. As shown in FIG. 6a pressing button 622 changes the color codes adjacent the rooms connected to leads 621-1 through 621-W, where W represents the number of such leads 621 connected to switch 622.

For example if the colors adjacent a room were previously "Green-Black" indicating that the room had earlier been made up, pressing button 622 changes the colors adjacent this room to "Black-Black" indicating that the room had been occupied the previous night. On the other hand, if the occupant of the room has already checked out before the housekeeper arrives at work, the colors adjacent that room number will already be "Black-Red". Pressing button 622 then has no effect on these colors which remain the same.

Next, the housekeeper receives from the clerk a listing of the rooms which were not occupied the previous night. The housekeeper then presses buttons 618, one such button being associated with each room number on the housekeeper's display, to change the colors adjacent the unoccupied rooms to "Green-Black" indicating that these rooms are already made up and thus ready for occupancy. The housekeeper, if she desires, can first check these rooms to make sure that the clerk has not made an error in listing a room as previously unoccupied which indeed was occupied.

At the end of the day, all the rooms on the housekeeper's display panel should show the colors "Green-Black" indicating that all rooms in the hotel are made up, ready for occupancy.

Some of the same errors which occur on Main Display 5 (FIG. 1) can also occur on Housekeeper's Display 7. For example, the cashier can inadvertently transmit to Main Logic 1 the number of a room already made up and ready for occupancy as the number of the room from which the occupant is checking out. Thus the colors adjacent that room number on the housekeeper's display will change from "Green-Black" to "Green-Red." The housekeeper will immediately know that the cashier has made an error and will consequently check out the room to determine its correct status. The housekeeper's display will be corrected from Clerk's Control Panel 4 as described above in the Main display section. The room from which the occupant actually checked out will be monitored during the course of the day by the housekeeper because it will be represented on the housekeeper display by the colors "Black-Black" indicating the room to be occupied and in need of being made up.

It should be noted that before the occupant of a room checks out and before the maid enters the room to make up the room, the color displayed opposite the room number on both Main Display 5 and Housekeeper Display 7 is "Black-Black." If, before the occupant of the room checks out, the maid enters the room and makes up the room, and then sends to the main logic a signal indicating the room to be occupied, no change occurs in the colors displayed adjacent the room number on the main display. These colors remain "Black-Black." But the colors displayed adjacent the room number on the housekeeper display change from "Black-Black" to "Green-Black" indicating the room to be made up. The housekeeper, of course, has no interest in whether the room is vacant, ready for a new occupant, or "occupied." All the housekeeper is concerned about is whether the room needs to be cleaned or already has been cleaned. A "Green-Black" color adjacent a room number indicates to the housekeeper that the room has been cleaned up. Then, when the occupant of the room checks out, the signal from the cashier will change the colors adjacent the room number on the housekeeper's display from "Green-Black" to "Green-Red." Here, the cashier has made no mistake in transmitting the wrong room number to the main logic. Rather, the "Green-Red" color adjacent the room number means to the housekeeper that even though the room has been made up the room must be checked, and if necessary, recleaned, before the room can be rented. Transmittal of the room number together with its status as "vacant" to the main logic results in changing the colors displayed adjacent the room number on the housekeeper's display from "Green-Red" to "Green-Black" again indicating the room to be made up and ready for occupancy. If, however, the occupant of the room has not checked out after the room has been cleaned, the housekeeper does not have to recheck the room that day.

CLERK'S CONTROL PANEL

As shown in FIG. 1, the room clerk has a control panel. This panel displays any error in the status of a room, the number of the room whose status is in error, and certain other information, particularly the number of rooms vacant and occupied, the scheduled check-outs for the day and the scheduled reservations for the day. In addition, the clerk can dial in the number of a room and then update the status of that room displayed on Main Display 5 and Housekeeper Display 7. There are two possible corrections which can be introduced by the clerk. First, the main display can show that a given room is occupied ("Black-Black"). The clerk can correct this to indicate that the given room is vacant and needs to be made up ("Black-Red"). This is equivalent to the change which would be made in the status of the room by the cashier. The clerk can also change the status of the room to indicate that the room is vacant and made-up ("Green-Black"). This is equivalent to the information which would be transmitted to the main display from a maid terminal. Both of these clerk-induced changes also change the housekeeper's display accordingly.

That portion of the clerk's control panel which allows the clerk to update the displayed status of a room appears to Main Logic 1 as a maid terminal. In fact, the clerk's control is the last transmitting terminal scanned by scan ring 10 (FIG. 1b), before the scan ring begins to rescan the maid terminals.

Certain components used in the clerk's control are identical to components used in a maid terminal (FIGS. 2a and 2b). Such identical components are numbered identically in both the clerk's control and the maid terminals because such components serve identical functions in both the clerk's control and the maid terminals. Thus all the components numbered in the two hundreds in the clerk's control are identical to components used in the maid terminals.

FIGS. 4c and 4d show in more detail the clerk's control. The clerk's control has two possible modes of operation. In one mode, the clerk presses button 470 to change the colors displayed adjacent a given room number from "Black-Black" meaning "unoccupied" to "Black-Red" meaning "vacant, not made up." This is called the "single scan" mode of operation. In the second mode, the so-called "double scan" mode of operation, the clerk depresses button 471. This change the displayed status of the given room from "Black-Black" meaning "occupied" to "Black-Red" meaning "vacant not made up", and then to "Green-Black" meaning "vacant, made-up."

Just as at a maid terminal, the clerk enters the room number by turning three dials, one representing the hundreds digit of the room number, one representing the tens digit of the room number and one representing the units digit of the room number. These dials are placed on the exterior of the clerk's control panel.

Depressing button 470 changes the signal level on the output lead from NAND gate 473 from low to high in response to the grounding of one of the input leads of NAND gate 473 through button 470. The output signal from NAND gate 473 is coupled to one of the input leads to NAND gate 472. The voltage on the other input lead to NAND gate 472 rises momentarily to a high level when button 470 is pushed. Thus the signal level on the output lead from NAND gate 472 drops momentarily from high to low.

The brief drop in signal level on the output lead of NAND gate 472 is transmitted to one input to NAND gate 476 connected with NAND gate 477 to form a bistable flip-flop and is also used to set flip-flop 479 such that the signal levels on the 0 and 1 output leads from this flip-flop are low and high respectively. The input leads to NAND gate 476 normally all contain high level signals. The momentary dropping of the signal level on the output lead from NAND gate 472 thus changes the signal level on the output lead from NAND gate 476 from low to high. The high level output signal from NAND gate 475 is transmitted both to one input lead to NAND gate 477 and to one input lead of both AND gates 481 and 487. The other input lead to AND gate 481 is connected through inverter (i.e. OR gate) 480 to ground. Thus the output signal from AND gate 481 changes from a low to a high level thereby enabling one-shot 482. One-shot 482 produces a negative going output pulse on its 0 output lead for a period of time controlled by capacitor 483 and resistor 484. Typically this output pulse has a duration of 1 millisecond.

The high level signal transmitted from NAND gate 476 to one input to AND gate 487 has no effect on one shot 488 unless the output signal from NAND gate 485 connected to the other input lead to AND gate 487 through OR gate 486 (arranged as an inverter) is low level. One input lead to NAND gate 485 is derived from the "Good Data" line. The signal level on this line, derived from OR gate 172-1 (FIG. 1g), is normally low. Thus the output signal level from NAND gate 485 is normally high and the pressing of button 470 fails to activate one-shot 488.

The negative-going output pulse from one-shot 482 is sent to one input to NAND gate 226. Cross coupled to NAND gate 227 such that the normally high-level signal from NAND gate 227 is transmitted to a second input to NAND gate 226, and with the third input signal to NAND gate 226 being the normally high-level signal on the 0 output lead from one-shot 488, NAND gate 226 normally produces a low-level output signal. However, as a result of the negative pulse from one-shot 482, the state of the bistable flip-flop comprising NAND gates 226 and 227 shifts such that NAND gate 226 produces a high-level signal. This high-level signal is transmitted to one input lead to NAND gate 225, the other input lead to which is connected the 1 output lead from flip-flop 234, which normally carries a low level signal. The output signal from NAND gate 225 remains at a high level until the output signal on the 1 output lead from flip-flop 234 switches from a low to a high level.

When the signal level from NAND gate 226 goes high in response to the negative pulse from 0 output lead of one-shot 482, the signal level on the output lead from NAND gate 227 drops low. This low level signal is transmitted to one input lead of NAND gate 231. The other input lead to NAND gate 231 receives the normally-high output signal from inverter 230. Consequently the output signal from NAND gate 231 rises from low to high. This high-level signal is transmitted on lead 245-N to scan ring 10 (Main Logic 1, FIG. 1b) and there is used to activate the Ready Key generator. The clerk's control, however, does not use a tone signal, as do the maid terminals, to initiate data transfer. Being close to Main Logic 1, a separate line carries the Ready Key signal directly to the clerk's control. The 50 millisecond Ready Key signal is transmitted through inverter 106 and then through NAND gate 110-N, enabled by the high-level signal on the 1 output lead of flip-flop 101-N in scan ring 10 (FIG. 1b). From NAND gate 110-N the Ready Key signal is used to toggle flip-flop 234. Because the signal is again inverted at the input to flip-flop 234, the terminal edge of the approximately 50 millisecond pulse from inverter 491 actucally toggles flip-flop 234. At this time, the output signal from NAND gate 225 switches from high to low. From NAND gate 225 this low level signal is transmitted to a bistable flip-flop consisting of NAND gates 223 and 224 (FIG. 4d), thereby changing the output signal level from flip-flop 223 from low to high.

As shown in FIG. 2b, and as discussed in the Maid Terminal section, the output signal level from NAND gate 223 is normally a low level signal, while the output signal from NAND gate 224 is normally a high level signal. The new, high-level output signal from NAND gate 223 is transmitted on lead 244 to enable the six serially-connected flip-flops in divider 216. Just as in the Maid Terminal, divider 216 is driven by a signal from clock 217. Clock 217 (shown in FIG. 4f) full-wave rectifies the 60 hertz power supply to produce a 120 hertz output signal. Data transmission from Clerk's Control Panel 4 to Main Logic 1 (FIG. 1) then begins.

Once the clerk has pressed button 470, for example, and generated a pulse from one-shot 482, the duration of this pulse is of no importance. Rather the state of bistable flip-flop comprising NAND gates 226 and 227 (FIG. 2b) is shifted by a momentary pulse and, because this flip-flop is bistable, its new state is retained until this flip-flop is reset. Thus if the scan ring is temporarily disabled through the transmission of data from a maid terminal or from the cashier, the data input by the clerk will be retained in the clerk's control until the scan ring reaches and interrogates the clerk's control.

It should be noted that when the clerk presses button 470, he is changing the color displayed opposite a room number from "Black-Black" indicating the room to be occupied to "-Black-Red" indicating the room to be vacant, not made up. This change normally comes from the cashier. Accordingly, the first four binary bits in the data sequence transmitted from the clerk's control represent the binary number 0000 corresponding to an unscheduled checkout. This is assured by the bistable flip-flop consisting of cross-coupled NAND gates 221 and 222. Normally, the input signal on the input lead to NAND gate 221 connected to the 0 output lead from one-shot 488 is high level. The output signal from NAND gate 221 is low level. The signal level on that input lead to NAND gate 222 which is connected to the output lead from enabling NAND gate 215-2 is normally high level. However, because the output lead from NAND gate 221, which contains a normally low level signal, is coupled to the other input lead to NAND gate 222, the output lead from NAND gate 222 contains a normally high level signal. This high level signal is passed to one input lead to NAND gate 221. The low level signal from NAND gate 221 is passed to NAND gate 220.

The signal on the other input lead to NAND gate 220 is derived through inverter 281 from the output lead of enabling NAND gate 215-1. The signal level from NAND gate 215-1 is normally high except during the first 16 cycles of clock 217 during which NAND gate 215-1 is enabled. For this time, its level drops from high to low. Thus for the first 16 clock cycles, the output signal from inverter 281 becomes a high level signal. However, the output signal from NAND gate 220 is still high due to the low level signal on the output lead from NAND gate 221.

As explained above in the Maid Terminal section, a high level signal from gate 220 (corresponding to a binary 0) means the room is vacant while a low level signal from NAND gate 220 (corresponding to a binary 1) means the room is occupied. In a maid terminal, the output lead from NAND gate 220 is connected to one input lead of OR gate 207-4. In the clerk's control panel, however, the output lead from NAND gate 220 is connected to one input lead of OR gate 207-3. As will be seen, NAND gate 220 is thus used in the clerk's control to generate the binary 1 in the "identify" number 0010 meaning a room is "vacant, made up" rather than to indicate the status of a room.

The output signal from NAND gate 220 in FIG. 4d must be a high level signal during the change of the colors displayed opposite a room number from "Black-Black" to "Black-Red," because these latter colors are generated by the cashier's signal identified by the binary number 0000. Thus the identify code transmitted during this clerk-induced color change must be just 0000, corresponding to the cashier identify code. The clerk's control is hardwired as shown in FIG. 4d to produce four binary zeroes during the first sixteen cycles of clock 217.

It should be noted that for simplicity, switches 206 and the associated wiring interconnecting these switches to enabling NAND gates 215 and OR gates 207 are omitted from FIG. 4d. This circuitry is shown in detail in FIG. 2a.

To change the colors displayed opposite a room from "-Black-Black" to "Green-Black", the clerk dials in the room number and then presses button 471. Pressing button 471 results in a low level pulse being applied to one input lead of NAND gate 475. NAND gate 475 is cross-coupled with NAND gate 474 to form a bistable flip-flop. The signal level on the output lead from NAND gate 475 is normally low. Pressing button 471 changes this level to high. This high-level signal is then applied to one input lead of NAND gate 474 causing the output signal from NAND gate 474 to drop to a low-level signal momentarily. When button 471 returns to its normal position, it again applies a low-level signal to the other input lead to NAND gate 474 resulting in the output signal level from NAND gate 474 rising back to its normal high level. However, the low-level pulse from NAND gate 474 drives the output signal from NAND gate 476 to a high level, thereby triggering one-shot 482, and also sets flip-flop 479 such that the signal levels on its 0 and 1 output leads are respectively high and low.

The high level signal on the 0 output lead from flip-flop 479 is transmitted to one input lead of NAND gate 485. The signal on the other input lead to NAND gate 485 is derived from the "Good Data" line which normally contains a low level signal. (Notice that the "Good Data" signal level in the main logic is normally high). Thus the output signal level from NAND gate 485 is normally high. This high-level signal is transmitted through OR gate 486, inverted in this OR gate, and then applied as a low level signal to one input lead of AND gate 487 which drives one-shot 488.

The low-level signal on the "Good Data" line is also applied to one input lead of NAND gate 478. Thus NAND gate 478 produces a normally high-level output signal. The other input lead to NAND gate 478 is connected to the 1 output lead from flip-flop 479. This 1 output lead contains a normally low level signal.

Thus the pressing of button 471 results in an output pulse being produced from one-shot 482 just as the pressing of button 470 resulted in such an output pulse. Consequently, as just described in conjunction with the pressing of button 470, the room number placed into the clerk's control by the clerk is transmitted to the main logic preceded by four binary zeros, representing the cashier "identify" code. This changes the colors displayed adjacent the room from "Black-Black" to "-Black-Red."

Upon the receipt of 16 "Good Data" pulses at the main logic, a positive reset pulse is received on the "Good Data" line. This reset pulse is applied to one input lead of NAND gate 478. The other input lead of NAND gate 478 contains the normally low level signal from the 1 output lead of flip-flop 497. Thus the output signal from NAND gate 478 remains high and the bistable flip-flop consisting of cross-coupled NAND gates 476 and 477 remains as set by the pressing of button 471. The positive pulse on the Good Data line is also applied to one input lead of NAND gate 485 resulting in a negative pulse being transmitted to OR gate 486. OR gate 486 inverts this negative pulse to a positive pulse thereby enabling AND gate 487 and activating one-shot 488. One-shot 488 produces a negative output pulse of about 1 millisecond duration on its 0 output lead. This negative pulse from one-shot 488 is transmitted both to one input lead of NAND gate 226 to change the output signal level from this NAND gate from low to high and to one input lead of NAND gate 221 (FIG. 4d) changing the level of the output signal from NAND gate 221 from low to high and simultaneously changing the level of the output signal from NAND gate 222 from high to low. The high-level signal from gate 221 is transmitted through NAND gate 220 as a low-level signal. This low-level signal, representing a binary one, is then applied to one input lead or OR gate 207-3. OR gate 207-3 functions just as does the identically numbered OR gate in FIG. 2a. Consequently, the "identify" code occupying the first four binary bits in the second data sequence to be transmitted from the clerk's control panel represents the binary number 0010 representing a maid "vacant" signal. Consequently, the colors displayed adjacent the room number transmitted by the clerk to the main logic change from "-Black-Red" to "Green-Black" indicating the room is "vacant, made up," ready for rental. The positive "Good Data" pulse which triggered one-shot 488 is also used to toggle flip-flop 479. Inverted at the input to flip-flop 479, this pulse appears as a negative pulse to flip-flop 479 and thus the trailing edge of this pulse toggles flip-flop 479 such that the signal levels on its 0 and 1 output leads shift from high and low respectively, to low and high respectively. The high level signal from the 1 output lead enables flip-flop 479 to later be shifted back to its normal condition and also is applied to one input lead of AND gate 478. Consequently, upon the receipt of the second sequence of 16 "Good Data" pulses in the main logic from the clerk's control, the "Good Data" reset pulse applied to NAND gate 478 results in the output signal from NAND gate 478 dropping from high to low. This shifts the state of the bistable flip-flop consisting of NAND gate 476 and 477 such that NAND gate 476 produces a low-level output signal and NAND gate 477 produces a high-level output signal.

The low level signal on the 0 output lead from flip-flop 479 applied to NAND gate 485 effectively disables NAND gate 485 preventing the "Good Data" reset pulse from again activating one-shot 488.

It should be noted that after the first 16 pieces of data have been transmitted from the clerk's control, changing the color displayed opposite the room number from "Black-Black" to "Black-Red," the output state of NAND gate 226 has already been returned to its normal low level by a reset signal from section C1 of shift register 216. As discussed above in the section on the maid terminal, after two cycles of clock 217, the signal level on lead C1–8 from shift register 216 drops from high to low. This low-level signal switches the state of the bistable flip-flop comprising NAND gates 226 and 227 back to its normal condition, with the output signal from NAND gate 226 being low-level. Upon the receipt of the pulse from one-shot 488, the output signal from NAND gate 227 again switches from high to low-level, thereby driving the output signal from NAND gate 231 to a high level. This high level signal again immediately disables NAND gate 126 (FIG. 1c) preventing pulses from clock 131 from driving scan ring 10. The 50 millisecond Ready Key signal is also transmitted to flip-flop 234 and used to initiate the transmission of the second sequence of data which changes the color displayed adjacent the room number immediately from "Black-Red" to "Green-Black."

For error-free operation, the clerk's control is hard wired such that pressing button 470 produces the cashier's identify code in the first four bits of data transmitted to the main logic. Pressing button 471 produces the cashier's identify code in the first sixteen bits of data transmitted to the main logic, and produces a maid terminal "vacant" identify code in the second 16 bits of data transmitted to the main logic.

In the computer described herein, the clock signal derived by full wave rectifying the line power at the clerk's control is sent to the cashier's terminal and there used as a source of clocking pulses.

ERROR MONITOR AND DISPLAY

The "skip" and "error" signals from Main Logic 1, which indicate that a conflict exists between the reported and prior-recorded status of a room, are sent from the main display (FIG. 5a) to a skip/error register shown in FIG. 4a (a part of the Clerk's Control Panel 4). Here, the skip or error pulse is operated upon in a logic network and then used to turn on either a skip or an error light. The skip or error pulse is also used to transfer binary data from registers 170–1, 170–2, 170–3 (FIG. 1e) to registers 460–1, 460–2, and 460–3 (FIG. 4b) respectively. These registers contain in binary form the number of the room the status of which is in conflict. From registers 460–1 through 460–3, the binary information stored therein is transmitted to decoder-drivers 461–1 through 461–3 where this information is converted from binary to decimal form. The decimal information from decoder-drivers 461–1 through 461–3 is then used to activate displays 462–1 through 462–3 which indicate the number of the room the status of which is in conflict.

In addition, the binary data from registers 170–1, 170–2, and 170–3 is sent to a printer 803 (FIG. 4e). Before reaching the printer, this data is passed through buffer matrix 800, consisting of a set of double inverters for each data line, and then sent on cable 804 to printer 805. Upon receipt of a print signal from one-shot 413 (FIG. 4a) together with a signal from skip combiner 401 (FIG. 4a) indicating the type of error (either a "skip" or an "error"), printer 805 prints the number of the room the status of which is in conflict. Preceding this number is a code identifying the type of conflict (a 1 for a "skip," a 0 for an "error").

The operation of the skip/error register shown in FIG. 4a and the skip/error display shown in FIG. 4b will be described in conjunction with a "skip." The system works in an identical fashion on a regular "error."

A skip occurs when the cashier has yet to check out the occupant of a room reported to be vacant by the maid. With a skip, the signal level on the output lead from NAND gate 506 (FIG. %a) drops from a normally high to a low level and then after a short time (200 milliseconds) returns to its normally high level. The negative pulse from NAND gate 506 is transmitted to skip combiner 401, basically a giant OR gate for combining skip signals from the driving circuits associated with all the rooms, and is then transmitted through inverter 410 in pulse shortener 41. Pulse shortener 41 reduces the length of the pulse from NAND gate 506 to avoid "racing" problems created by possible conflicts between logic commands at the beginning or end of the pulse. Such problems arise because of slightly different time delays through the system.

Inverter 410 drives OR gate 412 which in turn drives one-shot 413. One-shot 413 produces an output pulse of about half or less the duration of the output pulse from NAND gate 506. From one-shot 413, this output pulse is sent to one input lead of NAND gate 414 and to printer input buffer matrix 800 (FIG. 4e)

NAND gate 414 produces an output pulse only during the simultaneous presence of positive input pulses on both its input leads. Normally, the output signal level from NAND GATE 414 is high. However, for the duration of the output pulse from one-shot 413, the signal level from NAND gate 414 drops low. This negative pulse, inverted at the input to OR gate 420, is used in a manner to be described shortly, to control the transfer of information from latches 460-1 through 460-3 (FIG. 4b) to decoder-drivers 461 and display units 462. This negative pulse also is applied to one input lead of NAND gate 421, connected in a cross-coupled arrangement with NAND gate 422 to form a bistable flip-flop.

Although the output signal level from NAND gate 421 is normally low, the drop in signal level on one of its input leads from high to low changes its output signal level from low to high and changes the output signal level from NAND gate 422 from high to low.

The high signal level from NAND gate 421 is sent to one input lead of NAND gate 423. The other input lead to NAND gate 423 carries a high signal level derived from the output lead of NAND gate 454. The output signal level from NAND gate 423 then drops low driving the output signal level from NAND gate 425, cross-coupled with NAND gate 426 in a bistable flip-flop, from low to high. Simultaneously, the output signal from NAND gate 426 drops to a low level. The high-level signal from NAND gate 425 together with a high-level signal from flip-flop 450, as will be described, results in the output signal from NAND gate 427 dropping from its normally high to a low level thus supplying, through resistor 429, a low-level signal to the base of transistor T440. Transistor T440 turns on thereby turning on skip light 442.

The high-level output pulse from OR gate 420 is applied to one input each of flip-flops 450 and 451. On the trailing edge of this pulse flip-flop 450 toggles and the signal on flip-flop 450's 1 output lead changes from a low level to a high level. This high-level signal is applied to one input lead of NAND gate 427 as described above, and also to one input lead of NAND gate 428. The signal level on the 0 output lead from flip-flop 450, normally high, simultaneously drops to a low level. This low level signal, inverted at one input to flip-flop 451, then prepares flip-flop 451 such that a second pulse from skip combiner 401 or error combiner 402 before flip-flop 450 is cleared toggles not flip-flop 450 but only flip-flop 451. Flip-flop 451 normally produces low-level and high-level output signals on its 1 and 0 output leads respectively. The high-level signal on the 1 output lead of flip-flop 450 is transmitted to one input lead of NAND gate 454. On the other input lead to NAND gate 454 is a normally high-level signal derived from voltage source $V_{cc}$ through resistor 454a. Pressing of either button 442a, located beneath skip light 442, or button 442b, located beneath error light 443 results in a negative pulse being applied momentarily to one input lead of NAND gate 454 and simultaneously to one input lead of NAND gate 455. NAND gate 455 is cross coupled with NAND gate 456 to form a monostable flip-flop. The other input lead to NAND gate 455 is connected through resistor 458 to voltage source $V_{cc}$.

When the signal level on the output lead from NAND gate 456 drops low in response to the pressing of either button 442a or 442b, current flows from voltage source $V_{cc}$ through resistor 458 to charge capacitor 457. As capacitor 457 charges, the voltage on the node between capacitor 457 and resistor 458 rises. When this voltage reaches a threshold level, the output signal from NAND gate 455 switches from high to low, thereby driving the output signal level from NAND gate 456 high again. The positive output pulse from NAND gate 455 is inverted and applied as a negative pulse to one input of each of flip-flops 450 and 451.

When flip-flop 450 is toggled by the trailing edge of the first skip or error pulse from OR gate 420, the two high-level signals on the input leads to NAND gate 454 drive the output signal from NAND gate 454 low thereby disabling NAND gates 423 and 424 and simultaneously enabling information to be transferred from registers 170-1 through 170-3 (FIG. 1) into latches 460-1 through 460-3. From latches 460-1 through 460-3 the room number whose status is in error is decoded by decoder driver circuits 461-1 through 461-3 and shown in displays 462-1 through 462-3. This number is displayed until the clerk notices the error and presses either reset button 442a or 442b associated with skip light 442 and error light 443, respectively. At this time, the negative pulse on one input lead to NAND gate 454 drives the signal on the output lead from NAND gate 454 high. Simultaneously, the reset pulse from NAND gates 455 resets flip-flop 450 to its normal state in preparation for receipt of another "skip" or "error" pulse from OR gate 420.

Suppose that after a "skip" has been received in the skip/error register (FIG. 4a) and before reset button 442a or 442b has been pressed, an "error" is transmitted by a second maid terminal to the main logic. Error combiner 402 then transmits this error pulse through inverter 411 in pulse shortener 41. Pulse shortener 41 works as described above in connection with a "skip" except this time NAND gate 415 produces a negative output pulse. This output pulse, transmitted through OR gate 420 as a positive pulse, has no effect on flip-flop 450 (which has already been toggled by the earlier "skip' pulse) but changes the output signal levels on the 1 and 0 leads from flip-flop 451. The signal on its 0 output lead drops from normally high to low while the signal on its 1 output lead rises from normally low to high. The low level signal on the 0 output lead from flip-flop 451 is used to stop scan ring 10 in Main Logic 1 until the clerk detects the first room number displayed on the error monitor and resets the system by pressing either button 442a or 442b.

When the second "error" pulse arrives at flip-flops 450 and 451, the output signal level from NAND gate 454 is low thereby disabling NAND gates 423 and 425 and preventing "skip" light 442 from being shut off and "error" light 443 from being turned on. However, the state of flip-flops 421 and 422 has been shifted and the output signal level from flip-flop 422 is high. When the clerk presses reset button 442a or 442b, the output signal from NAND gate 454 momentarily rises to a high level, thereby enabling NAND gate 424 and allowing "error" light 443 to be turned on and "skip" light 442 to be turned off. But as soon as the clerk stops pressing the reset button, the level of the output signal from NAND gate 454 again drops low because pressing the reset button resets only flip-flop 451.

However, while the signal level on the 1 output lead from flip-flop 451 drops from high to its normally low level in response to the trailing edge of the positive output pulse produced by NAND gate 455 on the pressing or reset button 442a or 442b, the high level signal on the 1 output lead from flip-flop 451 prior to this resetting prevents flip-flop 450 from being reset. However, the next time reset button 442a or 442b is pressed, flip-flop 450 is allowed to be reset by the low level signal on the 1 output lead from flip-flop 451.

Thus as soon as the clerk clears the number of the first room whose status is in error from error monitor display 462, the output signal level from NAND gate 454 again drops to a low level because the levels of the input signals on its two input leads remain high. Consequently, latches 460 are again enabled and the number of the second room whose status is in error is transmitted to latches 460 from registers 170 (FIG. 1e). This number is again decoded and shown in displays 462-1 through 462-3.

Pressing reset button 442a or 442b again, resets flip-flop 450 such that the signal levels on its 1 and 0 output leads return to their normally low and high levels, respectively.

It should be noted that registers 170-1 through 170-3 contain the number of the room for about 200 milliseconds, the time necessary to drive the coils in the main and housekeeper displays shown in FIGS. 5 and 6, respectively. During this time, printer 805 shown in FIG. 4e is receiving binary coded signals indicating the number of the room the status of which is in error as well as a coded indication of the type of error. During the 200 milliseconds that the coils associated with the color displays adjacent a given room number are being set by the coil driving circuits, printer 805 is decoding the room number and printing out this room number together with the type of error.

Thus two modes of displaying errors in the statuses of rooms have been described. One uses a printer which prints in sequence the numbers of the rooms whose statuses are in error as well as the type of error. The other displays the number of the room visually using, for example, nixie tubes, as well as shows the type of error associated with the status of the room by lighting a bulb. When this mode of operation is used, the system can be wired so that the receipt of two errors before the clerk clears the error register, locks the system and prevents further data from being transmitted to Main Logic 1. It should be noted that in this mode of operation, a third error can be stored at a maid terminal while the system is locked up and prevented from scanning. Upon resumption of scanning, this error would then be transmitted to Main Logic 1 and to the Error Display shown in FIGS. 4a and 4b.

CLERK'S DISPLAY PANEL, ARRANGEMENT

FIG. 4g shows the arrangement of the clerk's display panel. Besides showing the total rooms occupied, rooms vacant, scheduled check-outs and reservations, this panel has a switch 881 which allows the clerk to either increase, or decrease, by one the counts shown on his display, or to reset these counts to some initial value. To select the particular count to be adjusted, the clerk turns dial 881 until the pointer points to the proper count. Then he presses button 880u to up the selected count by one, button 880d to decrease the selected count by one, and 880r to reset the count to a selected initial value. This initial value may be programmed to any number between 0 and 999, when three digits are displayed. With a fourth digit displayed, of course, this initial value can be controlled to any number between zero and 9,999. In addition, the clerk has three dials, dials 206-1 through 206-3 corresponding to the dials at a maid terminal. By turning these dials to a selected room number, (FIG. 4d) and then pushing either button 470 or 471 (FIG. 4c) the clerk is able to adjust the status displayed adjacent the selected room number on the main display panel (FIG. 5b) This is described in the Clerk's Control Panel section.

Finally, skip light 442 and error light 443, together with skip button 442a and error button 442b are shown on the bottom of the clerk's display panel. As described above in the section on the Error Monitor and Display, these lights turn on to indicate either a skip or an error. Pressing either button 442a or 442b resets the circuit in preparation for the receipt of a new error or skip.

UP-DOWN COUNTERS

The operation of the logic in the counting circuits associated with displays 890 through 893 on the Clerk's Control Panel 4 will now be described. The circuits associated with the "scheduled check-out" and "reservation" switches shown on the main display panel (FIG. 5b) are shown in FIG. 4h. While the circuits used to detect the movement of a scheduled check-out or reservation switch are substantially similar, the reservation detector circuit is able to indicate both an increase and a decrease in the number of rooms reserved. On the other hand, the scheduled check-out circuit only detects an increase in the scheduled check-out count. Only the cashier can decrease the scheduled check-out count in the normal course of operation. Thus the detector circuit associated with the "scheduled check-out" switches lacks the circuitry for detecting a decrease in the scheduled check outs.

Each reservation switch 810-1 through 810-R, where R equals the total number of rooms displayed on a given panel, consists of a parallel-connected switch and resistor. When a switch shows all black on the main display panel, the switch 810-r shorts out the associated resistor, 811-r. Current is drawn through the parallel-connected switch and resistor by a constant current source consisting of transistor T812, the base of which is connected to ground through resistor 815. Coupled between the collector of this transistor and a positive voltage source are R series-connected switch-resistor parallel combinations.

The total current through these series-connected switch-resistor parallel combinations is constant. However, the voltage drop across these series-connected switch-resistor combinations changes each time a switch is arranged to short-circuit the corresponding parallel-connected resistor. Thus switch 810-(R-1 is shown short-circuiting resistor 811-(R-1). This short-circuiting indicates that room (R-1) is reserved. Upon closing switch 810-(R-1) so as to short resistor 811-(R-1), a positive voltage change occurred on the collector of transistor T812 due to the decreased resistance through which the constant current drawn by this transistor had to flow. This positive voltage change is differentiated by capacitor 816 and transmitted as a positive voltage pulse past a filter circuit consisting of resistors 817, 819 and capacitor 818 and applied to the input lead of differential amplifier 820. Amplified by amplifier 820, this positive pulse is passed through resistor 823-1 to a second stage amplifier 827. Passed from amplifier 827 through resistors 828 and 289, this positive pulse is detected by one of two voltage comparison circuits, each arranged to detect only pulses of a corresponding polarity. Thus sense amplifier 830 detects a positive voltage pulse. Further amplified by this amplifier and inverted at its output lead, this pulse is reinverted by amplifier 834. This pulse is next passed to the input lead to up-down logic 882 (FIG. 4j) associated with the total reservations count 890 shown on the clerk's display panel (FIG. 4g).

If after switching the reservation switch 810-(R-1) adjacent room (R-1) to "Yellow-Black" the clerk received a cancellation of the reservation, he would then place resistor 811-(R-1 back into the collector path of transistor T812 by opening switch 810-(R-1). The color in the reservation column adjacent room (R-1) would become "Black" again. The collector voltage of transistor T812 would drop a selected amount. This drop, differentiated by capacitor 816, would again be passed through differential amplifiers 820 and 827 to sense amplifiers 830 and 840. Being a negative pulse, sense amplifier 840 would be activated. Sense amplifier 840 would produce a negative pulse which in turn would be inverted by amplifier 842 to a positive pulse. Transmitted to another input lead to up-down logic 882 (FIG. 4j) associated with reservations count 890 on the clerk's display panel, this pulse would be used to decrease the total reservations count by one.

FIG. 4i shows the circuit used to detect the pressing of button 509 (FIG. 5a and 5b). The clerk presses button 509 adjacent a room when a room is rented. This changes the status colors displayed adjacent the room number from "Green-Black" to "Black-Black." Pressing button 509 results in a surge of current flowing through resistor 855 (FIG. 4i). This creates a positive voltage pulse which is passed through resistor 850-1 to one input lead of amplifier 852. Inverted by amplifier 852, this output pulse is reinverted by amplifier 854 and passed as a positive pulse to the "up" input lead of Up-Down Logic 884 (FIG. 4j). Logic 884 controls the count displayed by "occupied" and vacant" counters 892 and 893 (FIGS. 4j and 4g).

The signal on the "down" input lead to Up-Down Logic 884 (FIG. 4j) is derived from gate 182–5 (FIG. 1e) connected such that its output signal level goes low in response to a scheduled or unscheduled checkout. Thus when an occupant checks out of a room, and the cashier presses either the "scheduled" or the "unscheduled" checkout button 336a or 336b (FIG. 3c), a pulse is generated which decreases the occupied count 892 by one and increases the vacant count 893 by one. It should be noted that changing the scheduled check-out switch on FIG. 5b from "Yellow-Black" to "Black" has no effect on the "occupied" or "vacant" count. This count can be changed only by the occupant checking out and a signal so indicating being generated either by the cashier or the clerk.

In FIG. 4i, R buttons 509 are connected through a given resistor 850 to the input of amplifier 852. Each panel on the main display (FIG. 5b) is connected to one resistor 850. In one embodiment, there were 10 such panels, and thus there were 10 resistors 850.

FIG. 4j shows the Up-Down Logic 882 associated with the reservations up-down counter 890. Up-down logic 883 associated with the scheduled check-out up-down counter 891 and up-down logic 884 which controls the occupied and vacant up-down counters 892 and 893, respectively, are identical to up-down logic 882 and thus will not be shown in detail. It should be mentioned, however, that the "up" signal to drive up-down logic 883 is derived from a circuit associated with the scheduled check out switches on the main display panel (FIG. 5b). As mentioned above, these se switches allow the clerk to increase the scheduled check-out count by one. Only the pressing of the scheduled check-out button 336b (FIG. 3c) by the cashier will decrease the scheduled check-out count in counter 891 in the normal operation of the system. Alternatively, the clerk's control panel (FIG. 4g) has a switch 881 which the clerk can use in conjunction with up button 880u, reset button 880r and down button 880d to reset or change the count displayed on any counter 890 through 893.

Switches 880u, 880r and 880d are shown in FIG. 4j in conjunction with dial 881. By placing the pointer on dial 881 on either the "occupied," "vacant," "reservation," "check-out" leads, and then pressing a selected one of buttons 880, the clerk is able to selectively change the count displayed in anyone of counters 890 through 893. Pressing button 880u increases the count in the selected counter by one. Pressing button 880d decreases the count in the selected counter by one. And pressing reset button 880r resets the count in the selected counter to its programmed initial value. As will be seen shortly, this value can be programmed to any selected number.

The operation of up-down counter control (FIG. 4j) will now be described with dial 881 pointing toward and in contact with leads to the "reservation" up-down logic 882. Pressing button 880u results in a negative pulse being transmitted to OR gate 872. Passed through OR gate 872 as a positive pulse, this pulse is applied to one input lead of AND gate 871–2. The signal levels on the other input leads to AND gate 871–2 are derived from the 0 output lead of one-shot 870, and from OR gate 871–1 connected as an inverter. Because the input signal level to OR gate 871–1 is at ground level, the output signal from OR gate 871–1 is normally high level. Likewise, the output signal level on the 0 output lead from one-shot 870 is also normally high level. Consequently, in response to the pressing of button 880u the output signal from AND gate 871–2 rises to a high level thereby triggering one-shot 871.

One-shot 871 produces two output pulses, a positive output pulse on its 1 output lead and a negative output pulse on its 0 output lead. The duration of these pulses is controlled by the values of resistor 871b and capacitor 871a. The positive pulse from its 1 output lead is passed to reservations up-down counter 890 (FIG. 4k). The negative output pulse on its 0 output lead is passed to AND gate 870–2 to disable this AND gate for the duration of the pulse from one-shot 871. Thus the inadvertent pressing of the down button 880d would have no effect on the reservations up-down counter 890 while the system was processing the voltage pulse produced by pressing up button 880u.

Other inputs to up-down logic 882 are derived from the reservation detector circuit shown in FIG. 4h. The "up" signal is derived from inverter amplifier 834 and is supplied through inverter 873 to the other input of OR gate 872. The "down" signal is derived from inverting amplifier 842 and is applied to OR gate 874 through inverter 875. The one-shots 870 and 871 work in a manner similar to that described in conjunction with the pressing of button 880u.

The pulse on the 1 output lead from one-shot 871 is applied through inverter 495–2 (FIG. 4k) to one input lead of OR gate 496. From OR gate 496 this positive pulse is applied to AND gate 860–2. Because the other input lead to AND gate 860–2 has a normally high-level signal on it derived from OR gate 860–1 connected as an inverter to ground, AND gate 860–2 produces a high level output pulse thereby triggering one-shot 860. The duration of the negative pulse on the 0 output lead from one-shot 860 is controlled again by the values of capacitor 860a and resistor 860b. This negative pulse is applied to drive up-down counter units 497–1, 497–2, and 497–3, thereby increasing the count displayed in these counters by one. The signals stored in counter units 497 are transmitted directly to decoder-driver units 498–1, 498–2, 498–3.

Decoder drivers 498 convert the binary bits representing the count in counters 497 into decimal signals which are used to activate display units 499–1 through 499–3. Typically, display 499 comprises nixie tubes. However, display 499 could also comprise a printer, or a cathode ray tube or any other suitable display mechanism.

A "down" pulse from the 1 output lead of one-shot 870 (FIG. 4j) is transmitted through inverter 495–1 to one input lead of OR gate 496. From OR gate 496 this pulse triggers again one-shot 860. However, this pulse is also inverted and applied directly to up-down counter unit 497–1, 497–2 and 497–3. The simultaneous occurrence of the two pulses at each of the counter units 497 results in decreasing the counts in these units by one. Again, the new count is shown by displays 499.

As shown in FIG. 4j, to reset the count shown in the reservations counter, the clerk presses reset button 880r. A negative pulse is now transmitted directly to reservations up-down counter 890. As shown in FIG. 4k, this reset pulse is applied to one input of OR gate 496 and simultaneously to OR gate 861–1. From OR gate 861–1 this pulse is applied to AND gate 861–2. The output signal from AND gate 861–2 triggers one-shot 861. A negative pulse is thus generated on the 0 output lead from one-shot 861. This negative pulse, which occurs simultaneously with a negative pulse on the 0 output lead from one-shot 860, then resets up-down counter units 497–1, 497–2, 497–3 to a selected initial count. This initial count is determined by controlling which input leads 863–1 through 863–12 are grounded by contacting ground through bus line 862. When all input leads 863–1 through 863–12 are grounded, up-down counter units 497–1 through 497–3 are reset to zero. When selected ones of the input leads 863–1 through 863–12 to counter units 497–1 through 497–3 are grounded, the initial count is set to 999. Varying the input leads in each counter unit 497 which are grounded, allows the count to be set to any initial decimal digit between 0 and 9 in each counter unit. Thus the initial count in any unit can be pre-programmed.

The "scheduled check-out" counter 891, "occupied" counter 892, and "vacant up-down" counter 893 shown in FIG. 4j work in identical manner to the "reservations up-down" counter 890 shown in FIG. 4k. Thus these counters will not be shown in detail.

CASHIER'S TERMINAL

When the occupant of a room checks out, he goes to the cashier and pays his bill. The cashier enters the number of the occupant's room by pressing in sequence the correct ones of buttons 300 through 309 (FIG. 3a) on the keyboard of Casheir's Terminal 3 (FIG. 1). For example, if the guest is checking out of Room 138, the cashier first presses button 301 to denote that the hundreds digit in the room number is "one." Next the cashier presses button 303, to denote that the tens digit in the room number is "three." And finally, the cashier presses button 308 to denote that the units digit of the room number is "eight."

Buttons 301 through 309 are selectively connected to OR gates 311–1 through 311–4 so that the output signals from gates 311 represent in binary the decimal number corresponding to the button 301 through 309 pushed. Because there are four gates 311, 16 decimal numbers can be represented in binary.

Button 300, representing the zero decimal, is connected directly to OR gate 313. The zero decimal digit is represented in binary by a zero also and thus pressing of button 300 has no effect on the output signals from OR gates 311–1 through 311–4. Gate 313 sums the output pulses from OR gates 311–1 through 311–4.

Button 301 represents the decimal one. The pressing of button 301 applies a low voltage through diode 301a to one input lead to OR gate 311–1. This low-level signal is inverted to a high-level signal at the input to OR gate 311–1 and thus the output signal from OR gate 311–1 is high level. The output signals from gates 311–2 through 311–4 remain at low levels. Thus a decimal one is converted into a binary one and the output signals from gates 311–1 through 311–4 represent the binary 0001.

Button 302 represents a decimal two. A decimal two corresponds to a binary 0010. Thus the pressing of button 302 results in a high level output signal from OR gate 311–2 while OR gates 311–1, 311–3 and 311–4 continue to produce low level output signals.

A decimal 3 is input into the terminal by pressing button 303. Because the decimal 3 corresponds to a binary 0011, the pressing of button 303 produces high level output signals from OR gates 311–1 and 311–2. OR gates 311–3 and 311–4 continue to produce a low level output signal.

The pressing of any one of the remaining decimal buttons 304 through 309 likewise results in producing high level output signals from selected combinations of OR gates 311–1 through 311–4.

Each time one of buttons 300 through 309 is pressed, the voltage on lead 370 connecting node b from button 309 to one input lead of each of NAND gates 312–1 through 312–4 changes from low to high. A high signal level on one input lead of each of NAND gates 312–1 through 312–4, results in the output signal levels from those NAND gates 312–1 through 312–4 connected to corresponding OR gates 311–1 through 311–4 which produce high level output signals dropping from high to low. Each time a button 301 through 309 is depressed, one or more of NAND gates 312 produces a low level output signal.

The low-level signals from NAND gates 312 are inverted and transmitted through OR gate 313 to drive divide-by-three unit 315 and also to drive one-shot 331. Together, the pulses from one-shot 331 and divide-by-three unit 315 enable in sequence shift registers 320–1, 320–2, and 320–3, in which are stored the number of the room from which the occupant is checking out.

Divide-by-three circuit 315 contains flip-flops 316 and 317 and NAND gate 318, all connected so as to drive sequentially and momentarily the output signals from NAND gates 322–1, 322–2, and 322–3 from their normal high levels, to a low level.

Normally, the output signal levels on the 0 output leads from flip-flops 316 and 317 are high, while the signal levels on the 1 output leads from these flip-flops are low. The 1 output leads from flip-flops 316 and 317 are attached to the input leads to NAND gate 318. Thus the normal output signal level from NAND gate 318 is high. NAND gate 318's output signal is fed back on lead 318a to the input to flip-flop 316.

Even though the normal output signal level from NAND gate 318 is high, while the normal output signal level from OR gate 313 is low, the low level signal from OR gate 313 holds the signal level on line 319 low. Thus a positive pulse from OR gate 313 — generated by the pressing of one of buttons 300 through 309 — is transmitted to the input to flip-flop 316, and, by means of lead 319, to one input lead of each of NAND gates 322–1, 322–2, and 322–3. Because one input lead of each of NAND gates 322–2, and 322–-3 is connected to the 1 output lead from flip-flops 316 and 317 respectively, on which the signal levels are low, the output signals from these two NAND gates remain high. However, two of the input leads to NAND gate 322–1 are connected to the 0 output leads from flip-flops 316 and 317. These leads have normally high-level signals on them. Thus NAND gate 322–1 is enabled by the positive output pulse from OR gate 313 and its output signal drops for the duration of this pulse from high to low. This low level pulse is transmitted to the enable input on "hundreds" shift register 320–1 and there inverted to a positive pulse. This pulse, together with a shorter duration pulse from one-shot 331 (driven by the pulse from OR gate 313 transmitted to one-shot 331 through OR gates 314 and 333 and AND gate 332) enables "hundreds" shift register 320–1. As a result, the high and low level signals representing in binary the decimal "hundreds" digit of the room number are stored in "hundreds" shift register 320–1.

In general, the pulse from one-shot 331 is transmitted through that one of NAND gates 330 enabled by the low-level pulse from a selected one of NAND gates 322. From NAND gates 330 this pulse is transmitted through the corresponding one of OR gates 341 as a positive pulse to assist in enabling the corresponding one of registers 320.

The trailing edge of the positive output pulse from OR gate 313 toggles flip-flop 316 such that the signal level on its 1 output lead changes from low to high while the signal level on its 0 output lead changes from high to low. The low-level signal on its 0 output lead disables NAND gate 322–1 and NAND gate 322–3. The new high level signal, however, from its 1 output lead, together with the high level signal from the 0 output lead of flip-flop 317, enables NAND gate 322–2. Thus on the second positive pulse from OR gate 313, which is applied again by means of lead 319 to one input lead each of NAND gates 322–1 through 322–3, only NAND gate 322–2 is enabled. Its output signal drops for the duration of the pulse from a high to a low level and, together with a pulse from one-shot 331, enables "tens" shift register 320–2. The low and high level signals from OR gates 311–1 through 311–4 are then stored in "tens" shift register 320–2.

The trailing edge of the second output pulse from OR gate 313 again toggles flip-flop 316. Thus the output signal level on its 1 output lead drops from high to low while the signal level on its 0 output lead rises from low to high. The drop in signal level on flip-flop 316's 1 output lead from high to low is inverted at the input to flip-flop 317 and thus toggles flip-flop 317 changing the signal level on its 1 output lead from low to high and on its 0 output lead from high to low. The signal level on flip-flop 317's 0 output lead is applied to NAND gates 322–1 and 322–2. Thus the new low level signal on the 0 output lead from flip-flop 317 disables NAND gates 322–1 and 322–2. However, two of the three input leads to NAND gate 322–3 are connected respectively to the 0 output lead from flip-flop 316 and to the 1 output lead from flip-flop 317. The signal levels on both these leads are high. Thus the third output pulse from OR gate 313 corresponding to the placing of the "units" digit of the three-decimal digit room number into the cashier's terminal, enables NAND gate 322–3. The output signal from NAND gate 322–3 drops momentarily to a low level and is transmitted to the enable input on "units" shift register 320-3. Inverted at this input to a high level signal, this pulse, together with the short-duration pulse from one-shot 331, enables "units" shift register 320-3 to store the high and low-level signals from OR gates 311-1 through 311-4 representing in binary the units digit of the decimal room number.

It should be noted that buttons 300 through 309 only have to be pressed momentarily. However, to prevent noise and spurious pulses generated by "button bounce," or other sources, from passing through OR gate 313 to incorrectly trigger divide-by-three circuit 315, diodes 313a through 313c are provided to clamp the input to OR gates 311 to the output signal level from NAND gates 312. Part of a feed-back loop from the output of NAND gates 312 to the input of OR gates 311, these diodes prevent variations in the signal levels at one input to OR gates 311 from producing a similar variation on the output leads of the corresponding NAND gates 312.

On the trailing edge of the third output pulse from OR gate 313, the signal levels on the 1 output leads from flip-flops 316 and 317 both go high. This drives the output signal from NAND gate 318 low. Consequently, OR gate 313 is unable to pass positive pulses to drive flip-flop 316 and to enable NAND gates 322-1, 322-2 and 322-3. Thus if the cashier inadvertently presses one of buttons 300 through 309 after having entered the room number, this has no effect on the information stored in shift registers 320-1 through 320-3 because the output signals from NAND gates 322-1 through 322-3 remain at their normal high level.

The high level output signals from NAND gates 322-1 through 322-3 are transmitted to one input lead of NAND gates 330-1 through 330-3 thereby preventing spurious pulses from one-shot 331 from affecting storage registers 320.

If the cashier has by mistake placed the wrong room number in registers 320-1 through 320-3, the cashier presses "clear" button 362, transmitting a negative pulse through diode 360 to reset flip-flops 316 and 317. Inverted at the reset inputs of these two flip-flops, this negative pulse appears as a positive pulse. This negative pulse is also applied to and inverted at the reset inputs of shift registers 320-1 through 320-4, resetting these registers to their normal condition.

To transmit the data now stored in shift registers 320-1, 320-2, and 320-3, the cashier presses one of two entry buttons; "unscheduled check-out" button 336a, or "scheduled" check-out button 336b. The cashier presses "unscheduled" check-out button 336a when the occupant of a room checks out unexpectedly. The cashier presses "scheduled" check-out button 336b when the occupant of a room checks out as expected.

Pressing either button 336a or 336b results in the input signal level on one input lead to NAND gate 334 — cross-coupled with NAND gate 335 to form a bistable flip-flop — rising from approximately ground voltage to the supply voltage $V_{cc}$. The signal level on one input lead to NAND gate 335, on the other hand, changes from approximately $V_{cc}$ to ground. These changes in input signal levels cause the output signal level from NAND gate 335 to rise from low to high simultaneously with the output signal level from NAND gate 334 dropping from high to low. The drop in output signal level from NAND gate 334 is transmitted to one input to flip-flop 353. Inverted at this input to a rise in signal level, this rise, together with the inverted low-level output signal from the 1 output lead from flip-flop 353, toggles flip-flop 353. Consequently, the signal on the 0 output lead from flip-flop 353 drops from its normal high level to low and the signal level on the 1 output lead from flip-flop 353 rises from its normal low level to high.

The signal level on the 0 output lead from flip-flop 353 is transmitted to one input lead to NAND gate 355. The signal on the other input lead to NAND gate 355 is derived through inverter 354 from the "Cashier Enable" line. As described in the Main Logic section, the signal level on the "Cashier Enable" line is normally low. Thus the output signal from inverter 354 is normally high. The drop in signal level from the 0 output lead of flip-flop 353 thus results in the signal level on the output lead from NAND gate 355 rising to a high level. Transmitted to Main Logic 1, this high-level "Cashier Request" signal is used both to disable clock 131 (FIG. 1c) and thus stop the driving of scan ring 10 and to disable NAND gate 121, thereby preventing a maid or clerk from interrupting the cashier's transmittal of data to Main Logic 1. In addition, this "Cashier Request" signal results in a high level signal being transmitted back to the cashier's terminal on the "Cashier Enable" line. Inverted to a low-level signal by inverter 354, this "Cashier Enable" signal holds the output signal on the "Cashier Request" line at a high level. The low-level signal from inverter 354 is also in turn inverted and applied to one input lead of flip-flop 353. The low-level output signal on the 0 output lead of flip-flop 353 is also inverted to a high-level signal and applied to another input lead to flip-flop 353. Consequently, flip-flop 353 is changed back to its normal state with its 0 output lead having a high-level signal and its 1 output lead having a low-level signal.

The negative change in signal level from the 1 output lead of flip-flop 353 is inverted and appears at one input lead to flip-flop 348 as a rise in signal level. This rise in signal level toggles flip-flop 348 changing the level of the output signal on its 0 output lead from high to low and changing the level of its output signal on its 1 output lead from low to high. The low level signal on the 0 output lead of flip-flop 348 is inverted and used to enable flip-flops 350 and 351. The new high level output signal on flip-flop 348's 1 output lead is transmitted to one input lead of OR gate 340 and there is inverted to a low level signal.

OR gate 340 has two other input leads. Its second input lead is connected to the 1 output lead from flip-flop 350. Normally, the signal level on this output lead is low. Because this low-level signal is inverted at the input to OR gate 340, this low level signal causes OR gate 340 to produce a normally high-level signal. On the third input lead to OR gate 340 is the output signal from NAND gate 334. Because the output signal from NAND gate 334 is normally a high-level signal except for that brief period when button 336a or 336b is pressed, the component of the output signal from OR gate 340, due solely to the output signal from NAND gate 334, is normally low. The negative pulse on the output lead of NAND gate 334, due to the pressing of either button 336a or 336b, is not transmitted through OR gate 340 as the output signal from OR gate 340 is held at its normally high level by the low-level output signal on the 1 output lead of flip-flop 350.

The positive output pulse from NAND gate 335 in response to the pressing of either "unscheduled" or "scheduled" button 336a or 336b, respectively, enables divide by 16 circuit 349.

After flip-flop 348 is enabled, the output signal on its 1 output lead rises to a high level. This high level signal is applied through resistor 361 to the base of NPN transistor T360, thereby turning on transistor T360. Because of the high level signal applied to its base, transistor T360 saturates. Its collector to emitter voltage becomes very small — on the order of 0.1 or 0.2 volts. This low collector voltage thus holds the output signal level from NAND gate 335 at a low level and prevents the erroneous pressing of either button 336a or 336b from affecting the state of NAND gates 334 and 335 during the transmission of data from the cashier's terminal to the main logic.

The receipt of a high-level signal on the "Cashier Enable" line thus enables flip-flops 351, 350, and 349 allowing these flip-flops to be driven by a signal from a reference clock. As discussed above in the Clerk's Control Panel section, the cashier's terminal uses a signal from the clock shown in FIG. 4f. This signal, at 120 hertz, is passed through inverter 352 (FIG. 3c) to drive flip-flops 351 and 350.

It should be noted that one-shot 331 also produces an output pulse in response to the pressing of either "unscheduled" button 336a or "scheduled" button 336b enabling register 320-4 through NAND gate 330-4 and OR gate 341-4. Pressing of "unscheduled" button 336a results in the grounding of the binary number in the 1 location in the four-digit binary code word stored in the "identify" register 320–4. Consequently, the binary number stored in the "identify" register on the pressing of "unscheduled" check-out button 336a is just 0000. On the other hand, pressing "scheduled" button 336b has no effect upon the signal level on lead 362. Rather this signal level is held normally close to $V_{cc}$. Consequently, the binary code stored in "identify" register 320–4 in response to the pressing of "scheduled" check-out button 336b is 0001.

Once flip-flops 351 and 350 have been enabled by the low level output signal on the 0 output lead from flip-flop 348, clock pulses from inverter 352 drive the data through registers 320–1, 320–2, 320–3 and 320–4. The first data to be transmitted to Main Logic 1, comes from register 320–4. This "identify" data is either four binary zeroes 0000 when "unscheduled" check-out button 336a has been pressed or the four binary digits 0001 when "scheduled" button 336b has been pressed.

The data in registers 320–3 is transferred in response to pulses transmitted from the 1 output lead of flip-flop 350 through OR gate 340 and OR gate 341–3 into register 320–4. Simultaneously pulses from OR gate 341–2 drive the data in register 320–2 into register 320–3. Similarly clock pulses from OR gate 341–1 drive the data from register 320–1 into register 320–2.

Data is driven sequentially through the registers and then to one input lead on NAND gate 344. The other input lead of NAND gate 344 is driven by the output signal on the 1 output lead from flip-flop 350. Being two flip-flops removed from the clock signals from inverter 352, the output signal on the 1 output lead from flip-flop 350 changes one cycle every four clock cycles. For two of these four clock cycles the output signal on the 1 output lead of flip-flop 350 is low; for the next two clock cycles this output signal is high. A change in level of the output signal on the 1 output lead from flip-flop 350 from low to high appears at the input to shift registers 320–1 through 320–4 as a similar low to high change. This change drives the shift registers. Thus data in registers 320 is moved one location once every four cycles of the clock signal. Because 16 pieces of data are stored in registers 320, 64 clock cycles are required to transmit the data from registers 320 to Main Logic 1.

When the data from registers 320 represents a binary one, the signal level on lead 365 is high for four clock cycles. For two of these clock cycles the signal level on the other input lead to NAND gate 344 is also high. Consequently, in the manner described above in the Maid Terminal section, OR gate 346 produces a high level output signal for two clock cycles. When a binary zero is being transmitted from registers 320, NAND gate 344 produces a low level output signal for all four clock cycles. However, NAND gate 345, the two input leads to which are connected to the 0 output lead from flip-flop 351 and the 1 output lead from flip-flop 350, produces a low level output signal on the third of every four clock cycles. Consequently, the output pulse from OR gate 346 is high level for the third of every four clock cycles when the data occupying these four clock cycles in register 320 is a binary zero. Inverter 347 inverts this data for transmission to OR gate 136 (FIG. 1c) prepatory to its transmission into the pulse width detector 12 in Main Logic 1.

Upon the transmission of 16 pieces of data to Main Logic 1, (this occurs upon the receipt of 64 clock pulses) divide-by 16 circuit 349 produces a high level signal on its 1 output lead. This change in signal level changes the output signal levels on the 1 and 0 output leads from flip-flop 348 to low and high respectively.

The high level signal on the 0 output lead from flip-flop 348 is passed to flip-flops 351 and 350 thereby disabling these flip-flops. Thus no further clock signals drive registers 320.

In addition, the reset pulse transmitted on the "Good Data" line to Main Logic 1 after the 200 millisecond display-driving pulse, forces the output signal from inverter 138 (FIG. 1c) from high to low. Consequently, the signal level on the "Cashier Enable" line-input to inverter 354 goes low.

Upon termination of the transmittal of data from the cashier's terminal, the main logic is reset as described in the Main Logic section to accept data transmitted from a maid terminal or from the Clerk's Control Panel 4.

Prior to transmission from the cashier's terminal, the data in shift registers 320–1, 320–2, and 320–3 is converted in decoder drivers 342–1, 342–2 and 342–3 (FIG. 3d) back into decimal numbers and then transmitted to displays 343–1, 343–2, and 343–3. Thus the cashier immediately sees the room number which he has entered into shift registers 320–1, 320–2, and 320–3. If, by error, he enters the wrong room number, he presses "clear" button 326 which clears registers 320–1 through 320–4 and resets divide-by-three circuit 315. The clerk can then enter the correct room number into the shift registers before transmittal.

AUXILIARY TRANSMITTING TERMINAL USING TELEPHONES

Figure 7A:
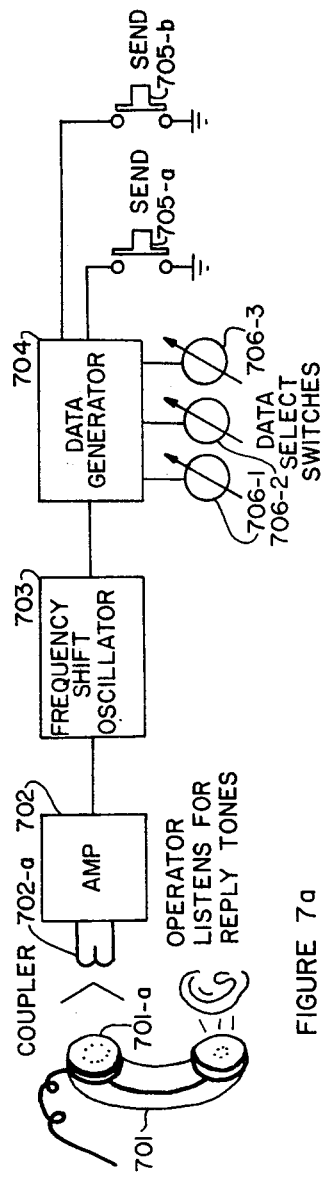
FIGS. 7a, 7b and 7c show schematically an auxiliary system using telephone lines and a telephone handset to transmit status information to Main Logic 1.
Figure 7B:
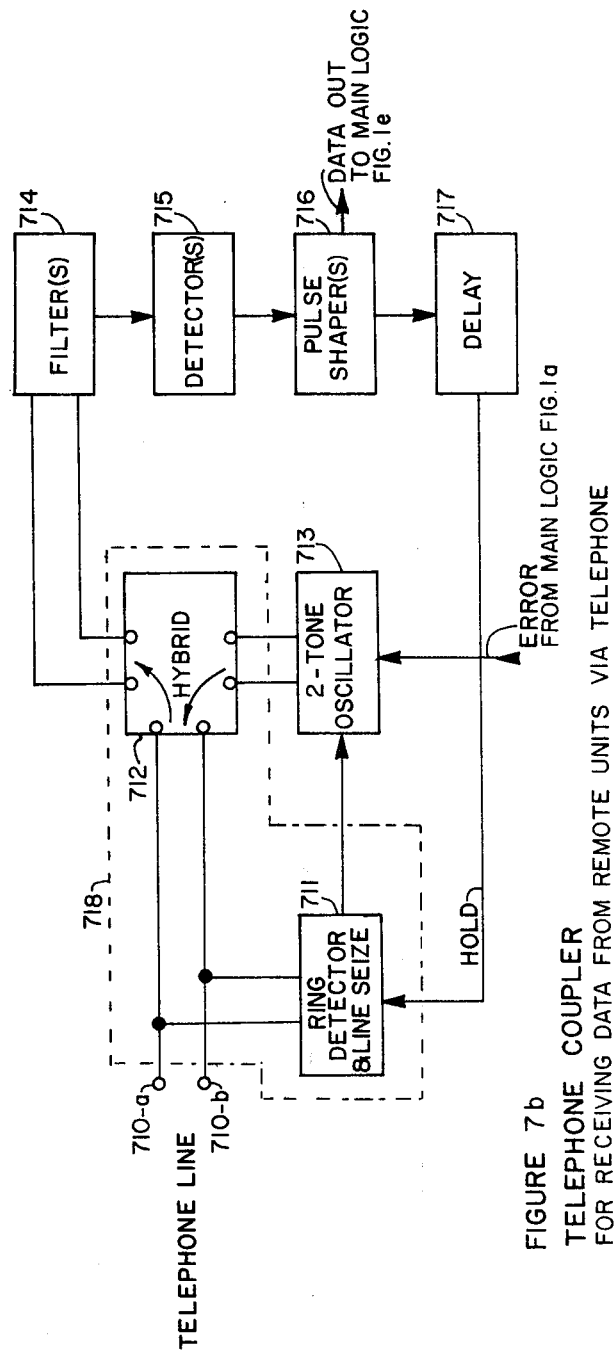

An alternative method of inputing data to the display is shown in the block diagrams of FIGS. 7a and 7b. A considerable cost savings is realized by eliminating the interconnecting wire pairs between the individual maid terminals and the main logic. This interconnection can be accomplished with standard telephone facilities by the use of the system shown in FIGS. 7a and 7b.

Data is transmitted to Main Logic 1 by sending appropriately coded audio frequency tones over the telephone. The data is coded in a manner similar to that previously described in the Maid Terminal section. To initiate data entry, the maid dials a preselected PBX number, or asks the house operator to be connected in case of a manual exchange. The equipment shown within the dashed line labelled 718 of FIG. 7b, which may be a standard telephone company data set coupler, recognizes the ring and answers by seizing the line in a well-known manner. A fixed tone is transmitted from oscillator 120 in the main logic to signify to the maid that data may be accepted. When the maid hears the tone in the telephone receiver, the acoustic coupler 702 and 702a shown in FIG. 7a is placed over the telephone transmitter. Transmission of data is then accomplished by sending the previously described digital signal by suitably keying an audio oscillator 703 connected to data generator 704. Data select switches 706–1 through 706–3 determine the number of the room whose status is being transmitted and "send" buttons 705 a or 705b control the room status i.e. whether vacant or occupied) transmitted. The form of modulation employed may include frequency shift keying (two tone) hereafter called "FSK," on-off amplitude modulation or coded tone (multiple frequency) techniques since each may offer particular advantages in different situations. Techniques for implementing these methods are all well known.

At the main logic, the data train is converted to two-level binary signals by use of filter network 714 and detector network 715 or other suitable means. Appropriately shaped in shaper 216, these signals are then input to the data registers 170 (FIG. 1e) of the main logic.

In the event of faulty of otherwise unacceptable data, an error signal from the auxiliary reset circuit (FIG. 1g) applied to the FSK oscillator 713 in FIG. 7b causes the pitch to change in such a manner as to signify to the maid that the last data should be re-transmitted. Hybrid circuit 712, a standard circuit, permits two-way transmission on the telephone line without interaction, a standard telephone practice.

An additional circuit is provided to cause the main logic to "hang up the telephone" if the maid terminal stops transmitting. This is accomplished by detecting a characteristic tone or signal, for example, the mark tone of the mark-space pair in a frequency shift keyed pair. A retriggerable delay 717 is provided with a duration a few times longer than the longest normal data element. Thus the maid may enter as many data messages as desired then simply hang up the telephone. The main logic will detect the termination of transmission and "- hang up" its line thereby making the line available to other maid terminals.

Note that the single telephone lines either may be replaced by multiple lines either through duplication of facilities or through a line finder-distributor of a type commonly provided with telephone facilities.

Another implementation of the input terminal uses a tone dialed (i.e. Touch Tone $^R$ ) telephone or accessory units. The push-button keyer provides direct coding of the desired information in tone pairs which may be recognized as representing decimal digits by suitable filters and detectors. Since the data is directly in digital form it may be used directly to actuate the main and housekeeper displays through appropriate registers similar to registers 170 (FIG. 1e). This reduces cost and saves equipment both by simplifying the main logic and by eliminating the need for the maid terminals shown in FIGS. 2a through 2d if the existing telephone system employs this type telephone set. To operate, the caller dials (by dial or push button depending on the equipment type), the appropriate extension (PBX) number which, as before, responds with a distinctive "Proceed" tone. Further actuation of the push buttons then transmits the data. Since there is no tone transmitted except when a button is pushed, a different method of terminating the call is required from that just described. This is provided by the telephone data set coupler since it will recognize when the caller has hung up the telephone.

Figure 7C:
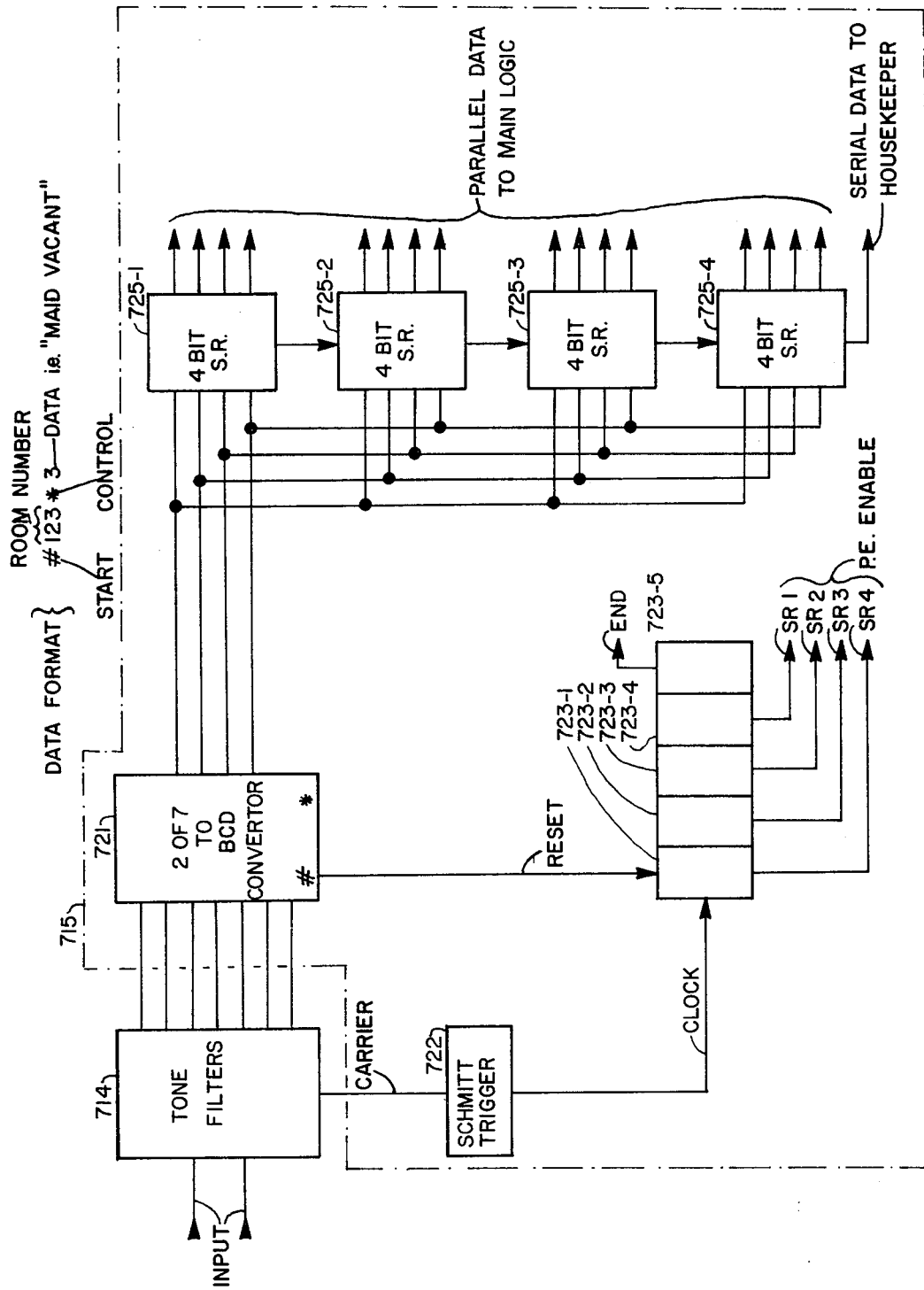
Figure 8C:
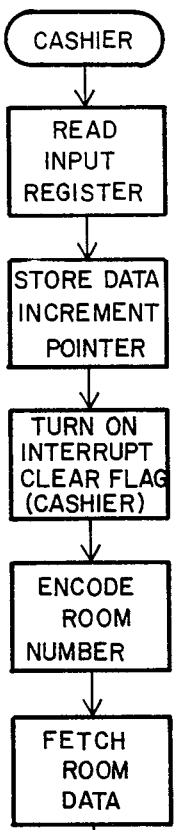
Figure 8D:
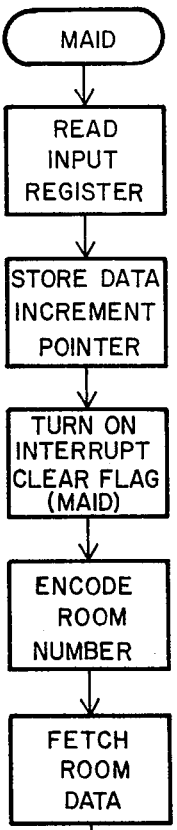
Figure 8E:
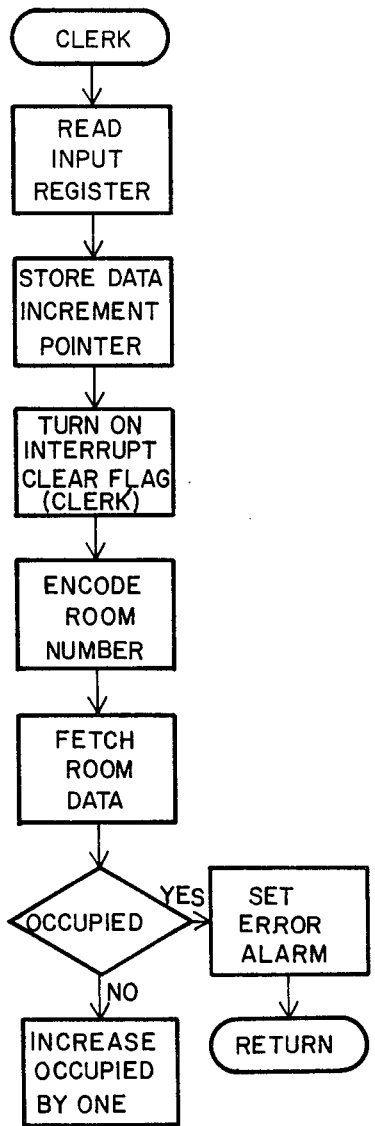
Figure 8F:
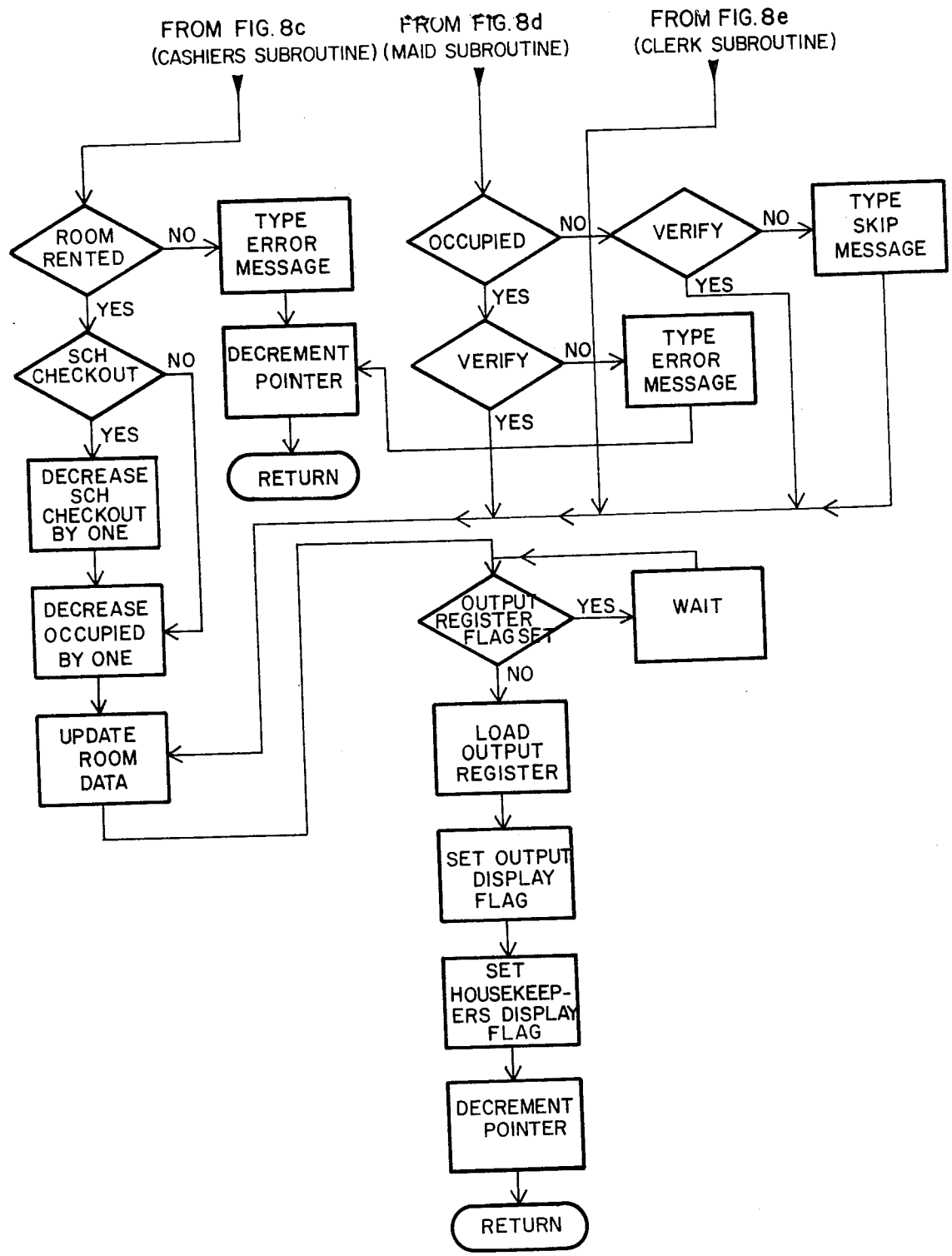

FIG. 7c shows one implementation of filter 714 and detector 715 shown in FIG. 7b. The structure shown in FIG. 7c is designed to receive pairs of tones transmitted simultaneously, each pair corresponding to a selected binary number. A selected pair of filters contained within circuit 714 — which contains at least as many filter pairs as there are tone pairs — passes the pair of tone signals. Each of the filters has a center frequency corresponding to the frequency of one of the tone signals. From the filters, the tone signals are passed to detectors, which in one embodiment consist of rectifiers and low pass filters. The output signals from the detectors are sent to two of seven to BCD converter 721 and there converted into a four digit binary number.

The output signals from the detectors are also used to activate Schmitt trigger 722. On receipt of the first pair of tone signals, trigger 722 generates a clocking pulse. This pulse is placed in section 723–1 of shift register 723. Upon the receipt of the first binary code word from a transmitting terminal, the pulse in section 723–1 enables shift register 725–1 which then stores the four-bit binary-coded representation of the "hundreds" decimal digit of the room number derived from converter 711.

On receipt of the next pair of tone signals in filters 714, converter 721 decodes this set of code words to a four-digit binary number and a second pulse from Schmitt trigger 722 drives the pulse in register 723 into section 723–2. This pulse now enables four-bit storage register 725–2, which stores the binary-coded-decimal code word representing the "tens" digit of the room number, output from converter 721.

On receipt of the third pair of tone signals by filters 714, a third pulse from trigger 722 drives the pulse in shift register 723 to section 723–3 whence it enables shift register 725–3. The four-bit binary code word from converter 721 representing the "units" digit of the room number is thus stored in register 725–3.

Finally, the last binary code word represents the status of the room, i.e., whether the room is "vacant" or "occupied". The four-bit binary coded word representing this information is stored in four-bit shift register 725–4.

After all the data has been received, the pulse in register 723 is driven by a reset pulse from converter 721 to section 723–5 there to signify the end of data transmission.

From storage registers 725, the binary-coded-decimal room number and its status are transmitted to the decoder-converters and displays in the main logic as well as to the logic driving networks associated with the main display. After a given period of time, this data is then serially sent to the Housekeeper Logic 6 where it is used to change the status of the transmitted room displayed on the Housekeeper Display Panel 7.

COMPUTER PROGRAM LOGIC

The simplified flow charts shown in FIGS. 8a through 8h describe an implementation of the basic invention using a general purpose digital computer to perform the logical manipulation of the data and control of the status displays. The computer has a feature known in the computer art as interrupt capability. Upon receipt of an interrupt signal the computer halts the program in progress and stores in a known location the program step and data information necessary to resume operation at a later time. The computer then, under program control, services the interrupting peripheral device and then returns to the prior program resuming where it had left off.

Data from the remote terminals operated by maids, a cashier or the clerk are connected to an input register as before with either direct wire connection or through tone signalling by telephone or acoustical coupler or other means. Multiple registers may be provided or a single register is shared among the different users, each being identified by a particular data bit that activates a "flag" read by the computer.

Basic operation is shown by the flow chart labeled START (FIG. 8a). Upon starting operation of the computer program an initialization process is performed which places all of the numerical indicators to the proper starting number, establishes computational constants and verifys the status of peripheral equipment. When the system is ready, the interrupt capability is turned on to start accepting data. Since the computer will in most cases spend most of its time waiting for data to process this time is used economically for other processing. Therefore, program control is directed by the setting of the console switch register to one of several routine background programs. The normal background program keeps the Occupied, Vacancy, Reservation and Checkouts displays updated and permits requests by the Clerk for data on the status of any room by typewritten communication. Additional background programs include those which provide daily summaries of activity, updating of reservations or associated bulk storage facilities and routine accounting functions.

The interrupt is turned off by setting of any flag associated with a remote data entry (FIG. 8b). Receipt of an interrupt causes the computer to stop the executing of the background program and to store away the necessary data for later resumption. The interrupt source flags are tested in order of priority to determine the source of the interrupt and the required action. Note that flags are also provided for the computer communication teletypewriter since this device shares the same data input-output wires. In the event the interrupt should be turned off with no flag set, an alarm — either visual or audible — is activated and the program halted indicating to the clerk that a malfunction has occurred.

Assume an interrupt has occurred and the Maid flag was set. The Maid subroutine (FIG. 8d) will be entered and the data register contents read into the computer. This data will be placed in a push-down list and the list pointer (or address) incremented by one. The push-down list of input data is necessary since data is input in an asychronous manner and may arrive faster than can be processed. Thus interrupts may be permitted during subroutines as well as during the background program to minimize delay to input sources. Continuing with the Maid subroutine, the interrupt is turned on after the data has been stored in the push-down list. The room number is examined and converted to the address of the storage word that contains the data concerning the status of that room. The room data is pitched from storage and compared (FIG. 8f) with the new data to detect possible errors. If the new data indicates the room is vacant and the old data from storage shows the room occupied, a message is typed on the teletypewritter showing a "skip" and the room number. Since the room is vacant the display is updated as is the storage of room data and the program returns to the background program. Had the new data shown the room to be occupied and thus agreed with the old data, then only the Housekeeper Display 7 (FIG. 1) would have been changed. If the new data had not agreed with the stored information, then an "error" message would be typed out and the program returned without altering the displays since the data would be erroneous.

Entry of data from other sources may similarly be traced through the flow charts.

A power failure could have serious disruptive effects on the display; therefore, a power failure detector has the highest priority interrupt. Sufficient energy remains in the computer power supply to execute the few program steps (FIG. 8f) required for storing essential data after power fails. When power is restored a special subroutine (FIG. 8g) is automatically entered. Since the computer can easily be arranged to preserve data in magnetic core storage despite power failures, each room's data can be successively called up and the status display set appropriately. After all rooms have been restored, the program once again turns on the interrupt capability and resumes normal operation.

What is claimed is:

1. A system for use in monitoring the statuses of a plurality of similar-type objects, which comprises;
    means for receiving and transmitting to a logic means, information relating to the statuses of said similar-type objects;
    logic means for operating on said information transmitted from said means for receiving and transmitting, to produce intermediate signals indicative of the statuses of said similar-type objects; and
    means, responsive to said intermediate signals, for displaying the statuses of said plurality of similar-type objects;
    wherein said means for receiving and transmitting comprises a plurality of transmitting terminal means, said plurality of transmitting terminal means comprising
    a first set of transmitting terminals which are given access to said logic means sequentially and periodically in response to an interrogate signal from said logic means; and
    at least one selected transmitting terminal which has priority in the transmission of information to said logic means over said first set of transmitting terminals provided none of said first set of transmitting terminals is transmitting information to said logic means, and wherein each of said transmitting terminals comprises:
    means for receiving information identifying any one of said plurality of similar-type objects and defining its status, said means for receiving comprising;
    a first set of switch means for receiving information which identifies the particular one of said plurality of similar-type objects the status of which is being transmitted to said logic means; and
    a second set of switch means for receiving information giving the status of said particular one object;
    means for requesting access to said logic means, comprising;
    means for transmitting a request signal to said logic means, said request signal initiating the transmittal of an enable signal from said logic means to said transmitting terminal;
    means, at said transmitting terminal, for detecting the receipt of said enable signal; and
    means for encoding said information identifying the particular object and defining its status and for transmitting the encoded information to said logic means, after the detection of the receipt of said enable signal, said means for encoding comprising;
    means for converting the information received by said first set of switch means and said second set of switch means into a sequence of duration modulated pulses; and
    means for transmitting said duration modulated pulses to said logic means.

2. Structure as in claim 1 wherein said logic means comprises;
    means for periodically and sequentially interrogating each of said first set of transmitting terminals to detect a request signal transmitted from one of said terminals indicating that that terminal has received information identifying an object and defining its status;
    means, responsive to said request signal, for transmitting an enable signal to the transmitting terminal producing said request signal, said enable signal activating said transmitting terminal containing information identifying an object and its status, so that said transmitting terminal transmits to said logic means said information identifying said object and defining its status;
    means for producing an intermediate signal indicative of the new status of said identified object;
    means for transmitting said intermediate signal to said means for displaying, said intermediate signal activating said means for displaying to display the new status of said identified object;
    means for comparing the newly reported status of the identified object with the previously reported status of said identified object to determine if the newly reported status of said identified object is compatible with the earlier reported status of said object; and
    means for producing an indication of the type of error in the reported status of said object in the event said newly-reported status of said object is incompatible with said previously-reported status of said object.

3. Structure as in claim 2 wherein said means, responsive to said request signal, for transmitting an enable signal to activate a transmitting terminal comprise;
    means for generating said enable signal, said enable signal comprising a tone signal;
    means for transmitting said tone signal to that one of said first set of transmitting terminals first reached by said means for periodically and sequentially interrogating which produces a request signal, said tone signal terminating after a selected time; and
    means for preventing said means for periodically and sequentially interrogating from completing the interrogation of said first set of transmitting terminals upon detection of a request signal from a transmitting terminal until the information contained in said transmitting terminal is transmitted to said logic means.

4. Structure as in claim 3 wherein said means for comparing the newly-reported status of the identified object with the previously-reported status of said identified object comprises;
    means for storing a first-reported status of an identified object; and
    means for receiving the newly-reported status of said object and producing an output signal if said newly-reported status is in conflict with said previously-reported status.

5. Structure as in claim 1 wherein said means for displaying comprises;
    means for displaying codes identifying said plurality of similar type objects;
    means for indicating adjacent to the code identifying each of said similar-type objects, the last reported status of each of said similar type objects; and
    means for indicating and identifying an object the status of which is in conflict with the previously reported status of said object.

6. Structure as in claim 5 wherein said means for displaying includes;
    means for indicating the number of said plurality of similar-type objects which meet one of several different requirements.

7. Structure as in claim 5 wherein said means for displaying includes an auxiliary display for indicating which of said plurality are similar-type objects are in a first category, and which of said plurality of similar-type objects are in a second category.

8. A system for use in monitoring the statuses of rooms in a hotel, which comprises;
- means for receiving and transmitting to a logic means, the number of each room in the hotel and the status of that room;
- logic means for operating on said room number and status information transmitted from said means for receiving and transmitting, to produce a set of intermediate signals identifying the room about which information is being transmitted and defining its status;
- means responsive to said set of intermediate signals, for displaying the statuses of said rooms, said means for displaying comprising;
- first means for displaying all room numbers;
- second means for displaying any one of a first set of statuses adjacent each room number, said first set of statuses including a showing of whether each room is occupied, vacant and not made up, or vacant and made up; and
- means for indicating an error between the currently reported status of a room and the last reported status of the room.

9. Structure as in claim 8 wherein said means for receiving and transmitting to a logic means comprise;
- a plurality of transmitting terminals of a first type; and
- at least one transmitting terminal of a second type, said transmitting terminal of a second type having priority in the transmission of information to said main logic over said plurality of transmitting terminals of said first type.

10. Structure as in claim 9 wherein each of said plurality of transmitting terminals of said first type comprise;
- means for receiving the number of any room and its status;
- means for transmitting to said main logic a request signal requesting access to said main logic for the purpose of transmitting said room number and the room's status to said main logic; and
- means, responsive to an enable signal transmitted from said main logic in response to said request signal for encoding and transmitting said room number and said room status from said transmitting terminal to said main logic.

11. Structure as in claim 10 wherein said means for encoding and transmitting comprises;
- means for encoding said room number and said status into duration-modulated pulses representing in binary-code, said room number and said status; and
- means for selectively shaping and transmitting said pulses to said main logic.

12. Structure as in claim 11 wherein said logic means comprises;
- means for periodically and sequentially interrogating said plurality of transmitting terminals of a first type to detect any request signals transmitted from said terminals to said main logic;
- means for detecting a request signal from a transmitting terminal of said first type being interrogated;
- means, responsive to an output signal from said means for detecting, for disabling said means for periodically and sequentially interrogating each of said plurality of transmitting terminals of a first type on receipt of a request signal from a transmitting terminal being interrogated, thereby to maintain a transmitting channel from said transmitting terminal producing said request signal to said main logic.
- means for signaling said transmitting terminal of a first type to transmit information to said main logic;
- means for receiving and decoding the information transmitted from said transmitting terminal to said main logic to produce intermediate signals representing the number of the room and its status; and
- means for preventing said transmitting terminal of a second type from interrupting the transmission of information from said transmitting terminal of a first type producing said request signal while its information is being transmitted to said main logic.

13. Structure as in claim 12 wherein said logic means includes;
- means for detecting a request signal indicating a request for access to said main logic from a transmitting terminal of said second type;
- means for disabling said means for periodically and sequentially interrogating said plurality of transmitting terminals of a first type for the duration of the transmission of data from said transmitting terminal of a second type to said main logic; and
- means for preventing the receipt of a request signal from that transmitting terminal of a first type on which said means for periodically and sequentially interrogating is locked while disabled, thereby to prevent said transmitting terminal of a first type from interrupting said transmission of information from a transmitting terminal of a second type with a request signal.

14. Structure as in claim 13 wherein said logic means includes
- means for detecting the end of transmission of information from a transmitting terminal of both first and second type and for producing a restart signal thereon, and
- means for enabling said means for periodically and sequentially interrogating each of said plurality of transmitting terminals of a first type upon receipt of said restart signal; and
- means responsive to said restart signal, for resetting said logic means to its normal state in preparation for the transmission of information from other transmitting terminals.

15. Structure as in claim 14 wherein said logic means includes
- means for producing an auxiliary restart signal upon the elapse of a given time, even in the absence of receipt of all the information from a given transmitting terminal, said auxiliary restart signal functioning in the same manner as said restart signal.

16. Structure as in claim 8 wherein said means, responsive to said set of intermediate signals, for displaying the statuses of said rooms comprises in addition;
- means for indicating whether each room is scheduled to be vacated; and
- means for indicating whether each room is reserved or not reserved.

17. Structure as in claim 16 wherein said means, responsive to said set of intermediate signals, for displaying the statuses of said rooms comprises in addition;
- auxiliary display means for indicating adjacent any room any one of a second set of statuses.

18. Structure as in claim 16 wherein said second set of statuses includes a showing of whether any room is not made up, or made up.

19. Structure as in claim 18 wherein said means for indicating an error comprises:
- means for indicating the vacating of a room without its occupant checking out at the cashier;
- means for indicating the erroneous reporting as vacant of a room still occupied; and
- means for showing the number of any room associated with either of these two types of errors and the type of error.

20. Structure as in claim 19 wherein said means responsive to said set of intermediate signals, for displaying the statuses of said rooms comprises in addition:
- first means for indicating the total number of rooms scheduled to be vacated,
- second means for indicating the total number of rooms reserved,
- third means for indicating the total number of rooms vacant, and
- fourth means for indicating the total number of rooms occupied.

21. Structure as in claim 20 wherein each of said first through fourth means for indicating comprises in addition;
- means for correcting up or down any total count, and means for resetting any total count to a preprogrammed initial value.

22. Structure as in claim 21 wherein at least one of said plurality of transmitting terminals of a first type comprises;
means for correcting the status displayed adjacent any room number from "occupied", to "vacant, not made up."

23. Structure as in claim 21 wherein at least one of said plurality of transmitting terminals of a first type comprises;
means for changing the status of any room from "occupied" to "vacant, not made up" and then to "vacant, made up."

24. Structure as in claim 21 wherein at least one of said plurality of transmitting terminals of a first type includes;
means for changing the status of any room from "vacant, not made up" to "vacant, made up".

25. Structure as in claim 21 wherein said means for indicating whether each room is scheduled to be vacated comprises, in addition;
means for increasing the count of the total number of rooms scheduled to be vacated.

26. Structure as in claim 21 wherein said means for indicating whether each room is reserved or not reserved comprises, in addition;
means for increasing the count of the total number of rooms reserved by one when the status of each room is changed from unreserved to reserved; and
means for decreasing the count of the total number of rooms reserved by one when the status of each room is changed from reserved to not reserved.

27. Structure as in claim 26 wherein said means, responsive to said first set of intermediate signals, for displaying the statuses of said rooms comprises in addition;
means for changing the status of any room to indicate that said room is occupied; and
means for changing the status of any room including means, responsive to said means for changing the status of any room, for increasing the total occupied count by one and for decreasing the total vacant count by one.

28. Structure as in claim 26 wherein said at least one transmitting terminal of the second type includes;
means for clearing information placed in said at least one transmitting terminal of a second type prior to the transmission of this information to said logic means.

29. Structure as in claim 9 wherein said at least one transmitting terminal of the second type comprises;
means for requesting access to said logic means;
means responsive to an enable signal from said logic means for transmitting in coded form the number of a room and its status to said main logic, said means responsive comprising;
means for encoding and transmitting to said main logic the number of said room and a coded signal indicating whether said check out was scheduled or unscheduled, thereby to decrease the total scheduled check-out count shown on said first means for indicating by one if said check out was scheduled.

30. Structure as in claim 9 wherein said means responsive to said first set of intermediate signals, for displaying the statuses of said rooms, comprises, in addition;
means for indicating all rooms of any one of a selected number of types.

31. A system for use in monitoring the statuses of a plurality of similar type objects, which comprises;
means for receiving and transmitting to a logic means, information relating to the statuses of said similar type objects, said means for receiving and transmitting comprising
a first set of transmitting terminals which are given access to said logic means sequentially and periodically in response to an interrogating signal from said logic means; and
at least one selected terminal which has priority in the transmission of information to said logic means over said first set of transmitting terminals provided none of said first set of transmitting terminals is transmitting information to said logic means;
logic means for operating on said information transmitted from said means for receiving and transmitting, to produce intermediate signals indicative of the statuses of said similar type objects, said logic means comprising:
means for periodically and sequentially interrogating each of said first set of transmitting terminals to detect a request signal transmitted from one of said terminals indicating that that terminal has received information identifying an object and defining its status;
means, responsive to said request signal, for transmitting an enable signal to the transmitting terminal producing said request signal, said enable signal activating said transmitting terminal containing information identifying an object and its status, so that said transmitting terminal transmits to said logic means said information identifying said object and defining its status;
means for producing an intermediate signal indicative of the new status of said identified object;
means for transmitting said intermediate signal to said means for displaying, said intermediate signal activating said means for displaying to display the new status of said identified object;
means for comparing the newly reported status of the identified object with the previously reported status of said identified object to determine if the newly reported status of said identified object is compatible with the earlier reported status of said object; and
means for producing an indication of the type of error in the reported status of said object in the event said newly reported status of said object is incompatible with said previously reported status of said object.

* * * * *